(12) United States Patent
Takano et al.

(10) Patent No.: US 12,498,709 B2
(45) Date of Patent: Dec. 16, 2025

(54) INFORMATION PROCESSING APPARATUS AND INFORMATION PROCESSING METHOD

(71) Applicant: Mitsubishi Electric Corporation, Tokyo (JP)

(72) Inventors: Naoto Takano, Tokyo (JP); Yoichi Horisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 325 days.

(21) Appl. No.: 18/031,172

(22) PCT Filed: Dec. 18, 2020

(86) PCT No.: PCT/JP2020/047394
§ 371 (c)(1),
(2) Date: Apr. 11, 2023

(87) PCT Pub. No.: WO2022/130611
PCT Pub. Date: Jun. 23, 2022

(65) Prior Publication Data
US 2023/0376023 A1    Nov. 23, 2023

(51) Int. Cl.
*G05B 23/02*    (2006.01)

(52) U.S. Cl.
CPC ....... *G05B 23/024* (2013.01); *G05B 23/0245* (2013.01)

(58) Field of Classification Search
CPC .. G05B 23/024; G05B 23/0245; G05B 23/02; G01M 15/046; G01M 99/00
See application file for complete search history.

(56) References Cited

U.S. PATENT DOCUMENTS

2005/0007096 A1*  1/2005  Dimino ............. G05B 23/0245
                                                                 324/142
2008/0255789 A1   10/2008  Satoh
(Continued)

FOREIGN PATENT DOCUMENTS

JP    2020-035372 A    3/2020
WO   2004063939 A2    7/2004

OTHER PUBLICATIONS

English Translation of Written Opinion mailed on Mar. 9, 2021, receive for PCT Application PCT/JP2020/047394, filed on Dec. 18, 2020, 4 pages. (Year: 2021).*

(Continued)

*Primary Examiner* — Mi'Schita' Henson
(74) *Attorney, Agent, or Firm* — XSENSUS LLP

(57) ABSTRACT

In an information processing apparatus, an internal variable holding unit holds a smaller number of values of an internal variable than N, the internal variable being sequentially calculated in time series based on sensor data acquired by a sensor data acquisition unit. An internal variable calculation unit calculates the internal variable corresponding to a (j+1)-th time point (j is an integer of one to N−1) based on the sensor data at the (j+1)-th time point and the internal variable corresponding to a j-th time point. A feature calculation unit calculates a feature by extracting a statistical characteristic included in the sensor data from the first time point to the N-th time point based on the internal variable at the N-th time point. A state diagnosis unit makes a diagnosis of a state of the mechanical apparatus based on the feature.

12 Claims, 21 Drawing Sheets

(56) References Cited

U.S. PATENT DOCUMENTS

2013/0132001 A1\* 5/2013 Yacout ................ G01D 3/10
 702/35
2015/0002436 A1 1/2015 Yano et al.
2019/0041842 A1\* 2/2019 Cella .................. G06N 20/00

OTHER PUBLICATIONS

Office Action issued May 10, 2024 in Indian Patent Application No. 202327029905 (English translation included).
International Search Report and Written Opinion mailed on Mar. 9, 2021, received for PCT Application PCT/JP2020/047394, filed on Dec. 18, 2020, 10 pages including English Translation.
Chinese Office Action mailed on Jun. 30, 2025 for the corresponding Chinese patent application No. 202080107328.7 1 and an English machine translation thereof, 15pp.
Office Action mailed on Oct. 17, 2025 for the corresponding Chinese patent application No. 202080107328.7 and an English machine translation thereof, 13pp.

\* cited by examiner

INFORMATION PROCESSING APPARATUS AND INFORMATION PROCESSING METHOD

CROSS-REFERENCE TO RELATED APPLICATION

The present application is based on PCT filing PCT/JP2020/047394, filed Dec. 18, 2020, the entire contents of which are incorporated herein by reference.

FIELD

The present disclosure relates to an information processing apparatus and an information processing method for performing information processing for diagnosing the state of a mechanical apparatus.

BACKGROUND

Mechanical apparatuses incorporating mechanical components such as ball screws and speed reducers can suffer various types of anomalies, e.g. friction increase, vibration generation, and housing breakage, as the mechanical components deteriorate over time. For this reason, information processing apparatuses that find and grasp this type of anomaly at an early stage are perceived as important for efficient factory operation.

An example of an information processing apparatus that diagnoses the state of a mechanical apparatus is described in Patent Literature 1 below. Patent Literature 1 describes a method of holding sensor data acquired in time series for a preset period and calculating a feature such as mean or variance from the held sensor data. In addition, Patent Literature 1 discloses that an anomaly of the mechanical apparatus is detected by holding the calculated feature for a preset period, calculating an index such as skewness based on the held feature, and comparing the calculated value with a past value.

CITATION LIST

Patent Literature

Patent Literature 1: Japanese Patent Application Laid-open No. 2020-35372

SUMMARY

Technical Problem

However, the information processing apparatus described in Patent Literature 1 is problematic in that it is necessary to hold sensor data obtained from a sensor signal for a set period, for which an enormous storage capacity is required. For example, if the sampling frequency for obtaining sensor data is 2 kHz, 2000 values are obtained per second. Here, given that the data type for handling sensor data with a computer is the 4-byte int type, for example, a memory of 480 kilobytes (=4 bytes×2 kHz×60 seconds) is required to obtain sensor data for 60 seconds. Because random access memories (RAMs) of many microcontrollers for industrial use have a capacity of about several kilos to several megabytes, information can only be processed by limited specific types of apparatuses, which is problematic.

Alternatively, sensor data can be held in a storage of a server apparatus, not in a microcontroller, so as to be separately processed offline. In practice, however, a factory can only be equipped with a few storages of this type from the viewpoint of the space for installing the server apparatus, the management cost for managing the server apparatus, and the like. This results in the problem that a huge amount of data accumulated every day cannot be processed by only a few storages. For example, suppose that a factory has 10 mechanical apparatuses each including 10 sensors, and these mechanical apparatuses operate for 24 hours. In this case, data of 2 terabytes or more ($\approx$10 sensors×10 mechanical apparatuses×4 bytes×2 [kHz]×3600 seconds×24 hours×30 days=2.0736 terabytes) is added every month, which is a heavy burden on the computer of the server apparatus.

The present disclosure has been made in view of the above, and an object thereof is to provide an information processing apparatus capable of performing information processing for diagnosing the state of a mechanical apparatus without using a computer having a high calculation capability and a computer having a large storage capacity.

Solution to Problem

In order to solve the above-described problems and achieve the object, an information processing apparatus according to the present disclosure includes a sensor data acquisition unit, an internal variable holding unit, an internal variable calculation unit, a feature calculation unit, and a state diagnosis unit. The sensor data acquisition unit acquires measurement values of a physical quantity of a mechanical apparatus measured by a sensor, and holds, as sensor data, measurement values from a first time point to an N-th time point (N is an integer of two or more) among the measurement values. The internal variable holding unit holds a smaller number of values of an internal variable than the N, the internal variable being sequentially calculated in time series based on the sensor data. The internal variable calculation unit calculates the internal variable corresponding to a (j+1)-th time point (j is an integer of one to N−1) based on the sensor data at the (j+1)-th time point and the internal variable corresponding to a j-th time point. The feature calculation unit calculates a feature by extracting a statistical characteristic included in the sensor data from the first time point to the N-th time point based on the internal variable at the N-th time point. The state diagnosis unit makes a diagnosis of the state of the mechanical apparatus based on the feature.

Advantageous Effects of Invention

The information processing apparatus according to the present disclosure can achieve the effect of performing information processing for diagnosing the state of a mechanical apparatus without using a computer having a high calculation capability and a computer having a large storage capacity.

DESCRIPTION OF EMBODIMENTS

Hereinafter, an information processing apparatus and an information processing method according to embodiments of the present disclosure will be described in detail based on the drawings.

First Embodiment

Figure 1:
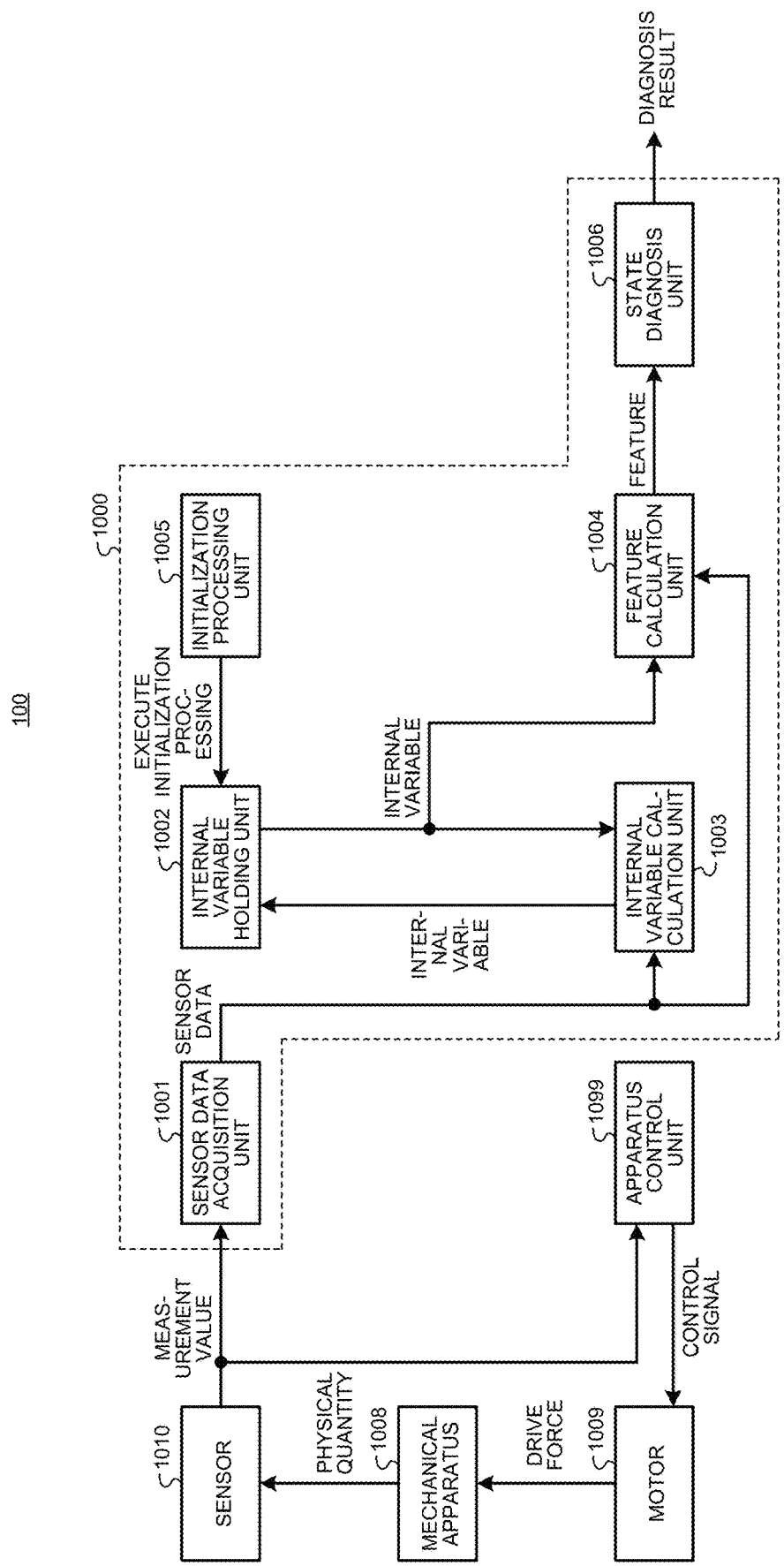
FIG. 1 is a diagram illustrating an exemplary configuration of an information processing system including an information processing apparatus according to a first embodiment.

FIG. 1 is a diagram illustrating an exemplary configuration of an information processing system 100 including an information processing apparatus 1000 according to the first embodiment. As illustrated in FIG. 1, the information processing system 100 includes the information processing apparatus 1000, a mechanical apparatus 1008, a sensor 1010, a motor 1009, and an apparatus control unit 1099. The motor 1009 drives the mechanical apparatus 1008 by applying a drive force to the mechanical apparatus 1008. When the mechanical apparatus 1008 is driven by the motor 1009, the sensor 1010 measures a physical quantity of the mechanical apparatus 1008. The physical quantity the mechanical apparatus 1008 measures is exemplified by position, speed, acceleration, operation command, current, voltage, torque, force, pressure, sound, or light amount. Note that the present embodiment uses motor speed and motor torque as examples of physical quantities. The motor speed is the rotation speed of the motor 1009, and the motor torque is the torque generated by the motor 1009.

The sensor 1010 outputs a sensor signal including a measurement value of a physical quantity to the information processing apparatus 1000 and the apparatus control unit 1099. The apparatus control unit 1099 determines a control signal for controlling the motor 1009 based on the sensor signal. The motor 1009 is controlled by the control signal output from the apparatus control unit 1099.

The information processing apparatus 1000 includes a sensor data acquisition unit 1001, an internal variable holding unit 1002, an internal variable calculation unit 1003, a feature calculation unit 1004, an initialization processing unit 1005, and a state diagnosis unit 1006.

The sensor data acquisition unit 1001 acquires a measurement value of a physical quantity of the mechanical apparatus 1008 measured by the sensor 1010. As described above, the measurement value of the physical quantity is included in the sensor signal transmitted by the sensor 1010. In addition, the sensor data acquisition unit 1001 holds, as sensor data, measurement values from the first time point to the N-th time point among the acquired measurement values. Here, reference character "N" is an integer of two or more. The internal variable holding unit 1002 temporarily holds a smaller number of values of an internal variable than N. Internal variables are variables sequentially calculated in time series based on sensor data. Internal variables are used for calculating a feature. Details of internal variables and features will be described later.

The internal variable calculation unit 1003 receives the sensor data transmitted from the sensor data acquisition unit 1001 and the internal variable transmitted from the internal variable holding unit 1002. The internal variable calculation unit 1003 updates the internal variable based on the sensor data and the internal variable. More generally, the internal variable calculation unit 1003 sequentially updates the internal variable by calculating the internal variable corresponding to the (j+1)-th time point based on the sensor data at the (j+1)-th time point and the internal variable corresponding to the j-th time point. Here, reference character "j" is an integer of one to N−1. In other words, the internal variable calculation unit 1003 calculates the internal variable at a certain time point based on the sensor data at the certain time point and the internal variable at one time point before the certain time point. The calculated internal variable is transmitted to the internal variable holding unit 1002.

The feature calculation unit 1004 receives the sensor data transmitted from the sensor data acquisition unit 1001 and the internal variable transmitted from the internal variable holding unit 1002. The feature calculation unit 1004 calculates a feature based on the sensor data and the internal variable. More generally, the feature calculation unit 1004 calculates a feature by extracting a statistical characteristic included in the sensor data from the first time point to the N-th time point based on the internal variable. The calculated feature is transmitted to the state diagnosis unit 1006.

The initialization processing unit 1005 executes initialization processing. The initialization processing is processing of setting the internal variable held by the internal variable holding unit 1002 to an initial value. More generally, the initialization processing unit 1005 performs processing of determining and setting the internal variable at the first time point to a value between a preset maximum and a preset minimum.

The state diagnosis unit 1006 performs diagnosis processing of diagnosing the state of the mechanical apparatus 1008 based on the feature, and outputs the diagnosis result as the result of the diagnosis processing.

Figure 2:
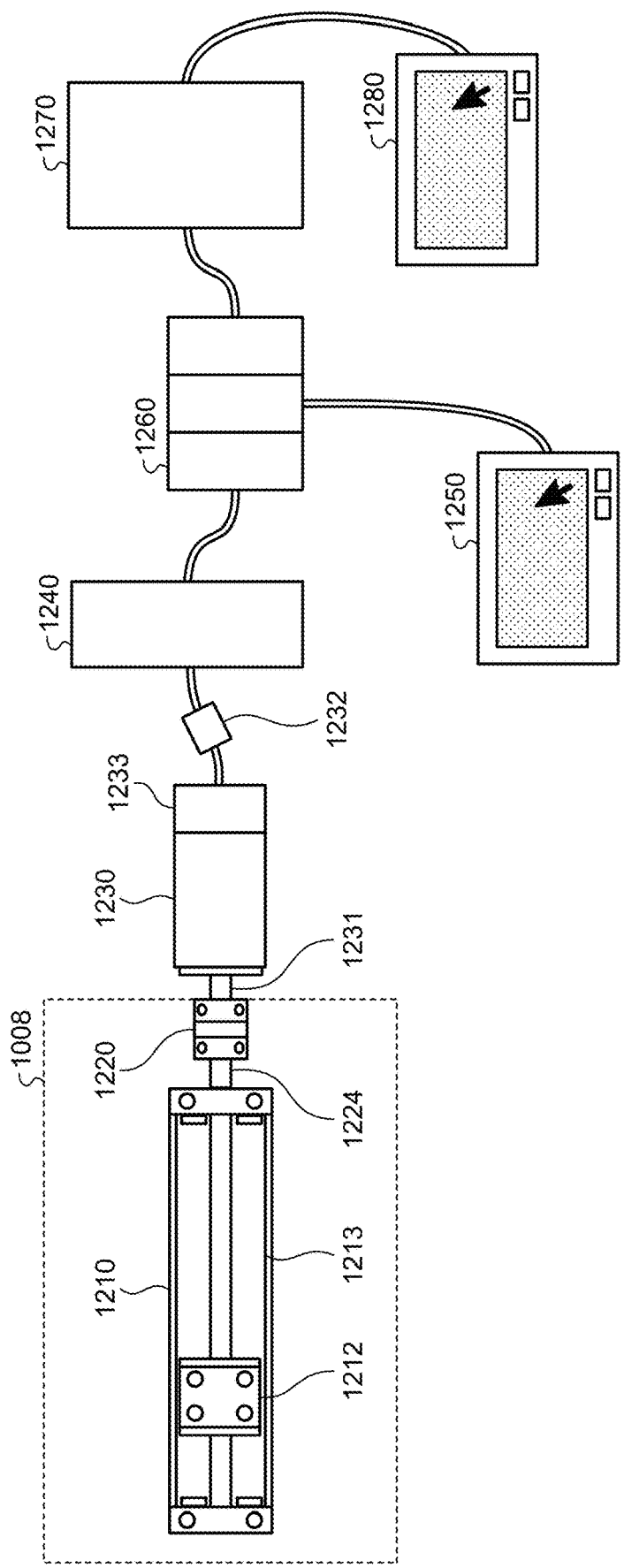
FIG. 2 is a diagram illustrating an exemplary hardware configuration of a mechanical apparatus and its peripheral apparatuses according to the first embodiment.

FIG. 2 is a diagram illustrating an exemplary hardware configuration of the mechanical apparatus 1008 and its peripheral apparatuses according to the first embodiment. FIG. 2 depicts the mechanical apparatus 1008 in which a servomotor 1230 is used as a drive source as an exemplary configuration of the mechanical apparatus 1008. The drive torque generated by the servomotor 1230 is output from a servomotor shaft 1231 and input to a ball screw shaft 1224 via a coupling 1220. A ball screw 1210 converts a rotational operation into a linear operation by means of a screw mechanism to operate a movable portion 1212. Note that the movable portion 1212 is connected to a different mechanical component (not illustrated), and the movable mechanical component is used according to the purpose of the mechanical apparatus 1008.

The movable portion 1212 is restricted from moving in a desired direction by a guide 1213. The guide 1213 assists the movable portion 1212 so that the mechanical apparatus 1008 can operate with high accuracy. As illustrated in the drawing, the servomotor 1230 is usually equipped with an encoder 1233 that measures the rotation angle and a current sensor 1232 that measures the current so that the servomotor shaft 1231 can be driven following a predetermined position, speed, or torque. A driver 1240 performs feedback control based on information obtained from the current sensor 1232, and supplies the power required for driving to the servomotor 1230. The calculation required for the feedback control is performed by the apparatus control unit 1099 in FIG. 1. Note that the present embodiment describes the motor torque as an example of sensor data for use in state diagnosis. However, sensor data is not limited to this example. Sensor data may be anything that contains information on the state of the mechanical apparatus 1008, e.g. the above-mentioned physical quantities such as position, speed, acceleration, current, voltage, torque, force, pressure, sound, and light amount. Instead of these physical quantities, sensor data may be image information or the like.

In FIG. 2, the current sensor 1232 and the encoder 1233 are illustrated as non-limiting examples of the sensor 1010. Other examples can include a laser displacement meter, a gyro sensor, a vibration meter, an acceleration sensor, a voltmeter, a torque sensor, a pressure sensor, a microphone, an optical sensor, a camera, and the like. The mounting position of the sensor 1010 does not necessarily have to be close to the servomotor 1230, and may be any position suitable for diagnosing the state of the mechanical apparatus 1008. For example, an acceleration sensor may be installed on the outer surface of the guide 1213 or the like so as to measure the acceleration as sensor data.

A programmable logic controller (PLC) 1260 transmits an operation command for the servomotor 1230 to the driver 1240. In some cases, a personal computer (PC) 1270 may be prepared as necessary. In this case, the PC 1270 is used to send a command to the PLC 1260. As the PC 1270, a PC for industrial use (factory automation PC or industrial PC) may be used.

In some cases, as illustrated in the drawing, a PLC display 1250 for monitoring the state of the PLC 1260 and a PC display 1280 for monitoring the state of the PC 1270 may be prepared. Usually, one mechanical apparatus 1008 is equipped with a plurality of drive sources (not illustrated) including the servomotor 1230. Accordingly, a plurality of drivers 1240 may be prepared as necessary. In some cases, the mechanical apparatus 1008 may be operated integrally by a single PLC 1260 or cooperatively by a plurality of PLCs 1260. In any case, the information processing apparatus 1000 described in the present embodiment can be similarly implemented.

Figure 3:
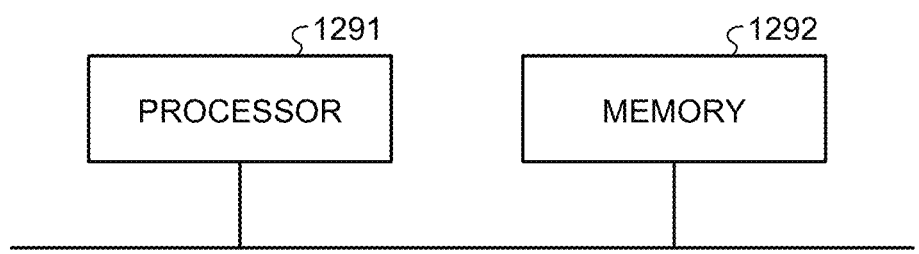
FIG. 3 is a diagram illustrating an exemplary configuration in which processing circuitry provided in the driver illustrated in FIG. 2 is configured by a processor and a memory.

FIG. 3 is a diagram illustrating an exemplary configuration in which processing circuitry provided in the driver 1240 illustrated in FIG. 2 is configured by a processor 1291 and a memory 1292. In a case where the processing circuitry is configured by the processor 1291 and the memory 1292, each function of the processing circuitry of the driver 1240 is implemented by software, firmware, or a combination of software and firmware. Software or firmware is described as a program and stored in the memory 1292. In the processing circuitry, the processor 1291 reads and executes the programs stored in the memory 1292, thereby implementing each function. That is, the processing circuitry includes the memory 1292 for storing the programs that result in the processing of the driver 1240. It can also be said that these programs cause a computer to execute the procedures and methods for the driver 1240.

The processor 1291 may be an arithmetic means called a central processing unit (CPU), a processing device, an arithmetic device, a microprocessor, a microcomputer, or a digital signal processor (DSP). The memory 1292 may be a non-volatile or volatile semiconductor memory such as a RAM, a read only memory (ROM), a flash memory, an erasable programmable ROM (EPROM), or an electrically EPROM (EEPROM, registered trademark). Alternatively, the memory 1292 may be a storage means such as a magnetic disk, a flexible disk, an optical disk, a compact disk, a mini disk, or a digital versatile disc (DVD).

Figure 4:
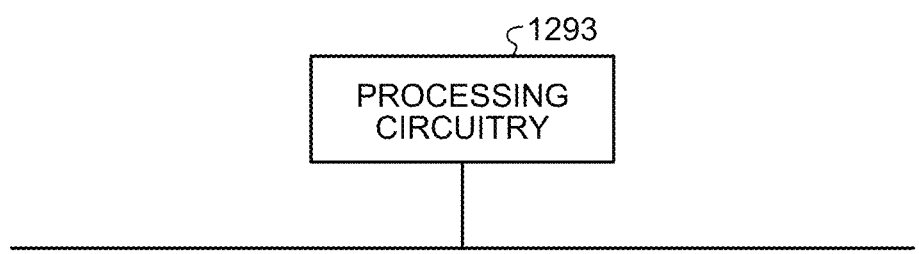
FIG. 4 is a diagram illustrating an exemplary configuration in which processing circuitry provided in the driver illustrated in FIG. 2 is configured by dedicated hardware.

FIG. 4 is a diagram illustrating an exemplary configuration in which processing circuitry provided in the driver 1240 illustrated in FIG. 2 is configured by dedicated hardware. In a case where the processing circuitry is configured by dedicated hardware, the processing circuitry 1293 illustrated in FIG. 4 may be, for example, a single circuit, a composite circuit, a programmed processor, a parallel programmed processor, an application specific integrated circuit (ASIC), a field programmable gate array (FPGA), or a combination thereof. The functions of the driver 1240 may be implemented by different pieces of processing circuitry 1293, or a plurality of functions may be collectively implemented by one piece of processing circuitry 1293. Note that the driver 1240 and the PLC 1260 may be connected via a network. In addition, the PC 1270 may exist on a cloud server.

An example of the hardware configuration is as described above, but the driver 1240, the PLC 1260, and the PC 1270 are not essential, and a device for implementing the information processing apparatus according to the present disclosure may be separately prepared, and the information processing apparatus may be implemented inside the device. For example, a single device including a battery, a microcomputer, a sensor, a display, and a communication function may be used, and the state of the mechanical apparatus 1008 may be estimated based on the sensor data that is the sound of the mechanical apparatus 1008 acquired with the microphone.

In addition, the displays are not essential, and instead of displaying results on the PLC display 1250 or the PC display 1280, results may be displayed using an existing LED or the like provided in the driver 1240 or the PLC 1260. In addition, without showing results on a display, the drive of the servomotor 1230 may be stopped in response to a diagnosis of anomaly.

Although the present embodiment describes the case in which the motor speed is obtained from the encoder 1233 provided in the servomotor 1230, this is a non-limiting example. For example, in the configuration of FIG. 1, the motor speed may be obtained using a control signal from the apparatus control unit 1099 that issues a drive command to the motor 1009.

The present embodiment describes the servomotor 1230 as a rotary servomotor, but the servomotor 1230 may be implemented using another motor or a drive source such as a linear servomotor, an induction machine motor, a stepping motor, a brush motor, or an ultrasonic motor. The ball screw 1210 and the coupling 1220 are non-limiting examples of components. The information processing apparatus according to the present disclosure can also be applied to mechanical apparatuses including a wide variety of components such as speed reducers, guides, belts, screws, pumps, bearings, and housings.

Figure 5:
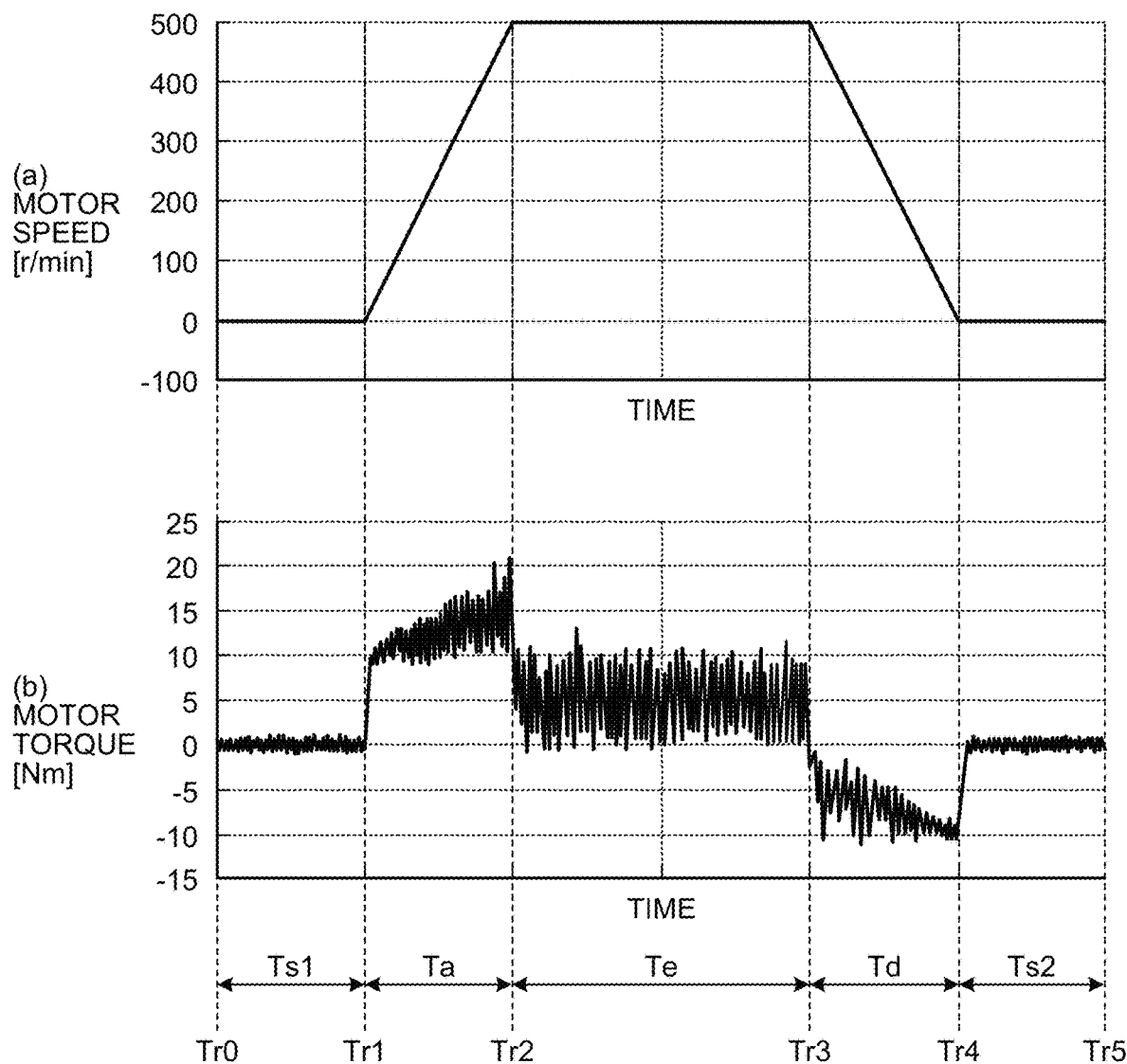
FIG. 5 is a diagram illustrating time-series waveforms of motor speed and motor torque in the first embodiment.

Next, the operation of the information processing apparatus 1000 according to the first embodiment will be described in detail with reference to drawings and formulas. First, sensor data obtained from the current sensor 1232 when the mechanical apparatus 1008 is driven using the servomotor 1230 will be described with reference to FIG. 5. FIG. 5 is a diagram illustrating time-series waveforms of motor speed and motor torque in the first embodiment.

The signal directly obtained from the current sensor 1232 is a measurement signal of three-phase currents flowing through the motor 1009. The motor torque can be calculated by properly converting the three-phase currents. Note that the three-phase current value detected by the current sensor 1232 may be used as sensor data for diagnosis. The signal obtained from the encoder 1233 is position information indicating the rotation angle of the motor 1009. Therefore, through processing such as numerical differentiation on the position information, the rotation speed of the motor 1009 is obtained as the motor speed. Thus, instead of the signal obtained from the current sensor 1232, the signal obtained from the encoder 1233 may be used as sensor data for diagnosis.

The horizontal axis in FIGS. 5(*a*) and 5(*b*) represents time. FIG. 5(*a*) illustrates the time-series waveform of the motor speed, and FIG. 5(*b*) illustrates the time-series waveform of the motor torque. These waveforms are the waveforms of the motor 1009 in a stationary state as well as in the subsequent single drive operation called positioning. The sampling period which is the acquisition cycle of the waveform in FIG. 5(*b*) is 0.5 milliseconds, and the acquisition time is 6 seconds. Therefore, the number of data points N, i.e. the number of points of sensor data, is 12000 points (=6000 milliseconds÷0.5 milliseconds). Note that the sampling period, the acquisition time, and the number of data points N shown here are only examples, and are not limited to these numerical values. In this example, positioning is performed once, but positioning may be performed multiple times. The operation in the case of positioning the motor 1009 described herein is only an example, and is not limited to this example. The present embodiment can also be applied to control other than positioning, for example, speed control or torque control.

The motor speed in FIG. 5(*a*) will be described. First, between time Tr0 and time Tr1, the motor 1009 is stationary, and the motor speed is zero [r/min]. This period is denoted by "Ts1". Subsequently, the motor 1009 accelerates from time Tr1 to time Tr2, and the motor speed increases to 500 [r/min]. This period is denoted by "Ta". Subsequently, the motor speed remains constant at 500 [r/min] from time Tr2 to time Tr3. This period is denoted by "Te". Subsequently, the motor 1009 decelerates from time Tr3 to time Tr4, and the motor speed decreases to zero [r/min]. This period is denoted by "Td". Subsequently between time Tr4 and time Tr5, the motor 1009 is stationary, and the motor speed remains zero [r/min]. This period is denoted by "Ts2". The above operation is depicted as a trapezoidal waveform as illustrated in FIG. 5(*a*). Note that such a trapezoidal waveform is a non-limiting example. The waveform of the motor speed may have any shape as long as the state of the mechanical apparatus 1008 can be obtained from the sensor data associated with the drive of the motor 1009.

Next, the motor torque in FIG. 5(*b*) will be described. In period Ts1, the motor 1009 is stationary, and the motor torque required for the operation of the motor 1009 is approximately zero [Nm]. In the subsequent period Ta, torque for accelerating the mechanical apparatus 1008 is required, and a motor torque larger than that in period Ts1 is generated. Note that if the mechanical apparatus 1008 has viscous friction due to the influence of viscous friction or the like, the required torque may gradually increase according to the speed as illustrated in FIG. 5. In the subsequent period Te, the speed of the mechanical apparatus 1008 does not change, and a substantially constant motor torque is generated. In the subsequent period Td, torque for decelerating the mechanical apparatus 1008 is required, and the motor torque is generated in the negative direction as viewed from the motor torque in period Te. In the last period Ts2, the motor 1009 is stationary, and the motor torque required for the operation of the motor 1009 is approximately zero [Nm].

The motor torque described above is a torque required for the almost ideal operation of the mechanical apparatus 1008. In practice, however, varying degrees of noise are generated in the motor torque as illustrated in FIG. 5(*b*) due to the influence of electrical vibration, mechanical vibration, friction, or the like. It is known that as components of the mechanical apparatus 1008 such as the ball screw shaft 1224, the guide 1213, and the coupling 1220 deteriorate, the magnitude of the friction or vibration changes, and the influence of the friction or vibration appears in sensor data including the motor torque. Therefore, sensor data is analyzed with a statistical method, and some indices called features are calculated to detect anomaly of the apparatus.

The sensor data acquisition unit 1001 acquires sensor signals sequentially generated in time series from the sensor 1010, and generates digitized sensor data. The generated sensor data is passed to the internal variable calculation unit 1003 and/or the feature calculation unit 1004. When generating sensor data, the sensor data acquisition unit 1001 may execute filter processing as necessary for removing noise irrelevant to the state of the mechanical apparatus 1008.

Next, the function and operation of the internal variable holding unit 1002, the internal variable calculation unit 1003, the feature calculation unit 1004, and the initialization processing unit 1005 will be described in detail using several types of features as examples.

First, notation of time and sensor data in mathematical formulas will be described. The time point at which the acquisition of sensor data for use in feature calculation is started is referred to as the "first time point". A total of N pieces of sensor data are obtained from the first time point to the N-th time point. Here, reference character "N" is an integer of two or more. The time point at which a j-th piece of sensor data is acquired is referred to as the "j-th time point". Here, reference character "j" is an integer of one to N−1. The sensor data obtained at the j-th time point is referred to as "$x_j$". For the sake of simplicity, the following description assumes that sensor data is acquired at predetermined time intervals. Needless to say, sensor data may be acquired irregularly.

The internal variable holding unit 1002 holds the internal variable at one time point before. The number of types of internal variables is not limited to one, and multiple types of internal variables may be held according to the feature. The smaller the number of types of internal variables to be held is than the number of time-series pieces of sensor data from which the feature is calculated, the higher the memory reduction effect is. The internal variable holding unit 1002 may hold the feature itself as a type of internal variable.

The initialization processing unit 1005 executes initialization processing of setting the held internal variable to an initial value. The initial value is a value set in the initialization processing. For example, the initialization processing unit 1005 performs the initialization processing at the first time point, when the power of the information processing apparatus 1000 is turned on. The first time point is a time point at which the sensor data acquisition unit 1001 acquires sensor data first. The initial value may be simply set to zero as described later, but need not necessarily be zero. For example, an upper limit and a lower limit may be defined near a proper initial value, and the initial value may be appropriately set between the upper limit and the lower limit. Note that some of the features to be described later may not be calculated stably if the initial values of the internal variables and the features are set to extremely small values. In this case, the calculation is stabilized by setting the initial values to a non-zero value. In addition, some features have a non-zero steady-state value with respect to sensor data. In the case of using such a feature, the convergence of calculation can be accelerated by setting the initial value to an assumed value of the feature. For example, kurtosis, which is one of the features described in the present embodiment, is known to have a value of about three with respect to sensor data having a property close to a normal distribution. Therefore, setting the initial value of the kurtosis to three allows for calculation with quick convergence for many types of sensors. Hereinafter, using specific examples of features: mean, variance, standard deviation, root mean square, skewness, kurtosis, maximum, minimum, peak value, peak-peak value, and peak factor; a sequential calculation method for each feature will be described together with a procedure for deriving the feature. Note that the sequential calculation of each feature may be hereinafter simply referred to as "sequential calculation".

First, a calculation procedure regarding the sequential calculation of the mean m as the simplest example of a feature will be described. The mean $m_j$ for the sensor data $x_1$ to $x_j$ from the first time point to the j-th time point is defined by the following known Formula (1). This Formula (1) is also called the arithmetic mean or arithmetic average.

Formula 1

$$m_j = \frac{\sum_{i=1}^{j} x_i}{j} \quad (1)$$

As described above, the sensor data at the j-th time point is $x_j$. Therefore, the mean $m_3$ at the third time point can be expressed as Formula (2) below.

Formula 2

$$m_3 = \frac{x_1 + x_2 + x_3}{3} \quad (2)$$

Here, the time-series sensor data from the first time point to the third time point is not stored in the memory 1292, and information at the third time point is held as some internal variables. Now, consider a method of computing the mean at the fourth time point based on the internal variables at the third time point and the sensor data at the fourth time point. First, the mean $m_4$ at the fourth time point can be expressed as Formula (3) below according to Formula (1) as a definition formula.

Formula 3

$$m_4 = \frac{x_1 + x_2 + x_3 + x_4}{4} \quad (3)$$

In the case of calculating the mean $m_4$ using Formula (3), the time-series sensor data from the first to fourth time points are used, and a memory for holding the sensor data equivalent to the number of past samples is required. However, if the mean $m_3$ at the third time point and the variable $L_3=3$ representing the number of points of sensor data to the third time point are held as internal variables, the mean $m_4$ at the fourth time point can be expressed by Formula (4) below.

Formula 4

$$m_4 = \frac{L_3 m_3 + x_4}{L_3 + 1} \quad (4)$$

Substituting Formula (2) and $L_3=3$ into Formula (4) gives the result matching the result of Formula (3) in which the mean $m_4$ is computed with the definition formula.

In a generalized form, the mean $m_{j+1}$ at the (j+1)-th time point can be expressed as Formula (5) below.

Formula 5

$$m_{j+1} = \frac{\sum_{i=1}^{j+1} x_i}{j+1} \quad (5)$$
$$= \frac{x_{j+1} + \sum_{i=1}^{j} x_i}{j+1}$$
$$= \frac{x_{j+1} + j \frac{\sum_{i=1}^{j} x_i}{j}}{j+1}$$
$$= \frac{x_{j+1} + j m_j}{j+1}$$

That is, the mean $m_{j+1}$ at the (j+1)-th time point is sequentially computed with Formula (6) below.

Formula 6

$$m_{j+1} = \frac{x_{j+1} + L_j m_j}{L_j + 1} \quad (6)$$

Here, the variable $L_{j+1}$ at the (j+1)-th time point is sequentially computed with Formula (7) below.

Formula 7

$$L_{j+1} = L_j + 1 \quad (7)$$

Holding the variable at the j-th time point in Formula (7) is equivalent to holding information at time j during sequential calculation. The sensor data $x_{j+1}$ is newly acquired at the (j+1)-th time point. As a result, the internal variables which should be held at the j-th time point to compute the mean $m_{j+1}$ at the (j+1)-th time point are the mean $m_j$ and the variable $L_j$.

In the calculation of the internal variables at the second time point, the initial values $L_1$ and $m_1$ of the variable L and the mean m are preferably set to zero for ease, or are preferably determined according to the value of sensor data at the initialization processing in order to avoid fluctuations immediately after the initialization processing. For example, in the case of using the mean as a feature, setting the initial value $L_1$ of the variable L to zero and the initial value $m_1$ of the mean m to $x_1$ gives the result matching Formula (1) as the definition formula.

Next, a calculation procedure regarding the sequential calculation of the variance v as an example of a feature will be described. The variance $v_j$ for the sensor data $x_1$ to $x_j$ from the first time point to the j-th time point is defined by the following known Formula (8).

Formula 8

$$v_j = \frac{\sum_{i=1}^{j}(x_i - m_i)^2}{j} \quad (8)$$

Note that the unbiased variance with a denominator of j−1 may be used instead of Formula (8), in which case the derivation can be performed with a similar procedure.

Here, regarding sensor data as a random variable, the variance v thereof is known to be expressed by Formula (9) below.

Formula 9

$$v = E[x^2] - E[x]^2 \quad (9)$$

In Formula (9), symbol "E[ ]" represents the expected value of the random variable in square brackets. Therefore, the variance $v_j$ at the j-th time point indicated in Formula (8) can be expressed by Formula (10) below using Formula (9).

Formula 10

$$v_j = \frac{\sum_{i=1}^{j} x_i^2}{j} - m_j^2 \quad (10)$$

Therefore, the variance $v_{j+1}$ for the sensor data $x_1$ to $x_{j+1}$ from the first time point to the (j+1)-th time point can be expressed by Formula (11) below.

Formula 11

$$v_{j+1} = \frac{\sum_{i=1}^{j+1} x_i^2}{j+1} - m_{j+1}^2 \quad (11)$$

Transforming Formula (11), the variance $v_{j+1}$ can be expressed by Formula (12) below.

Formula 12

$$v_{j+1} = \frac{\sum_{i=1}^{j} x_i^2 + x_{j+1}^2}{j+1} - m_{j+1}^2 \quad (12)$$
$$= \frac{j \frac{\sum_{i=1}^{j} x_i^2}{j} + x_{j+1}^2}{j+1} - m_{j+1}^2$$

Then, Formula (13) below is derived from Formula (10) and Formula (12).

Formula 13

$$v_{j+1} = \frac{j(v_j + m_j^2) + x_{j+1}^2}{j+1} - m_{j+1}^2 \quad (13)$$

Therefore, from Formula (13), the variance $v_{j+1}$ at the (j+1)-th time point is sequentially computed with Formula (14) below.

Formula 14

$$v_{j+1} = \frac{L_j(v_j + m_j^2) + x_{j+1}^2}{L_j + 1} - m_{j+1}^2 \quad (14)$$

As mentioned above, the variable $L_{j+1}$ at the (j+1)-th time point is sequentially computed with Formula (7) described above. In addition, the mean $m_{j+1}$ at the (j+1)-th time point is sequentially computed with Formula (6) described above. Then, the sensor data $x_{j+1}$ at the (j+1)-th time point is newly acquired at the (j+1)-th time point. As a result, the internal variables which should be held at the j-th time point to compute the variance $v_{j+1}$ at the (j+1)-th time point are the variable $L_j$, the variance $v_j$, and the mean $m_j$. Note that the standard deviation $s_j$ may be held instead of the variance $v_j$.

In the calculation of the internal variables at the second time point, the initial values $L_1$ and $v_1$ of the variable L and the variance v are preferably set to zero for ease, or are preferably determined according to, for example, the value of sensor data at the initialization processing in order to avoid fluctuations immediately after the initialization processing. However, if the initial value $v_1$ of the variance v is set to a value close to zero, the sequential calculation of a different feature to be described later in which the variance v appears in the denominator cannot be stable. In some cases, therefore, it is preferable to use a value somewhat larger than zero as the initial value.

Next, a calculation procedure regarding the sequential calculation of the standard deviation s as an example of a feature will be described. The standard deviation $s_j$ for the sensor data $x_1$ to $x_j$ from the first time point to the j-th time point is defined by the following known Formula (15).

Formula 15:

$$s_j = \sqrt{v_j} \tag{15}$$

That is, the standard deviation $s_j$ is instantly computed from the variance $v_j$ sequentially computed with the above procedure. Therefore, the internal variables which should be held to sequentially calculate the standard deviation $s_j$ are the same as those for the variance $v_j$.

Next, a calculation procedure regarding the sequential calculation of the root mean square r as an example of a feature will be described. The root mean square $r_j$ for the sensor data $x_1$ to $x_j$ from the first time point to the j-th time point is defined by the following known Formula (16). This is also called RMS (root mean square) or effective value.

Formula 16

$$r_j = \sqrt{\frac{\sum_{i=1}^{j} x_i^2}{j}} \tag{16}$$

Therefore, the root mean square $r_{j+1}$ for the sensor data from the first time point to the (j+1)-th time point can be expressed as Formula (17) below.

Formula 17

$$r_{j+1} = \sqrt{\frac{\sum_{i=1}^{j+1} x_i^2}{j+1}} \tag{17}$$

From Formula (16) and Formula (17), the square $r_{j+1}^2$ of the root mean square can be expressed as Formula (18) below.

Formula 18

$$r_{j+1}^2 = \frac{\sum_{i=1}^{j+1} x_i^2}{j} \tag{18}$$

$$= \frac{\sum_{i=1}^{j} x_i^2 + x_{j+1}^2}{j+1}$$

$$= \frac{j \frac{\sum_{i=1}^{j} x_i^2}{j} + x_{j+1}^2}{j+1}$$

$$= \frac{j r_j^2 + x_{j+1}^2}{j+1}$$

From Formula (18), the square $r_{j+1}^2$ of the root mean square at the (j+1)-th time point is sequentially computed with Formula (19) below.

Formula 19

$$r_{j+1} = \frac{L_j r_j^2 + x_{j+1}^2}{L_j + 1} \tag{19}$$

As mentioned above, the variable $L_{j+1}$ at the (j+1)-th time point is sequentially computed with Formula (7) described above. In addition, the sensor data $x_{j+1}$ at the (j+1)-th time point is newly acquired at the (j+1)-th time point. As a result, the internal variables which should be held at the j-th time point to compute the square $r_{j+1}^2$ of the root mean square at the (j+1)-th time point are the square $r_j^2$ of the root mean square and the variable $L_j$.

In the calculation of the internal variables at the second time point, the initial values $L_1$ and $r_1^2$ of the variable L and the square $r_j^2$ of the root mean square are preferably set to zero for ease, or are preferably determined according to, for example, the value of sensor data at the initialization processing in order to avoid fluctuations immediately after the initialization processing.

Next, a calculation procedure regarding the sequential calculation of the skewness w as an example of a feature will be described. Regarding the sensor data x as a random variable and using the mean m and the standard deviation s of the random variable x, the skewness w is defined by the following known Formula (20).

Formula 20

$$w = \frac{E[(x-m)^3]}{s^3} \tag{20}$$

As described above, symbol "E[ ]" represents the expected value of the random variable in square brackets. Formula (20) is developed and rearranged into Formula (21) below.

Formula 21

$$w = \frac{E[x^3 - 3x^2 m + 3xm^2 - m^3]}{s^3} \tag{21}$$

$$= \frac{E[x^3] - 3mE[x^2] + 3m^2 E[x] - m^3}{s^3}$$

$$= \frac{E[x^3] - 3mE[x^2] + 2m^3}{s^3}$$

The transformation in Formula (21) uses the property that the expected value E[x] of the sensor data x is equal to the mean m.

Next, consider the skewness $w_j$ for the sensor data $x_1$ to $x_j$ from the first time point to the j-th time point. In Formula (21), using a variable $A_j$ to represent the expected value $E[x^3]$ of the first numerator term on the right side and a variable $B_j$ to represent the expected value of the second numerator term on the right side, the skewness $w_j$ can be expressed as Formula (22) below.

Formula 22

$$w_j = \frac{A_j - 3m_j B_j + 2m_j^3}{s_j^3} \qquad (22)$$

In Formula (22), the standard deviation $s_j$ in the denominator on the right side can be sequentially calculated with Formula (15) described above.

Next, consider the sequential calculation regarding the variables $A_j$ and $B_j$ at the j-th time point in Formula (22). First, the variable $A_j$ at the j-th time point can be expressed by Formula (23) below.

Formula 23

$$A_j = \frac{\sum_{i=1}^{j} x_i^3}{j} \qquad (23)$$

Similarly, the variable $A_{j+1}$ at the (j+1)-th time point can be expressed by Formula (24) below.

Formula 24

$$A_{j+1} = \frac{\sum_{i=1}^{j+1} x_i^3}{j+1} \qquad (24)$$

From Formula (23) and Formula (24), the variable $A_{j+1}$ can be expressed as Formula (25) below.

Formula 25

$$\begin{aligned} A_{j+1} &= \frac{\sum_{i=1}^{j+1} x_i^3}{j+1} \\ &= \frac{\sum_{i=1}^{j} x_i^3 + x_{j+1}^3}{j+1} \\ &= \frac{j \frac{\sum_{i=1}^{j} x_i^3}{j} + x_{j+1}^3}{j+1} \\ &= \frac{jA_j + x_{j+1}^3}{j+1} \end{aligned} \qquad (25)$$

Therefore, from Formula (25), the variable $A_{j+1}$ at the (j+1)-th time point is sequentially computed with Formula (26) below.

Formula 26

$$A_{j+1} = \frac{L_j A_j + x_{j+1}^3}{L_j + 1} \qquad (26)$$

As mentioned above, the variable $L_{j+1}$ at the (j+1)-th time point is sequentially computed with Formula (7) described above. In addition, the sensor data $x_{j+1}$ at the (j+1)-th time point is newly acquired at the (j+1)-th time point. Here, the internal variables which should be held at the j-th time point to compute the variable $A_{j+1}$ at the (j+1)-th time point are the variable $A_j$ and the variable $L_j$.

The variable $B_j$ at the j-th time point can be expressed by Formula (27) below.

Formula 27

$$\begin{aligned} B_j &= \frac{\sum_{i=1}^{j} x_i^2}{j} \\ &= r_j^2 \end{aligned} \qquad (27)$$

Formula (27) indicates that the variable $B_j$ matches the square $r_j^2$ of the root mean square described above, which is sequentially computed with Formula (19) described above. Therefore, the skewness $w_j$ for the sensor data $x_1$ to $x_j$ from the first time point to the j-th time point is computed with Formula (28) below.

Formula 28

$$w_j = \frac{A_j - 3m_j r_j^2 + 2m_j^3}{s_j^3} \qquad (28)$$

Similarly, the skewness $w_{j+1}$ for the sensor data $x_{j+1}$ from the first time point to the (j+1)-th time point is computed with Formula (29) below.

Formula 29

$$w_{j+1} = \frac{A_{j+1} - 3m_{j+1} r_{j+1}^2 + 2m_{j+1}^3}{s_{j+1}^3} \qquad (29)$$

As mentioned above, the variable $A_{j+1}$ at the (j+1)-th time point is sequentially computed with Formula (26) described above. In addition, the mean $m_{j+1}$ at the (j+1)-th time point is sequentially computed with Formula (6) described above. Then, the square $r_{j+1}^2$ of the root mean square at the (j+1)-th time point is sequentially computed with Formula (19) described above. In addition, the standard deviation $s_{j+1}$ at the (j+1)-th time point is sequentially computed with Formula (15) described above. Then, the sensor data $x_{j+1}$ at the (j+1)-th time point is newly acquired at the (j+1)-th time point. As a result, the internal variables which should be held at the j-th time point to compute the skewness $w_{j+1}$ for the sensor data $x_{j+1}$ from the first time point to the (j+1)-th time point are the variables $A_j$ and $L_j$, the mean $m_j$, the square $r_j^2$ of the root mean square, and the standard deviation $s_j$. The variance $v_j$ may be held instead of the standard deviation $s_j$. In addition, the root mean square $r_j$ may be held instead of the square $r_j^2$ of the root mean square.

Note that a formula that produces a similar calculation result is also obtained by holding the skewness $w_j$ instead of the variable $A_j$ for sequential calculation, which is not described here because the formula is complicated. In the calculation of the internal variables at the second time point, the initial values of the variables $A_j$ and $L_j$, the mean $m_j$, the square $r_j^2$ of the root mean square, and the standard deviation $s_j$ are preferably set to zero for ease, or are preferably determined according to, for example, the value of sensor data at the initialization processing in order to avoid fluctuations immediately after the initialization processing.

Next, a calculation procedure regarding the sequential calculation of the kurtosis k as an example of a feature will be described. Regarding the sensor data x as a random variable and using the standard deviation $s_j$ of the random variable x, the kurtosis k is defined by the following known Formula (30).

Formula 30

$$k = \frac{E[(x-m)^4]}{s^4} \quad (30)$$

As described above, symbol "E[ ]" represents the expected value of the random variable in square brackets. Note that in the calculation method described herein, the kurtosis for the random variable having a normal distribution is three. There is a definition different from this definition: applying a bias of "−3" to the right side of Formula (30) so as to make the kurtosis for a normal distribution zero. In this case, it is possible to derive a formula corresponding to the formula below with a similar procedure.

Formula (30) is developed and rearranged into Formula (31) below.

Formula 31

$$k = \frac{E[x^4 - 4x^3m + 6x^2m^2 - 4xm^3 + m^4]}{s^4} \quad (31)$$

$$= \frac{E[x^4] - 4mE[x^3] + 6m^2E[x^2] - 4m^3E[x] + m^4}{s^4}$$

$$= \frac{E[x^4] - 4mE[x^3] + 6m^2E[x^2] - 3m^4}{s^4}$$

The transformation in Formula (31) uses the property that the expected value E[x] of the sensor data x is equal to the mean m.

Next, consider the kurtosis $k_j$ for the sensor data $x_1$ to $x_j$ from the first time point to the j-th time point. In Formula (31), the expected value $E[x^4]$ of the first numerator term on the right side is represented by a variable $C_j$. In addition, the expected value of the second term and the expected value of the third term of the numerator on the right side can be expressed by the variables $A_j$ and $B_j$, respectively. Therefore, the kurtosis $k_j$ can be expressed by Formula (32) below.

Formula 32

$$k_j = \frac{C_j - 4m_jA_j + 6m_j^2B_j - 3m_j^4}{s_j^4} \quad (32)$$

In Formula (32), the standard deviation $s_j$ and the variables $A_j$ and $B_j$ can be sequentially calculated respectively with Formulas (15), (26), and (27) described above.

Next, consider the sequential calculation regarding the variable $C_j$ at the j-th time point in Formula (32). First, the variable $C_j$ at the j-th time point can be expressed by Formula (33) below.

Formula 33

$$C_j = \frac{\sum_{i=1}^{j} x_i^4}{j} \quad (33)$$

Similarly, the variable $C_{j+1}$ at the (j+1)-th time point can be expressed by Formula (34) below.

Formula 34

$$C_{j+1} = \frac{\sum_{i=1}^{j+1} x_i^4}{j+1} \quad (34)$$

From Formula (33) and Formula (34), the variable $C_{j+1}$ can be expressed as Formula (35) below.

Formula 35

$$C_{j+1} = \frac{\sum_{i=1}^{j+1} x_i^4}{j+1} \quad (35)$$

$$= \frac{\sum_{i=1}^{j} x_i^4 + x_{j+1}^4}{j+1}$$

$$= \frac{j \frac{\sum_{i=1}^{j} x_i^4}{j} + x_{j+1}^4}{j+1}$$

$$= \frac{jC_j + x_{j+1}^4}{j+1}$$

From Formula (35), the variable $C_{j+1}$ at the (j+1)-th time point is sequentially computed with Formula (36) below.

Formula 36

$$C_{j+1} = \frac{L_jC_j + x_{j+1}^4}{L_j + 1} \quad (36)$$

Here, as indicated by Formula (27), the variable $B_j$ matches the square $r_j^2$ of the root mean square described above. Therefore, the kurtosis kg for the sensor data $x_1$ to $x_j$ from the first time point to the j-th time point is computed with Formula (37) below.

Formula 37

$$k_j = \frac{C_j - 4A_jm_j + 6m_j^2r_j^2 - 3m_j^4}{s_j^4} \quad (37)$$

Similarly, the kurtosis $k_{j+1}$ for the sensor data $x_1$ to $x_{j+1}$ from the first time point to the (j+1)-th time point is computed with Formula (38) below.

Formula 38

$$k_{j+1} = \frac{C_{j+1} - 4A_{j+1}m_{j+1} + 6m_{j+1}^2r_{j+1}^2 - 3m_{j+1}^4}{s_{j+1}^4} \quad (38)$$

As mentioned above, the variable $C_{j+1}$ at the (j+1)-th time point is sequentially computed with Formula (36) described above. In addition, the variable $A_{j+1}$ at the (j+1)-th time point is sequentially computed with Formula (26) described above. Then, the mean $m_{j+1}$ at the (j+1)-th time point is sequentially computed with Formula (6) described above. In addition, the square $r_{j+1}^2$ of the root mean square at the (j+1)-th time point is sequentially computed with Formula (19) described above. In addition, the standard deviation $s_{j+1}$ at the (j+1)-th time point is sequentially computed with Formula (15) described above. Then, the sensor data $x_{j+1}$ at the (j+1)-th time point is newly acquired at the (j+1)-th time point. As a result, the internal variables which should be held at the j-th time point to compute the kurtosis $k_{j+1}$ for the sensor data $x_{j+1}$ from the first time point to the (j+1)-th time point are the variables $A_j$, $L_j$, and $C_j$, the mean $m_j$, the square $r_j^2$ of the root mean square, and the standard deviation $s_j$. The variance $v_j$ may be held instead of the standard deviation $s_j$. In addition, the root mean square $r_j$ may be held instead of the square $r_j^2$ of the root mean square.

Note that in the calculation of the internal variables at the second time point, the initial values of the variables $A_j$, $L_j$, and $C_j$, the mean $m_j$, the square $r_j^2$ of the root mean square, and the standard deviation $s_j$ are preferably set to zero for ease, or are preferably determined according to, for example, the value of sensor data at the initialization processing in order to avoid fluctuations immediately after the initialization processing. The kurtosis is known to have a value of about three given that the sensor data has a property close to a normal distribution. Therefore, the initial value $k_1$ of the kurtosis k may be three.

Next, a calculation procedure regarding the sequential calculation of the maximum as an example of a feature will be described. The maximum $a_j$ for the sensor data $x_1$ to $x_j$ from the first time point to the j-th time point is defined by the following known Formula (39).
Formula 39:

$$a_j = \max(x_1, \ldots, x_j) \tag{39}$$

The sequential calculation method for the maximum a is known to be easily implemented with the following method. The maximum $a_j$ at the j-th time point is held, and the larger one of the sensor data $x_{j+1}$ at the (j+1)-th time point and the maximum $a_j$ at the j-th time point is held as the maximum $a_{j+1}$ at the (j+1)-th time point. That is, the maximum $a_{j+1}$ at the (j+1)-th time point can be sequentially calculated with Formula (40) below.
Formula 40:

$$a_{j+1} = \max(a_j, x_{j+1}) \tag{40}$$

Note that for the initial value of the maximum, that is, the maximum $a_1$, the sensor data $x_1$ at the same time is preferably substituted.

Next, a calculation procedure regarding the sequential calculation of the minimum as an example of a feature will be described. The minimum $n_j$ for the sensor data $x_1$ to $x_j$ from the first time point to the j-th time point is defined by the following known Formula (41).
Formula 41:

$$n_j = \min(x_1, \ldots, x_j) \tag{41}$$

The sequential calculation method for the minimum n is known to be easily implemented with the following method. The minimum $n_j$ at the j-th time point is held, and the smaller one of the sensor data $x_{j+1}$ at the (j+1)-th time point and the minimum $n_j$ at the j-th time point is held as the minimum $n_{j+1}$ at the (j+1)-th time point. That is, the minimum $n_{j+1}$ at the (j+1)-th time point can be sequentially calculated with Formula (42) below.
Formula 42:

$$n_{j+1} = \min(n_j, x_{j+1}) \tag{42}$$

Note that for the initial value of the minimum, that is, the minimum $n_1$, the sensor data $x_1$ at the same time is preferably substituted.

Next, a calculation procedure regarding the sequential calculation of the peak value as an example of a feature will be described. Although there are several definitions of the term "peak value", this specification defines the peak value $p_j$ from the first time point to the j-th time point by Formula (43) below.
Formula 43:

$$p_j = \max(|x_1|, \ldots, |x_j|) \tag{43}$$

In the definition of Formula (43), the peak value is the largest absolute value among the sensor data $x_1$ to $x_j$. The sequential calculation method for the peak value can be implemented with the following method. The peak value $p_j$ at the j-th time point is held, and the larger one of the sensor data $x_{j+1}$ at the (j+1)-th time point and the peak value $p_j$ at the j-th time point is held as the peak value $p_{j+1}$ at the (j+1)-th time point. That is, the peak value $p_{j+1}$ at the (j+1)-th time point can be sequentially calculated with Formula (44) below.
Formula 44:

$$p_{j+1} = \max(p_j, |x_{j+1}|) \tag{44}$$

For the initial value of the peak value, that is, the peak value $p_1$, the absolute value $|x_1|$ of the sensor data at the same time is preferably substituted. Alternatively, if the maximum $a_j$ and the minimum $n_j$ at the j-th time point are obtained using Formula (40) and Formula (42) described above, the peak value can also be computed with Formula (45) below.
Formula 45:

$$p_j = \max(|a_j|, |n_j|) \tag{45}$$

Similarly, if the maximum $a_{j+1}$ and the minimum $n_{j+1}$ at the (j+1)-th time point are obtained, the peak value can be computed with Formula (46) below.
Formula 46:

$$p_{j+1} = \max(|a_{j+1}|, |n_{j+1}|) \tag{46}$$

As a result, the internal variable which should be held at the j-th time point to compute the peak value $p_{j+1}$ at the (j+1)-th time point is the peak value $p_j$. Note that instead of the peak value $p_j$, the maximum $a_j$ and the minimum $n_j$ may be held.

Next, a calculation procedure regarding the sequential calculation of the peak-peak value as an example of a feature will be described. The peak-peak value is the difference between the maximum and the minimum. The peak-peak value may also be called peak-to-peak.

The peak-peak value $pp_j$ for the sensor data $x_1$ to $x_j$ from the first time point to the j-th time point is defined by the following known Formula (47).
Formula 47:

$$pp_j = a_j - n_j \tag{47}$$

That is, the peak-peak value $pp_j$ is instantly computed by sequentially calculating the maximum $a_j$ and the minimum $n_j$ using Formula (40) and Formula (42) described above.

Similarly, if the maximum $a_{j+1}$ and the minimum $n_{j+1}$ at the (j+1)-th time point are obtained, the peak-peak value $pp_{j+1}$ can be computed with the following known Formula (48).
Formula 48:

$$pp_{j+1} = a_{j+1} - n_{j+1} \tag{48}$$

As a result, the internal variables which should be held at the j-th time point to compute the peak-peak value $pp_{j+1}$ at the (j+1)-th time point are the maximum $a_j$ and the minimum $n_j$.

Next, a calculation procedure regarding the sequential calculation of the peak factor as an example of a feature will be described. The peak factor $pr_j$ for the sensor data $x_1$ to $x_j$ from the first time point to the j-th time point is defined by Formula (49) below.

Formula 49

$$pr_j = \frac{p_j}{r_j} \qquad (49)$$

As indicated in Formula (49), the peak factor $pr_j$ is a value obtained by dividing the peak value $p_j$ by the root mean square $r_j$. The peak factor $pr_j$ may also be called peak-to-RMS or crest factor. Note that if it is clear that sensor data takes a value biased in the positive direction, the maximum $a_j$ may be used instead of the peak value $p_j$.

Similarly, the peak factor $pr_{j+1}$ for the sensor data $x_1$ to $x_{j+1}$ from the first time point to the (j+1)-th time point is computed with Formula (50) below.

Formula 50

$$pr_{j+1} = \frac{p_{j+1}}{r_{j+1}} \qquad (50)$$

That is, the peak factor $pr_{j+1}$ is instantly computed by sequentially calculating the peak value $p_{j+1}$ using Formula (44) or Formula (45) described above, and sequentially calculating the root mean square $r_{j+1}$ using Formula (19).

As a result, the internal variables which should be held at the j-th time point to compute the peak factor $pr_{j+1}$ at the (j+1)-th time point are the peak value $p_j$ and the square $r_j^2$ of the root mean square. Note that instead of the peak value $p_j$, the maximum $a_j$ and the minimum $n_j$ may be held. In addition, the root mean square $r_j$ may be held instead of the square $r_j^2$ of the root mean square.

As described above, the internal variable calculation unit 1003 sequentially calculates the internal variables for calculating each feature. The internal variable calculation unit 1003 performs this sequential calculation from j=1 to j=N−1. Consequently, the feature calculation unit 1004 can determine the features corresponding to the sensor data $x_1$ to $x_j$ at the first to N-th time points. Note that the update formulas and the internal variables held by the internal variable holding unit 1002 vary depending on the type of feature. What is common to all the types of features is that the internal variable holding unit 1002 holds internal variables, the internal variable calculation unit 1003 sequentially calculates internal variables, and the feature calculation unit 1004 calculates a feature based on the internal variables.

Figure 6:
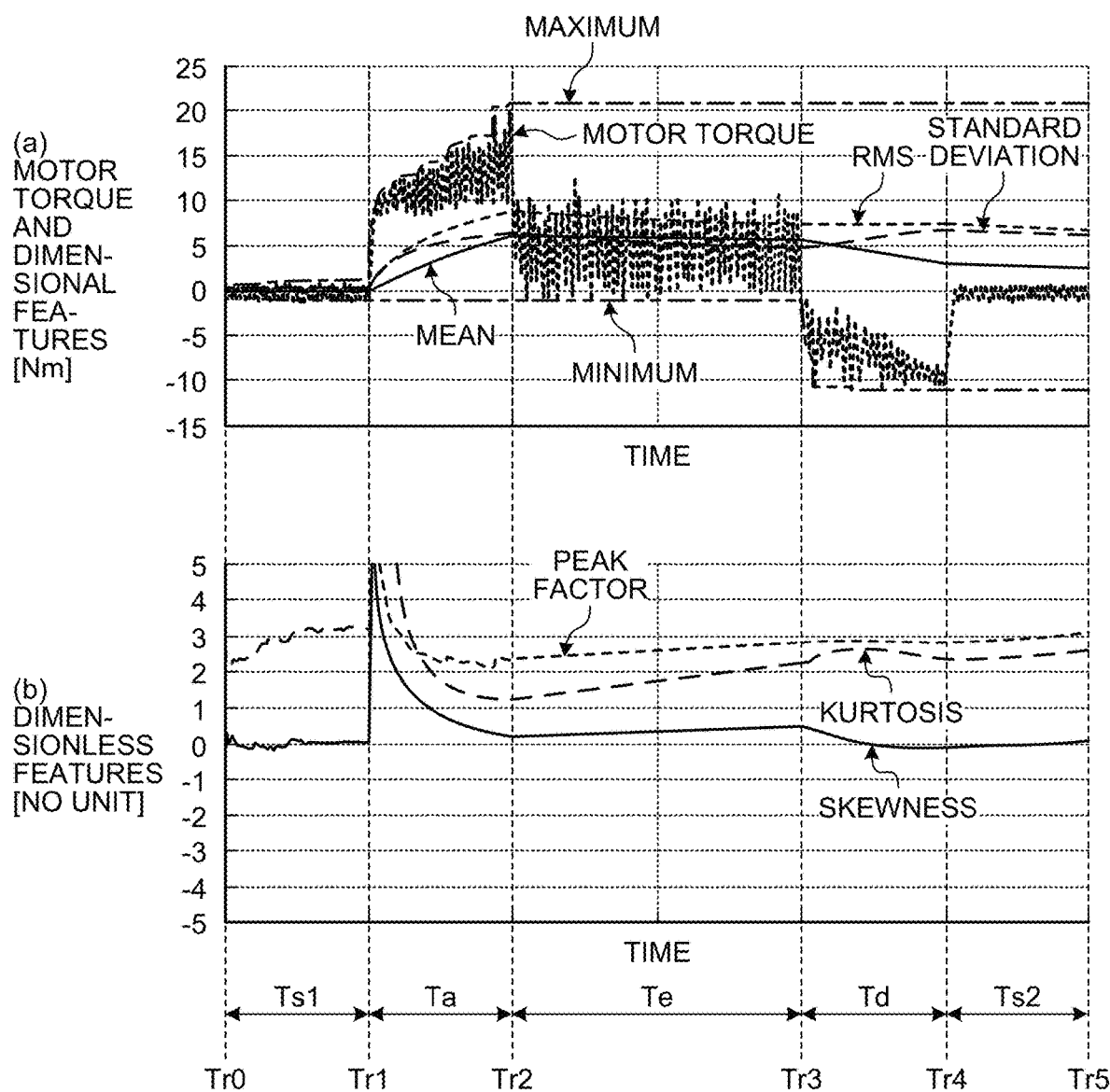
FIG. 6 is a diagram illustrating time-series waveforms of the motor torque and various types of features in the first embodiment.

Next, results of sequentially calculating features of the motor torque, which is one type of sensor data, using the above-described method will be described with reference to FIG. 6. FIG. 6 is a diagram illustrating time-series waveforms of the motor torque and various types of features in the first embodiment. Note that hereinafter, the notation of symbols assigned to features and the like is appropriately omitted in order to avoid the complexity of description.

FIG. 6(a) illustrates the waveform of the motor torque similar to that illustrated in FIG. 5(b). The horizontal axis in FIGS. 6(a) and 6(b) represents time. FIG. 6(a) also illustrates the time-series waveforms of the mean, the standard deviation, the root mean square (RMS), the maximum, and the minimum having the same unit [Nm] as the motor torque, among the dimensional features. The peak-peak value, which is the difference between the maximum and the minimum, is not illustrated for simplicity. The peak value, which indicates the one with a larger absolute value of the maximum and the minimum, is not illustrated for simplicity. The variance, which is the square of the standard deviation, is not illustrated because of the difference in unit.

FIG. 6(b) illustrates the time-series waveforms of the skewness, the kurtosis, and the peak factor, which are dimensionless features, i.e. features having no unit. Next, the behavior of each feature illustrated in FIGS. 6(a) and 6(b) will be described.

The mean is approximately zero in period Ts1, gradually increases in period Ta, slightly decreases in period Te, gradually decreases in period Td, and slightly decreases in period Ts2.

The standard deviation is a substantially constant small value in period Ts1, gradually increases in period Ta, slightly decreases in period Te, gradually increases in period Td, and slightly decreases in period Ts2.

The root mean square is a substantially constant small value in period Ts1, gradually increases in period Ta, slightly decreases in period Te, is substantially constant in period Td, and slightly decreases in period Ts2.

The maximum is a substantially constant small positive value in period Ts1, increases every time the motor torque exceeds the past maximum in period Ta, and is constant in periods Te, Td, and Ts2.

The minimum is a substantially constant small negative value in period Ts1, is constant in periods Ta and Te, decreases every time the motor torque exceeds the past minimum in period Td, and is constant in period Ts2.

The skewness is approximately zero in period Ts1, sharply increases to a large positive value at time Tr1 at which period Ta starts, then gradually decreases to a small value in period Ta, slightly increases in period Te, slightly decreases in period Td, and slightly increases in period Ts2.

The kurtosis increases from about two to about three in period Ts1, sharply increases to a large positive value at time Tr1 at which period Ta starts, then gradually decreases to a small value in period Ta, slightly increases in period Te, slightly increases and then decreases in period Td, and slightly increases in period Ts2.

The peak factor increases from about two to about three in period Ts1, sharply increases to a large positive value at time Tr1 at which period Ta starts, then gradually decreases to a small value in period Ta, slightly increases in period Te, is almost constant in period Td, and slightly increases in period Ts2.

The features at each time point illustrated in FIGS. 6(a) and 6(b) are the result of the sequential calculation of the features with respect to the motor torque at time points earlier than each time point. Therefore, taking the mean as an example, the value computed through batch calculation by holding the motor torque of the entire period (Ts1+Ta+Te+Td+Ts2) in FIG. 6(a) matches the sequentially-computed value at time Tr5, which is the final time in FIG. 6(a).

Note that in FIG. 6, in order to make the transition of the features more likely to change, the feature calculation unit 1004 also calculates each feature in every acquisition cycle of sensor data. Here, in the case of calculating a feature for the sensor data over a certain period, the internal variable calculation unit 1003 needs to sequentially calculate the internal variables in every acquisition cycle of sensor data. In contrast, in the case of using a feature that does not include itself as an internal variable, such as the skewness expressed by Formula (29) or the kurtosis expressed by Formula (38), for example, the feature calculation unit 1004 may calculate the feature as necessary. An example of such a case is that the computation of a feature is required at only one point with respect to the sensor data over the period from time Tr0 to time Tr5, and meanwhile the transition of the feature is unnecessary. In such a case, the feature calculation unit 1004 may be configured to calculate the feature only once at time Tr5, when the number of data points N of sensor data reaches 12000. This configuration enables a reduction in the calculation load of the information processing apparatus 1000.

Figure 7:
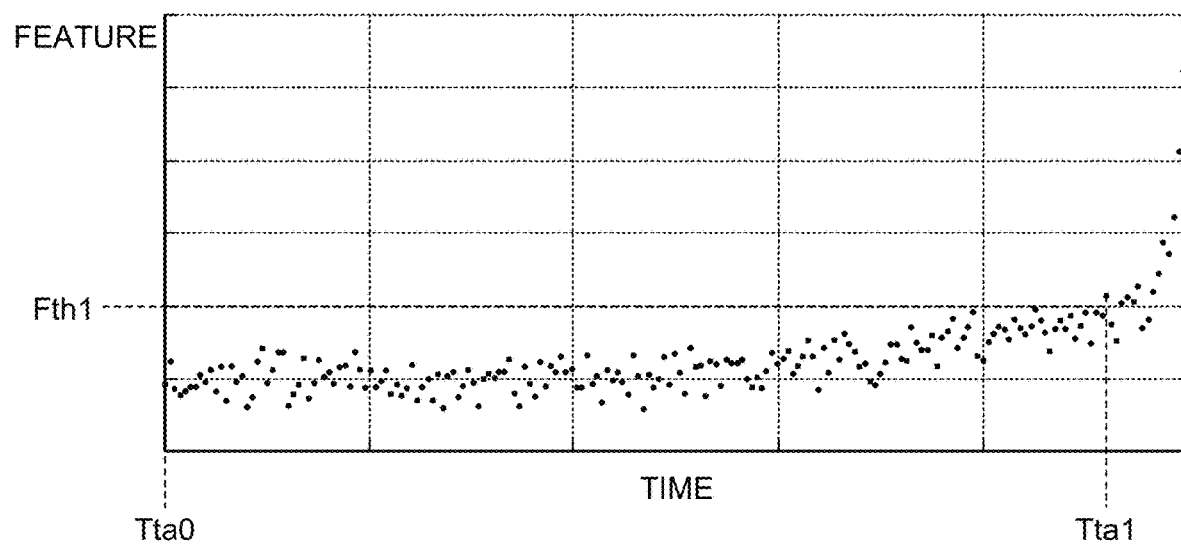
FIG. 7 is a diagram illustrating an example of changes in feature over time in the first embodiment.

Next, a procedure in which the state diagnosis unit 1006 diagnoses the state of the mechanical apparatus 1008 using features will be described with reference to FIG. 7. FIG. 7 is a diagram illustrating an example of changes in feature over time in the first embodiment. FIG. 7 illustrates a result of periodically plotting a feature calculated with the above-described method. The term "periodically" means, for example, every month. The horizontal axis in FIG. 7 is time and represents the operating time of the mechanical apparatus 1008.

The state diagnosis unit 1006 provides a threshold Fth1 for the feature, and diagnoses the mechanical apparatus 1008 as having an anomaly when the feature exceeds the threshold Fth1. The feature may be any of the features described above. In addition, a plurality of features may be calculated, and an individual threshold may be set for each feature.

In FIG. 7, time Tta0 is the operation start time. The feature keeps smaller than the threshold Fth1 while fluctuating to some extent from time Tta0 to before time Tta1. When the feature is less than the threshold Fth1, the state diagnosis unit 1006 diagnoses the mechanical apparatus 1008 as normal, and outputs the diagnosis result.

In the example of FIG. 7, the average value of the feature gradually increases with the lapse of time, and the feature exceeds the threshold Fth1 at time Tta1. In this case, the state diagnosis unit 1006 diagnoses the mechanical apparatus 1008 as having an anomaly at time Tta1, and outputs the diagnosis result.

There are various ways of determining the threshold Fth1. For example, the threshold Fth1 may be determined based on the feature associated with a past anomaly in another mechanical apparatus. In addition, the threshold Fth1 may be determined with reference to the feature obtained immediately after the start of operation of the mechanical apparatus 1008. In addition, the threshold Fth1 may be dynamically set. For example, a plurality of mechanical apparatuses 1008 may be operated, and meanwhile the features thereof may be individually calculated, so that the threshold Fth1 can be periodically changed by considering the variation in feature between the apparatuses. In addition, the threshold Fth1 may be determined based on the feature computed by a simulation or the like in which the properties of the mechanical apparatus 1008 are considered. In the present embodiment, the threshold Fth1 represents the upper limit of a normal state. However, if a feature that is more likely to indicate anomaly as the value decreases is used, the lower limit of a normal state may be set as the threshold Fth1. Furthermore, two thresholds consisting of the upper limit and the lower limit may be used in combination. In addition, the number of diagnosis results need not necessarily be one, and the diagnosis may be made on a plurality of features, and a diagnosis result may be output for each feature.

In the present embodiment, the mechanical apparatus 1008 is diagnosed as an anomaly once the feature exceeds the threshold Fth1, but this method is only an example. In order to reduce wrong diagnosis, or erroneous determination, due to the influence of noise or the like, a statistical method such as an examination (statistical test) based on the distribution of anomaly degrees in a certain period may be adopted.

Figure 8:
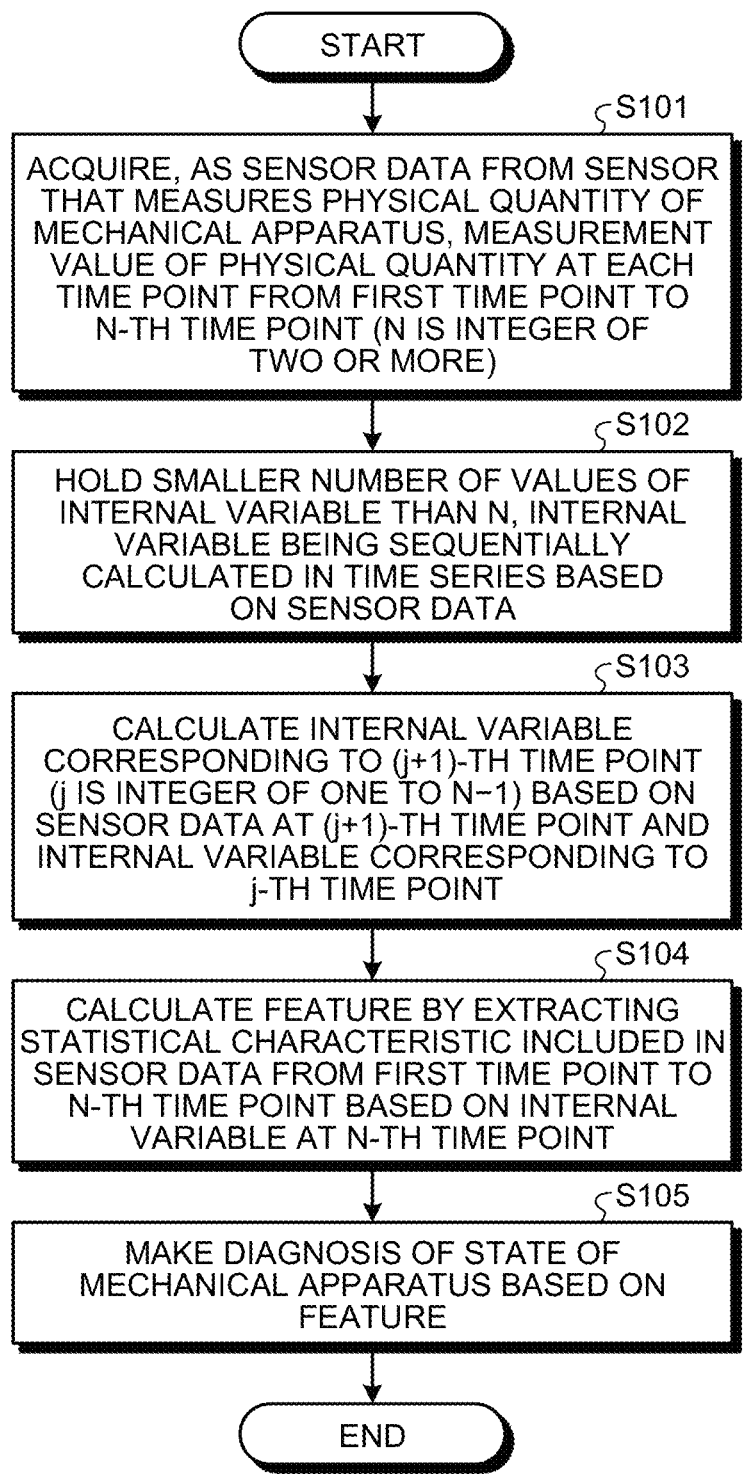
FIG. 8 is a flowchart for explaining an information processing method according to the first embodiment.

The flowchart illustrated in FIG. 8 is derived from the processing described above. FIG. 8 is a flowchart for explaining an information processing method according to the first embodiment.

First, the sensor data acquisition unit 1001 acquires, as sensor data from the sensor 1010 that measures a physical quantity of the mechanical apparatus 1008, the measurement value of the physical quantity at each time point from the first time point to the N-th time point (N is an integer of two or more) (step S101). The internal variable holding unit 1002 holds a smaller number of values of an internal variable than N, the internal variable being sequentially calculated in time series based on the sensor data (step S102). The internal variable calculation unit 1003 calculates the internal variable corresponding to the (j+1)-th time point (j is an integer of one to N−1) based on the sensor data at the (j+1)-th time point and the internal variable corresponding to the j-th time point (step S103). The feature calculation unit 1004 calculates a feature by extracting a statistical characteristic included in the sensor data from the first time point to the N-th time point based on the internal variable at the N-th time point (step S104). The state diagnosis unit 1006 makes a diagnosis of the state of the mechanical apparatus based on the feature (step S105).

Note that the flowchart illustrated in FIG. 8 may include another step of executing initialization processing of setting the internal variable at the first time point to a value between a preset maximum and a preset minimum.

As described above, according to the information processing apparatus in the first embodiment, the sensor data acquisition unit acquires measurement values of a physical quantity of a mechanical apparatus measured by a sensor, and holds, as sensor data, measurement values from a first time point to an N-th time point (N is an integer of two or more) among the measurement values. The internal variable holding unit holds a smaller number of values of an internal variable than the N, the internal variable being sequentially calculated in time series based on the sensor data. The internal variable calculation unit calculates the internal variable corresponding to a (j+1)-th time point (j is an integer of one to N−1) based on the sensor data at the (j+1)-th time point and the internal variable corresponding to a j-th time point. The feature calculation unit calculates a feature by extracting a statistical characteristic included in the sensor data from the first time point to the N-th time point based on the internal variable at the N-th time point. The information processing apparatus thus configured does not need to hold the sensor data from the first time point to the N-th time point by holding a smaller number of values of an internal variable than N. This brings about an unprecedented remarkable effect that feature calculation processing can be performed without using a computer having a high calculation capability and a computer having a large storage capacity.

In addition, the information processing apparatus according to the first embodiment includes a state diagnosis unit that makes a diagnosis of the state of the mechanical apparatus based on the feature. This makes it possible to perform information processing for diagnosing the state of the mechanical apparatus without using a computer having a high calculation capability and a computer having a large storage capacity.

Note that the information processing apparatus according to the first embodiment may include an initialization processing unit that executes initialization processing of setting the internal variable at the first time point to a value between a preset maximum and a preset minimum. This initialization processing unit enables a reduction in the probability of erroneous determination and an increase in the accuracy of diagnosis processing.

According to the information processing method in the first embodiment, in the first step, from a sensor that measures a physical quantity of a mechanical apparatus, a measurement value of the physical quantity at each time point from a first time point to an N-th time point (N is an integer of two or more) is acquired as sensor data. In the second step, a smaller number of values of an internal variable than N are held, the internal variable being sequentially calculated in time series based on the sensor data. In the third step, the internal variable corresponding to a (j+1)-th time point (j is an integer of one to N−1) is calculated based on the sensor data at the (j+1)-th time point and the internal variable corresponding to a j-th time point. In the fourth step, a feature is calculated by extracting a statistical characteristic included in the sensor data from the first time point to the N-th time point based on the internal variable at the N-th time point. In the fifth step, a diagnosis of the state of the mechanical apparatus is made based on the feature. This information processing method including the processes of the first to fifth steps eliminates the need to hold the sensor data from the first time point to the N-th time point by holding a smaller number of values of an internal variable than N. This brings about an unprecedented remarkable effect that information processing for diagnosing the state of the mechanical apparatus can be performed without using a computer having a high calculation capability and a computer having a large storage capacity.

Note that the information processing method according to the first embodiment may include a step of executing initialization processing of setting the internal variable at the first time point to a value between a preset maximum and a preset minimum, in addition to the first to fifth steps. This initialization processing step enables a reduction in the probability of erroneous determination and an increase in the accuracy of diagnosis processing.

Second Embodiment

Figure 9:
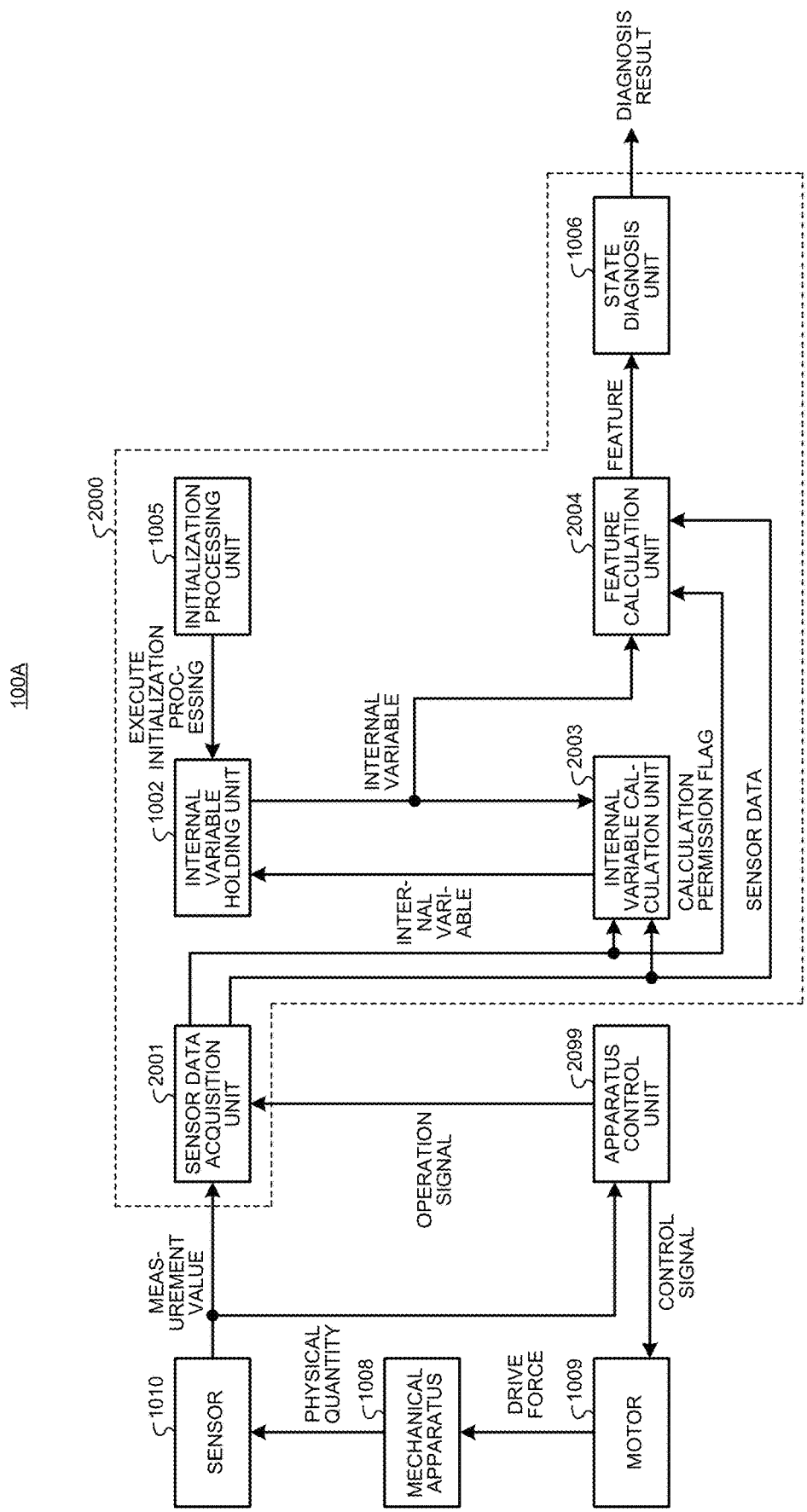
FIG. 9 is a diagram illustrating an exemplary configuration of an information processing system including an information processing apparatus according to a second embodiment.

FIG. 9 is a diagram illustrating an exemplary configuration of an information processing system 100A including an information processing apparatus 2000 according to the second embodiment. The information processing system 100A illustrated in FIG. 9 has the configuration of the information processing system 100 illustrated in FIG. 1, except that the information processing apparatus 1000 is replaced with the information processing apparatus 2000, and the apparatus control unit 1099 is replaced with an apparatus control unit 2099. In the information processing apparatus 2000, the sensor data acquisition unit 1001 is replaced with a sensor data acquisition unit 2001, the internal variable calculation unit 1003 is replaced with an internal variable calculation unit 2003, and the feature calculation unit 1004 is replaced with a feature calculation unit 2004. Other parts of the configuration are identical or equivalent to those of the information processing system 100 illustrated in FIG. 1. Note that identical or equivalent components are denoted by the same reference signs, and redundant descriptions are omitted.

In addition to the processing of the sensor data acquisition unit 1001, the sensor data acquisition unit 2001 generates a calculation permission flag for determining whether to update an internal variable based on an operation signal. More generally, the sensor data acquisition unit 2001 determines two or more time points between the first time point and the j-th time point (j is an integer of one to N−1 (where N is an integer of two or more)) based on at least one of an acquisition cycle that is an interval of time for acquiring the sensor data, an operation signal representing a status of operation of the mechanical apparatus 1008, and a data value in the sensor data, and generates a calculation permission flag for updating an internal variable based on the two or more time points determined.

In addition to the processing of the internal variable calculation unit 1003, the internal variable calculation unit 2003 updates the internal variable if the calculation permission flag includes an indication that the internal variable is to be updated. On the other hand, if the calculation permission flag does not include an indication that the internal variable is to be updated, the internal variable calculation unit 2003 performs processing of carrying over the value of the internal variable at the previous time. More generally, for each u-th time point (u is an integer of one to j (where j is an integer of one to N−1, and N is an integer of two or more)) indicated by the calculation permission flag, the internal variable calculation unit 2003 sets the internal variable at a (u+1)-th time point to the value of the internal variable at the u-th time point.

In addition to the processing of the feature calculation unit 1004, the feature calculation unit 2004 updates the feature if the calculation permission flag includes an indication that the feature is to be updated. If the calculation permission flag does not include an indication that the feature is to be updated, the feature calculation unit 2004 performs processing of carrying over the feature at the previous time.

In addition to the processing of the apparatus control unit 1099, the apparatus control unit 2099 located outside the information processing apparatus 2000 outputs an operation signal representing the status of operation of the mechanical apparatus 1008. In some cases where the mechanical apparatus 1008 is a mechanical apparatus driven by a motor, for example, sensor data with less noise can be obtained by using features at a constant speed, so that the state of the mechanical apparatus 1008 can be estimated with high accuracy. Therefore, the configuration in which the values of internal variables and features are updated only when the motor 1009 has a constant speed makes it possible to calculate the features more useful for the state diagnosis of the mechanical apparatus 1008.

Figure 10:
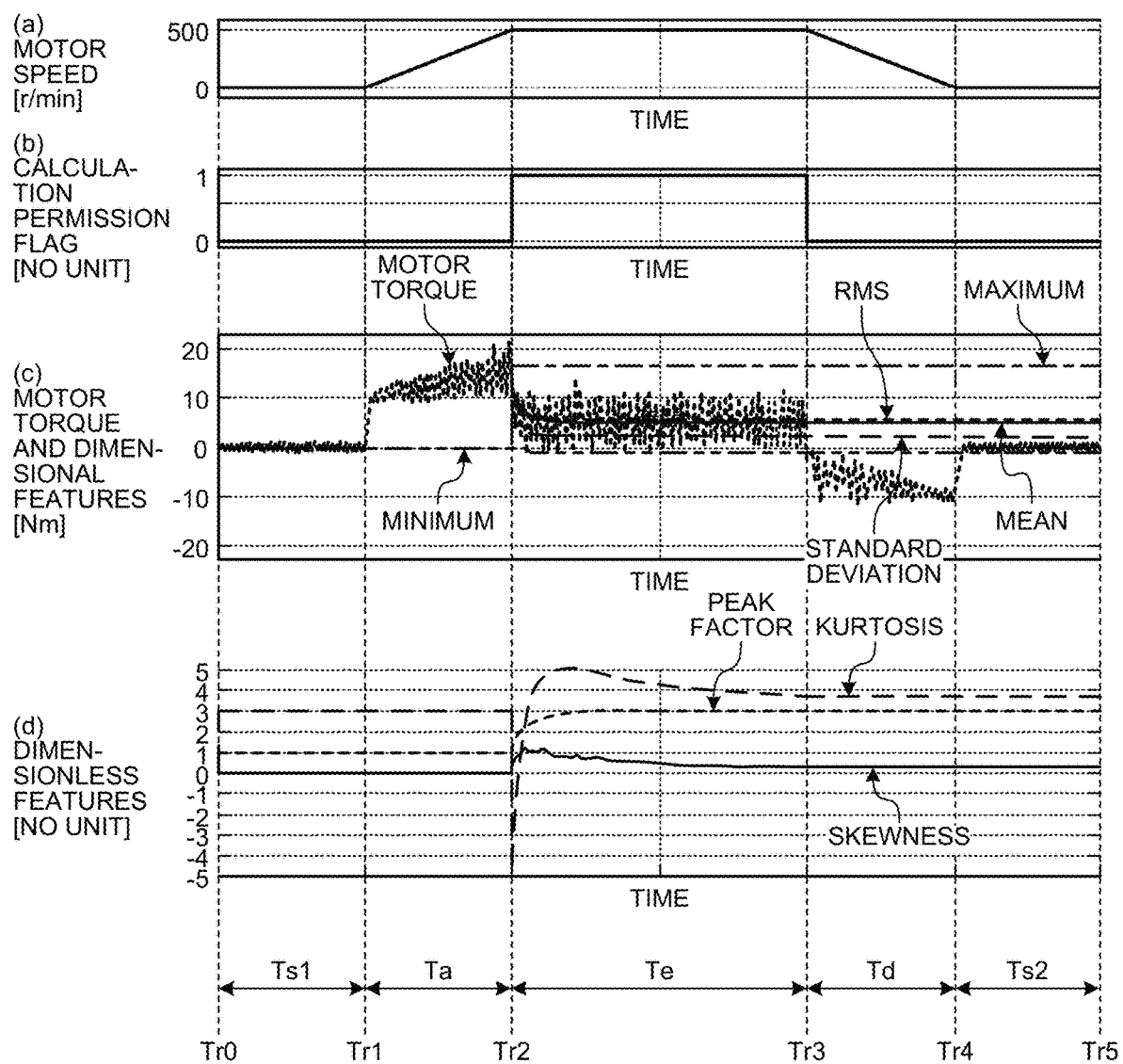
FIG. 10 is a diagram illustrating time-series waveforms of the motor torque and various types of features in the second embodiment.

Next, results of sequentially calculating features of the motor torque, which is one type of sensor data, using the above-described method will be described with reference to FIG. 10. FIG. 10 is a diagram illustrating time-series waveforms of the motor torque and various types of features in the second embodiment.

FIG. 10(a) illustrates the time-series waveform of the motor speed identical to the one illustrated in FIG. 5(a). FIG. 10(b) illustrates the time-series waveform of the calculation permission flag determined by the sensor data acquisition unit 2001.

An example of how to show the result of the calculation permission flag is to set the flag value to "1" when the internal variables are to be updated, and set the flag value to "0" when the internal variables are not to be updated. The sensor data acquisition unit 2001 sets the flag value of the calculation permission flag to "1" in period Te from time Tr2 to time Tr3 so that the internal variables are updated when the speed is not "0" and is constant. In addition, in every period except period Te, namely periods Ts1, Ta, Td, and Ts2, the sensor data acquisition unit 2001 sets the flag value of the calculation permission flag to "0". Note that FIG. 10 shows an example in which the constant speed is 500 [r/min].

One of the reasons why the internal variables are not updated at a speed of zero is that the mechanical apparatus 1008 does not operate when the motor 1009 is stationary, and information corresponding to the state of the mechanical apparatus 1008 does not appear in the sensor data. However, depending on the configuration of the mechanical apparatus 1008, information corresponding to the state of the mechanical apparatus 1008 may appear in the sensor data even when the motor 1009 is stationary. In such a case, the internal variables may be configured to be updated even in the stationary state. Note that there is no restriction on the operation in the case that the flag value of the calculation permission flag is "0" as long as the internal variables and the features do not change. For example, the calculation may be performed such that the current value is overwritten with the previous value, or the calculation itself may be skipped.

Next, as a method of determining the calculation permission flag, an example in which the calculation permission flag is determined from an operation signal representing the status of operation of the mechanical apparatus 1008 will be described. In this example, two of the speed and the acceleration of the motor are used as operation signals. When the absolute value of the acceleration of the motor is small and the absolute value of the speed is large, the flag value of the calculation permission flag is set to "1". The reference acceleration and the reference speed are preferably determined in advance with reference to the specifications of the mechanical apparatus 1008 or the motor 1009. The operation signals are obtained from the apparatus control unit 2099.

If the operation of the motor 1009 is determined in advance, the motor speed need not necessarily be referred to. For example, the flag value of the calculation permission flag may be set to "1" at a predetermined time after the motor 1009 starts to operate, and the flag value of the calculation permission flag may be set to "0" after the lapse of another predetermined time. In the case of performing these processes, it is possible to refer to the sampling period, i.e. the time interval for acquiring sensor data.

FIG. 10(c) illustrates the time-series waveform of the motor torque similar to that illustrated in FIG. 5(b). FIG. 10(c) also illustrates the time-series waveforms of the same features as those illustrated in FIG. 6(a). FIG. 10(d) illustrates the time-series waveforms of the same features as those illustrated in FIG. 6(b).

The values of any of the features in FIGS. 10(c) and 10(d) do not change in periods Ts1, Ta, Td, and Ts2 excluding period Te. This is because, as indicated by the calculation permission flag in FIG. 10(c), the internal variable calculation unit 2003 and the feature calculation unit 2004 are configured such that the internal variables and the features are not updated in any period except period Te. On the other hand, in period Te, all the features are updated as needed, and converge to a substantially constant value by time Tr3, which is the end point of period Te. This configuration allows for estimation of the state of the mechanical apparatus 1008 with higher accuracy, in addition to the effect of the first embodiment.

As described above, according to the information processing apparatus in the second embodiment, the sensor data acquisition unit determines two or more time points between the first time point and the j-th time point based on at least one of an acquisition cycle that is an interval of time for acquiring the sensor data, an operation signal representing a status of operation of the mechanical apparatus, and a data value in the sensor data, and generates a calculation permission flag based on the two or more time points determined. For each u-th time point (u is an integer of one to j) indicated by the calculation permission flag, the internal variable calculation unit sets the internal variable at a (u+1)-th time point to the value of the internal variable at the u-th time point. The information processing apparatus thus configured can obtain sensor data with less noise according to the operation status of the mechanical apparatus. This brings about not only the effect of the first embodiment but also an additional effect that the state of the mechanical apparatus can be estimated with higher accuracy.

Third Embodiment

Figure 11:
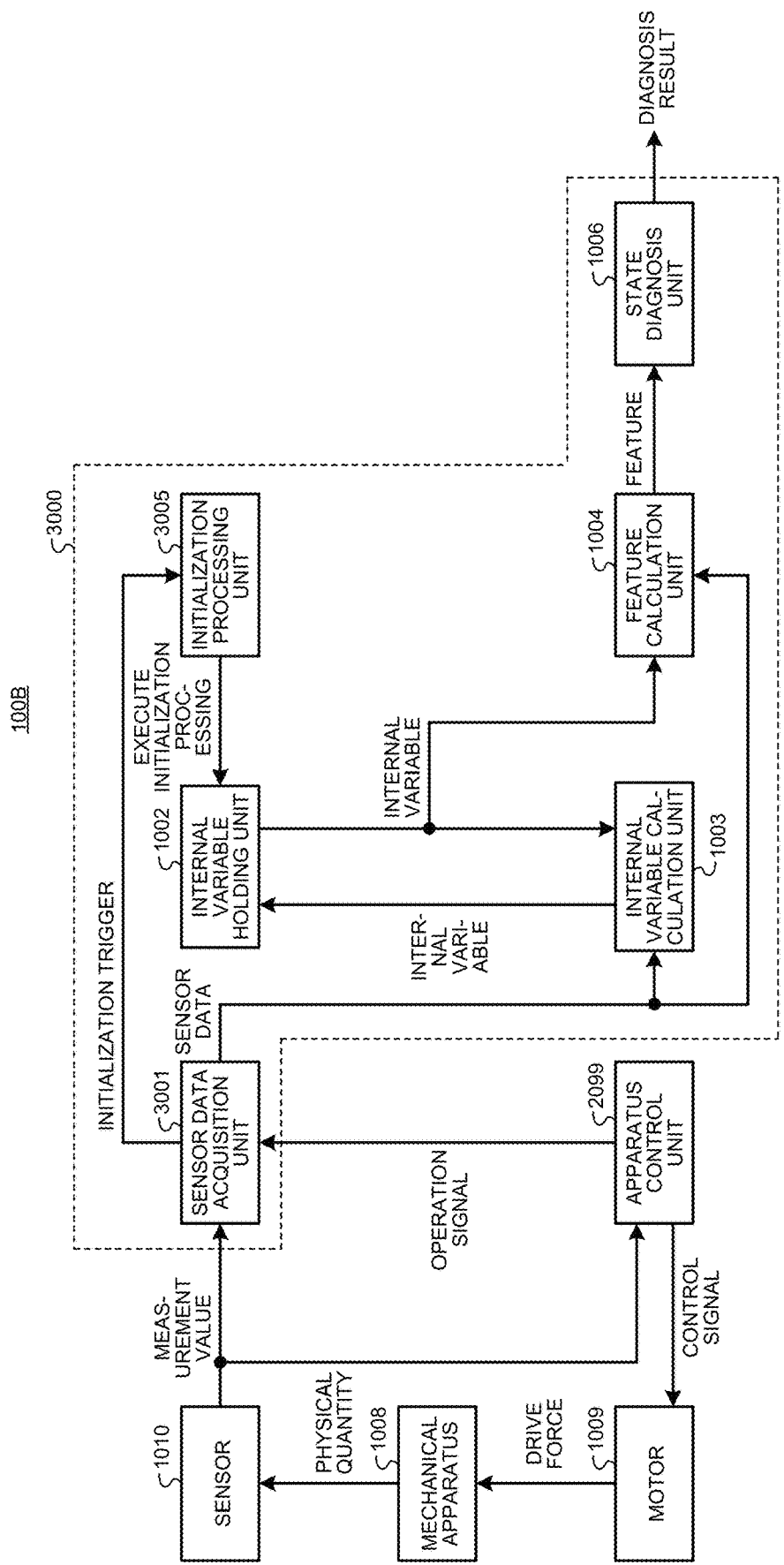
FIG. 11 is a diagram illustrating an exemplary configuration of an information processing system including an information processing apparatus according to a third embodiment.

FIG. 11 is a diagram illustrating an exemplary configuration of an information processing system 100B including an information processing apparatus 3000 according to the third embodiment. The information processing system 100B illustrated in FIG. 11 has the configuration of the information processing system 100A illustrated in FIG. 9, except that the information processing apparatus 2000 is replaced with the information processing apparatus 3000. In the information processing apparatus 3000, the sensor data acquisition unit 2001 is replaced with a sensor data acquisition unit 3001, and the initialization processing unit 1005 is replaced with an initialization processing unit 3005. Other parts of the configuration are identical or equivalent to those of the information processing system 100A illustrated in FIG. 9. Note that identical or equivalent components are denoted by the same reference signs, and redundant descriptions are omitted.

In addition to the processing of the sensor data acquisition unit 1001 illustrated in FIG. 1, the sensor data acquisition unit 3001 generates an initialization trigger for determining a time point at which an internal variable is initialized. More generally and more specifically, the sensor data acquisition unit 3001 determines one or more time points between the first time point and the N-th time point based on at least one of an acquisition cycle that is an interval of time for acquiring the sensor data, an operation signal representing a status of operation of the mechanical apparatus 1008, and the sensor data, and generates an initialization trigger for initializing an internal variable based on the one or more time points determined.

In addition to the processing of the initialization processing unit 1005, the initialization processing unit 3005 performs initialization processing on the internal variable based on the time point indicated by the initialization trigger.

In a case where the mechanical apparatus 1008 is, for example, a mechanical apparatus driven by the motor 1009, the tendency of a feature may vary between different operating situations such as accelerating, rotating at a constant speed, decelerating, and stationary. In such a case, the state of the mechanical apparatus 1008 may be estimated with higher accuracy by calculating the feature separately for each operating situation. Therefore, by initializing the internal variables at a time point when the operating situation changes, such as a time point when the speed change of the motor 1009 is changed, it is possible to calculate the feature more useful for state estimation of the mechanical apparatus 1008.

Figure 12:
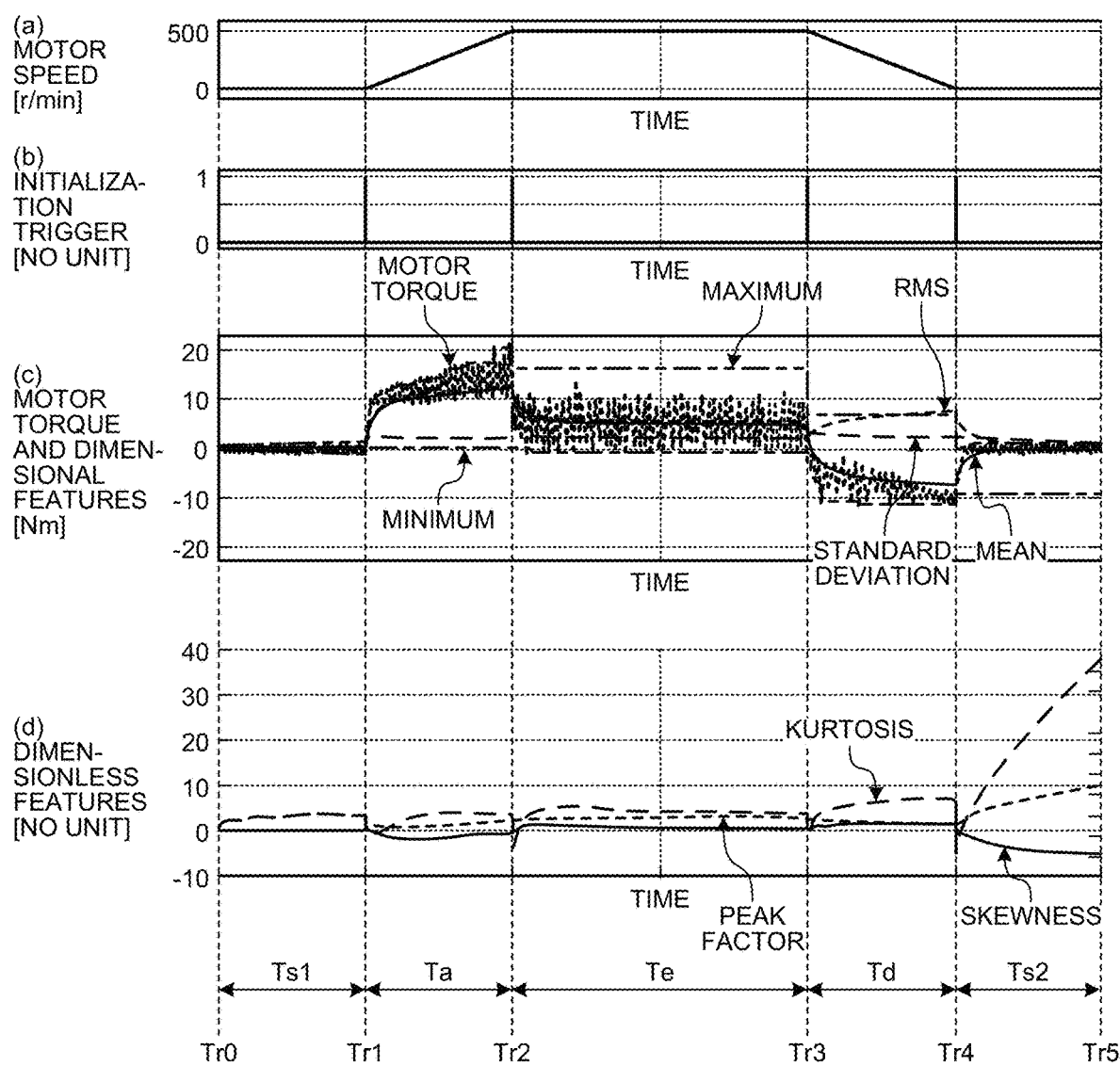
FIG. 12 is a diagram illustrating time-series waveforms of the motor torque and various types of features in the third embodiment.

Next, results of sequentially calculating features of the motor torque, which is one type of sensor data, using the above-described method will be described with reference to FIG. 12. FIG. 12 is a diagram illustrating time-series waveforms of the motor torque and various types of features in the third embodiment.

FIG. 12(*a*) illustrates the time-series waveform of the motor speed identical to the one illustrated in FIG. 5(*a*). FIG. 12(*b*) illustrates the time-series waveform of the initialization trigger determined by the sensor data acquisition unit 3001.

An example of how to show the result of the initialization trigger is to set the signal level to "1" when the internal variables are to be initialized, and set the signal level to "0" when the internal variables are not to be initialized. The sensor data acquisition unit 3001 sets the signal level of the initialization trigger to "1" at times Tr1, Tr2, Tr3, and Tr4 so as to initialize the internal variables at a time point when the motor speed changes, that is, acceleration occurs, and sets the signal level to "0" at other times.

Next, as a method of determining the initialization trigger, an example in which the initialization trigger is determined from an operation signal representing the status of operation of the mechanical apparatus 1008 will be described. In this example, the jerk of the motor, that is, the time derivative of acceleration, is used as an operation signal. When the absolute value of the jerk of the motor is large, the signal level of the initialization trigger is set to "1". The reference level of jerk is preferably determined in advance with reference to the specifications of the mechanical apparatus 1008 or the motor 1009. The operation signal is obtained from the apparatus control unit 2099.

If the operation of the motor 1009 is determined in advance, the motor speed need not necessarily be referred to. For example, the signal level of the initialization trigger may be instantaneously set to "1" at a predetermined time after the motor 1009 starts to operate. Alternatively, the signal level of the initialization trigger may be instantaneously set to "1" every time a specific period of time elapses. In the case of performing these processes, it is possible to refer to the sampling period, i.e. the time interval for acquiring sensor data.

In addition, in order to calculate the feature for each series of sensor data from the start to the stop of operation of the motor 1009, the initialization trigger may be determined such that the initialization processing is performed at the time point when the motor 1009 starts to operate. With this configuration, the operation in which the moving distance of the motor is long and the operation in which the moving distance of the motor is short can be uniformly handled as one positioning operation.

FIG. 12(*c*) illustrates the time-series waveform of the motor torque similar to that illustrated in FIG. 5(*b*). FIG. 12(*c*) also illustrates the time-series waveforms of the same features as those illustrated in FIG. 6(*a*). FIG. 12(*d*) illustrates the time-series waveforms of the same features as those illustrated in FIG. 6(*b*).

All the features in FIGS. 12(*c*) and 12(*d*) start to change immediately after times Tr0, Tr1, Tr2, Tr3, and Tr4, and converge to a substantially constant value by the end of each of periods Ts1, Ta, Te, Td, and Ts2. This configuration allows for estimation of the state of the mechanical apparatus 1008 with higher accuracy, in addition to the effect of the first embodiment. In addition to the effect of the second embodiment, this configuration can also be applied to cases where the motor 1009 operates under a condition without a constant speed, and thus can cover a wider range of applications.

As described above, according to the information processing apparatus in the third embodiment, the sensor data acquisition unit determines one or more time points between the first time point and the j-th time point based on at least one of an acquisition cycle that is an interval of time for acquiring the sensor data, an operation signal representing a status of operation of the mechanical apparatus, and a data value in the sensor data, and generates an initialization trigger for initializing an internal variable based on the one or more time points determined. The initialization processing unit executes processing of initializing the internal variable based on the initialization trigger. The information processing apparatus thus configured can calculate the feature separately for each operating situation. This brings about not only the effect of the first embodiment but also an additional effect that the state of the mechanical apparatus can be estimated with higher accuracy. In addition, the information processing apparatus thus configured can also be applied to cases where the motor operates under a condition without a constant speed, which brings about not only the effect of the second embodiment but also an additional effect that a wider range of applications can be covered regarding the operating conditions.

Fourth Embodiment

Figure 13:
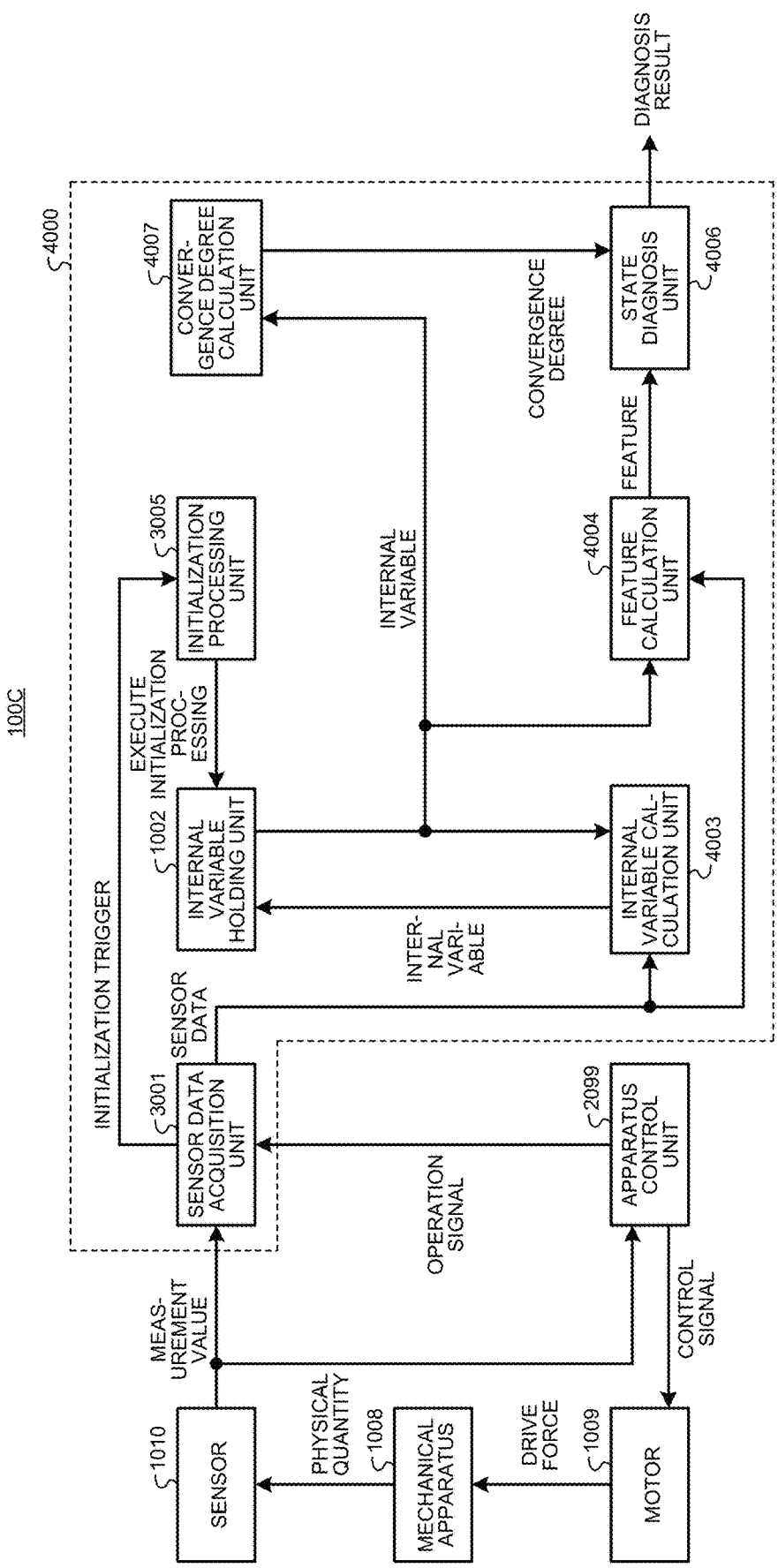
FIG. 13 is a diagram illustrating an exemplary configuration of an information processing system including an information processing apparatus according to a fourth embodiment.

FIG. 13 is a diagram illustrating an exemplary configuration of an information processing system 100C including an information processing apparatus 4000 according to the fourth embodiment. The information processing system 100C illustrated in FIG. 13 has the configuration of the information processing system 100B illustrated in FIG. 11, except that the information processing apparatus 3000 is replaced with the information processing apparatus 4000. In the information processing apparatus 4000, the internal variable calculation unit 1003 is replaced with an internal variable calculation unit 4003, the feature calculation unit 1004 is replaced with a feature calculation unit 4004, and the state diagnosis unit 1006 is replaced with a state diagnosis unit 4006. In addition, a convergence degree calculation unit 4007 is newly provided. Other parts of the configuration are identical or equivalent to those of the information processing system 100B illustrated in FIG. 11. Note that identical or equivalent components are denoted by the same reference signs, and redundant descriptions are omitted.

In addition to the processing of the internal variable calculation unit 1003, the internal variable calculation unit 4003 calculates an internal variable based on a forgetting coefficient. Similarly, in addition to the processing of the feature calculation unit 1004, the feature calculation unit 4004 calculates a feature based on the forgetting coefficient. The forgetting coefficient is a coefficient for weighting that makes the sensor data at a later time have a larger influence on the feature than the sensor data at an earlier time, and has a value larger than zero and smaller than one.

The convergence degree calculation unit 4007 calculates, based on the internal variable, a convergence degree as an index quantitatively indicating the degree of convergence of calculation of the feature. The state diagnosis unit 4006 diagnoses the state of the mechanical apparatus 1008 based on the feature at a time point when the convergence degree calculated by the convergence degree calculation unit 4007 satisfies a certain condition.

Next, processing in the internal variable calculation unit 4003 and the feature calculation unit 4004 will be described in detail. Hereinafter, using specific examples of features: exponential moving mean, exponential moving variance, exponential moving standard deviation, exponential moving root mean square, exponential moving skewness, and exponential moving kurtosis; a sequential calculation method for each feature will be described together with a procedure for deriving the feature.

First, a calculation procedure regarding the sequential calculation of the exponential moving average as an example of a feature will be described. Unlike the above-described mean, a known weighted mean reflects a weight given for each time. As an example of the weighted mean, there is a method of averaging the weighted sensor data having a weight through multiplication of a forgetting coefficient $\lambda$. As described above, the forgetting coefficient $\lambda$ is a coefficient for weighting that gives the sensor data at a later time a larger influence than the sensor data at an earlier time. Hereinafter, this processing is referred to as exponential moving average, and the value thereof is referred to as the exponential moving mean. The exponential moving mean may also be referred to as the exponential smoothed moving mean. In addition, "1–$\lambda$" obtained by subtracting the forgetting coefficient $\lambda$ from "1" is also referred to as the smoothing coefficient.

First, the exponential moving mean $m'_j$ for the sensor data $x_1$ to $x_j$ from the first time point to the j-th time point is defined by Formula (51) below.

Formula 51

$$m'_j = \frac{\sum_{i=1}^{j} \lambda^{j-i} x_i}{\sum_{i=1}^{j} \lambda^{j-i}} \tag{51}$$

For example, given $\lambda=0.9$, the exponential moving mean $m'_3$ at the third time point can be expressed by Formula (52) below.

Formula 52

$$m'_3 = \frac{0.9^2 x_1 + 0.9 x_2 + x_3}{0.9^2 + 0.9 + 1} \tag{52}$$
$$= \frac{0.81 x_1 + 0.9 x_2 + x_3}{2.71}$$

In the exponential moving average using the forgetting coefficient $\lambda$, newer data has a larger coefficient than older data as described above (0.81<0.9<1). This can be interpreted as that newer data, that is, data at a later time, is more weighted in calculating the average. The closer the forgetting coefficient $\lambda$ is to zero, the more likely it is to forget old data, and conversely, the closer the forgetting coefficient $\lambda$ is to one, the less likely it is to forget old data.

Next, consider a sequential calculation method for the exponential moving mean. The exponential moving mean $m'_{j+1}$ for the sensor data $x_1$ to $x_{j+1}$ from the first time point to the (j+1)-th time point can be transformed as in Formula (53) below.

Formula 53

$$m'_{j+1} = \frac{\sum_{i=1}^{j+1} \lambda^{j+1-i} x_i}{\sum_{i=1}^{j+1} \lambda^{j+1-i}} \tag{53}$$
$$= \frac{\lambda^0 x_{j+1} + \sum_{i=1}^{j+1} \lambda^{j+1-i} x_i}{\sum_{i=1}^{j} \lambda^{j+1-i} + \lambda^0}$$
$$= \frac{x_{j+1} + \sum_{i=1}^{j} \lambda^{j+1-i} x_i}{1 + \sum_{i=1}^{j} \lambda^{j+1-i}}$$
$$= \frac{x_{j+1} + \sum_{i=1}^{j+1} \lambda^{j-i} x_i}{\lambda \sum_{i=1}^{j} \lambda^{j-i} + 1}$$
$$= \frac{x_{j+1} + \lambda \left(\sum_{i=1}^{j} \lambda^{j-i}\right) \frac{\sum_{i=1}^{j} \lambda^{j-i} x_i}{\sum_{i=1}^{j} \lambda^{j-i}}}{\lambda \sum_{i=1}^{j} \lambda^{j-i} + 1}$$
$$= \frac{x_{j+1} + \lambda \left(\sum_{i=1}^{j} \lambda^{j-i}\right) m'_j}{\lambda \sum_{i=j}^{j} \lambda^{j-i} + 1}$$

That is, the exponential moving mean $m'_{j+1}$ at the (j+1)-th time point is sequentially computed with Formula (54) below.

Formula 54

$$m'_{j+1} = \frac{x_{j+1} + \lambda L'_j m'_j}{\lambda L'_j + 1} \tag{54}$$

Here, the sensor data $x_{j+1}$ is newly acquired at the (j+1)-th time point. The variable $L'_j$ at the j-th time point can be expressed by Formula (55) below.

Formula 55:

$$L'_j = \sum_{i=1}^{j} \lambda^{j-i} \tag{55}$$

Furthermore, consider a method of sequential calculation of the variable $L'_j$. The variable $L'_{j+1}$ at the (j+1)-th time point can be expressed by Formula (56) below.

Formula 56

$$L'_{j+1} = \sum_{i=1}^{j+1} \lambda^{j+1-i} \tag{56}$$
$$= \sum_{i=1}^{j} \lambda^{j+1-i} + 1$$
$$= \lambda \sum_{i=1}^{j} \lambda^{j-i} + 1$$
$$= \lambda L'_j + 1$$

That is, the variable $L'_{j+1}$ at the (j+1)-th time point can be sequentially calculated with Formula (57) below.

Formula 57:

$$L'_{j+1} = 1 + \lambda L'_j \quad (57)$$

As a result, the internal variables which should be held for calculating the exponential moving mean $m'_{j+1}$ at the (j+1)-th time point are the exponential moving mean $m'_j$ and the variable $L'_j$ at the j-th time point.

In the calculation of the internal variables at the second time point, the initial values $L'_1$ and $m'_1$ of the variable $L'_j$ and the exponential moving mean $m'_j$ are preferably set to zero for ease, or are preferably determined according to, for example, the value of sensor data at the initialization processing in order to avoid fluctuations immediately after the initialization processing.

Next, a method of determining the forgetting coefficient $\lambda$ set in advance will be described. The forgetting coefficient $\lambda$ is desirably set to a value larger than zero and smaller than one. The closer the forgetting coefficient $\lambda$ is to one, the less likely it is to forget past information, and the closer the forgetting coefficient $\lambda$ is to zero, the more likely it is to forget past information. With the forgetting coefficient $\lambda$ of one, the information of the sensor data is not forgotten, and the mathematical formula for sequential calculation matches that in the first embodiment. In contrast, with the forgetting coefficient of zero, the information of all the sensor data is forgotten every time one point in time elapses, and thus, the feature is not computed for the sensor data at two or more points earlier. In many cases, the forgetting coefficient is preferably set to a value close to 1 and less than 1, for example, a value of about 0.9 to 0.999. In the case of calculating the exponential moving average or the like using the forgetting coefficient $\lambda$, most of the weights reflecting the sensor data in the feature are concentrated in the latest short period called a time constant. Here, the time constant $\tau$ can be calculated with Formula (58) below.

Formula 58

$$\tau = \frac{dt}{(1-\lambda)} \quad (58)$$

In Formula (58), "dt" represents the sampling period. In addition, in order to calculate the feature by assigning a large number of weights to the sensor data in the latest specific time slot, the forgetting coefficient $\lambda$ may be determined using the formula "$\lambda = 1 - dt/\tau$". This formula is a modification of Formula (58).

For example, in order to calculate the feature by assigning a large number of weights to the sensor data in the latest 20 milliseconds, the time constant is set to 20 ms. In this case, given that the sampling period is 0.5 ms, the forgetting coefficient is $\lambda = 0.975$. Alternatively, instead of the time constant $\tau$, the forgetting coefficient $\lambda$ may be set using the estimated frequency (unit: rad/s), i.e. the reciprocal of the time constant $\tau$.

Next, a calculation procedure regarding the sequential calculation of the exponential moving variance as an example of a feature will be described. The variance based on the above-described weighted sensor data having a weight for each time through multiplication of the forgetting coefficient $\lambda$ is referred to as the "exponential moving variance".

First, regarding sensor data as a random variable, the variance thereof is known to be expressed by Formula (9) described above. Therefore, the exponential moving variance $v'_j$ at the j-th time point can be expressed by Formula (59) below.

Formula 59

$$v'_j = \frac{\sum_{i=1}^{j} \lambda^{j-i} x_i^2}{\sum_{i=1}^{j} \lambda^{j-i}} - m'^2_j \quad (59)$$

Therefore, the exponential moving variance $v'_{j+1}$ for the sensor data $x_1$ to $x_{j+1}$ from the first time point to the (j+1)-th time point can be expressed by Formula (60) below.

Formula 60

$$v'_{j+1} = \frac{\sum_{i=1}^{j+1} \lambda^{j+1-i} x_i^2}{\sum_{i=1}^{j+1} \lambda^{j+1-i}} - m'^2_{j+1} \quad (60)$$

Transforming Formula (60), the exponential moving variance $v'_{j+1}$ can be expressed by Formula (61) below.

Formula 61

$$\begin{aligned} v'_{j+1} &= \frac{\sum_{i=1}^{j} \lambda^{j+1-i} x_i^2 + \lambda^0 x_{j+1}^2}{\sum_{i=1}^{j} \lambda^{j+1-i} + \lambda^0} - m'^2_{j+1} \\ &= \frac{\lambda \sum_{i=1}^{j} \lambda^{j-i} x_i^2 + x_{j+1}^2}{\lambda \sum_{i=1}^{j} \lambda^{j-i} + 1} - m'^2_{i+1} \\ &= \frac{\lambda \left(\sum_{i=1}^{j} \lambda^{j-i}\right) \frac{\sum_{i=1}^{j} \lambda^{j-i} x_i^2}{\sum_{i=1}^{j} \lambda^{j-i}} + x_{j+1}^2}{\lambda \sum_{i=1}^{j} \lambda^{j-i} + 1} - m'^2_{j+1} \end{aligned} \quad (61)$$

Formula (62) below is derived from Formula (59) and Formula (61).

Formula 62

$$v'_{j+1} = \frac{\lambda \left(\sum_{i=1}^{j} \lambda^{j-i}\right)(v'_j + m'^2_j) + x_{j+1}^2}{\lambda \sum_{i=1}^{j} \lambda^{j-i} + 1} - m'^2_{j+1} \quad (62)$$

Therefore, from Formula (62), the exponential moving variance $v'_{j+1}$ at the (j+)-th time point is sequentially computed with Formula (63) below.

Formula 63

$$v'_{j+1} = \frac{L'_j \lambda (v'_j + m'^2_j) + x_{j+1}^2}{\lambda L'_j + 1} - m'^2_{j+1} \quad (63)$$

As mentioned above, the variable $L'_{j+1}$ at the (j+1)-th time point is sequentially computed with Formula (57) described above. In addition, the exponential moving mean $m'_{j+1}$ at the (j+1)-th time point is sequentially computed with Formula (54) described above. Then, the sensor data $x_{j+1}$ at the (j+1)-th time point is newly acquired at the (j+1)-th time point. As a result, the internal variables which should be held at the j-th time point to compute the exponential moving variance $v'_{j+1}$ at the (j+1)-th time point are the variable $L'_j$, the exponential moving variance $v'_j$, and the exponential moving mean $m'_j$. Note that instead of the exponential moving variance $v'_j$, the exponential moving standard deviation $s'_j$ to be described later may be held.

In the calculation of the internal variables at the second time point, the initial values $L'_1$, $v'_1$, and $m'_1$ of the variable L', the exponential moving variance v', and the exponential moving mean m' are preferably set to zero for ease, or are preferably determined according to, for example, the value of sensor data at the initialization processing in order to avoid fluctuations immediately after the initialization processing.

Next, a calculation procedure regarding the sequential calculation of the exponential moving standard deviation $s'_j$ as an example of a feature will be described. The standard deviation based on the above-described weighted sensor data having a weight for each time through multiplication of the forgetting coefficient $\lambda$ is referred to as the "exponential moving standard deviation".

First, the exponential moving standard deviation $s'_j$ for the sensor data $x_1$ to $x_j$ from the first time point to the j-th time point is defined by Formula (64) below from the exponential moving variance $v'_j$.

Formula 64:

$$s'_j = \sqrt{v'_j} \qquad (64)$$

That is, the exponential moving standard deviation $s'_j$ is instantly computed from the exponential moving variance $v'_j$ sequentially computed with the above procedure. Therefore, the internal variables which should be kept to sequentially calculate the exponential moving standard deviation $s'_j$ are the same as those for the exponential moving variance $v'_j$.

Next, a calculation procedure regarding the sequential calculation of the exponential moving root mean square as an example of a feature will be described. The root mean square based on the above-described weighted sensor data having a weight for each time through multiplication of the forgetting coefficient $\lambda$ is referred to as the "exponential moving root mean square".

First, the exponential moving root mean square $r'_j$ for the sensor data $x_1$ to $x_j$ from the first time point to the j-th time point is defined by Formula (65) below.

Formula 65

$$r'_j = \sqrt{\frac{\sum_{i=1}^{j} \lambda^{j-i} x_i^2}{\sum_{i=1}^{j} \lambda^{j-i}}} \qquad (65)$$

Therefore, the exponential moving root mean square $r'_{j+1}$ for the sensor data $x_1$ to $x_{j+1}$ from the first time point to the (j+1)-th time point can be expressed as Formula (66) below.

Formula 66

$$r'_{j+1} = \sqrt{\frac{\sum_{i=1}^{j+1} \lambda^{j+1-i} x_i^2}{\sum_{i=1}^{j+1} \lambda^{j+1-i}}} \qquad (66)$$

From Formula (65) and Formula (66), the square $r'_{j+1}{}^2$ of the exponential moving root mean square can be expressed as Formula (67) below.

Formula 67

$$
\begin{aligned}
r'_{j+1}{}^2 &= \frac{\sum_{i=1}^{j+1} \lambda^{j+1-i} x_i^2}{\sum_{i=1}^{j+1} \lambda^{j+1-i}} \qquad (67) \\
&= \frac{\sum_{i=1}^{j} \lambda^{j+1-i} x_i^2 + \lambda^0 x_{j+1}^2}{\sum_{i=1}^{j} \lambda^{j+1-i} + \lambda^0} \\
&= \frac{\lambda \sum_{i=1}^{j} \lambda^{j-i} x_{j+1}^2}{\lambda \sum_{i=1}^{j} \lambda^{j-i} + 1} \\
&= \frac{\lambda \frac{\sum_{i=1}^{j} \lambda^{j-i} x_{j+1}^2}{\sum_{i=1}^{j} \lambda^{j-i} + 1} \sum_{i=1}^{j} \lambda^{j-i} x_{j+1}^2}{\lambda \sum_{i=1}^{j} \lambda^{j-i} + 1} \\
&= \frac{\lambda r'_j{}^2 \sum_{i=1}^{j} \lambda^{j-i} + x_{j+1}^2}{\lambda \sum_{i=1}^{j} \lambda^{j-i} + 1}
\end{aligned}
$$

From Formula (67), the square $r'_{j+1}{}^2$ of the exponential moving root mean square at the (j+1)-th time point is sequentially computed with Formula (68) below.

Formula 68

$$r'_{j+1}{}^2 = \frac{\lambda r'_j{}^2 L'_j + x_{j+1}^2}{\lambda L'_j + 1} \qquad (68)$$

As mentioned above, the variable $L^1_{j+1}$ at the (j+1)-th time point is sequentially computed with Formula (57) described above. In addition, the sensor data $x_{j+1}$ is newly acquired at the (j+1)-th time point. As a result, the internal variables which should be held at the j-th time point to compute the square $r'_{j+1}{}^2$ of the exponential moving root mean square at the (j+1)-th time point are the square $r'_j{}^2$ of the exponential moving root mean square and the variable $L'_j$.

In the calculation of the internal variables at the second time point, the initial values $L'_1$ and $r'_1$ of the variable $L'_j$ and the square $r'_j{}^2$ of the exponential moving root mean square are preferably set to zero for ease, or are preferably determined according to, for example, the value of sensor data at the initialization processing in order to avoid fluctuations immediately after the initialization processing.

Next, a calculation procedure regarding the sequential calculation of the exponential moving skewness as an example of a feature will be described. The skewness based on the above-described weighted sensor data having a weight for each time through multiplication of the forgetting coefficient $\lambda$ is referred to as the "exponential moving skewness".

Referring to Formula (22) obtained from Formula (20) described above, the exponential moving skewness $w'_j$ for the sensor data $x_1$ to $x_j$ from the first time point to the j-th time point can be expressed by Formula (69) below.

Formula 69

$$w'_j = \frac{A'_j - 3m'_j B'_j + 2m'^3_j}{s'^3_j} \qquad (69)$$

In addition, the exponential moving mean $m'_j$ in Formula (69) can be sequentially calculated with Formula (54)

described above, and the exponential moving standard deviation $s'_j$ in Formula (69) can be sequentially calculated with Formulas (63) and (64) described above.

Next, consider the sequential calculation regarding the variables $A'_j$ and $B'_j$ at the j-th time point in Formula (69). First, the variables $A'_j$ and $B'_j$ at the j-th time point can be expressed by Formulas (70) and (71) below.

Formula 70

$$A'_j = \frac{\sum_{i=1}^{j} \lambda^{j-i} x_i^3}{\sum_{i=1}^{j} \lambda^{j-i}} \quad (70)$$

Formula 71

$$B'_j = \frac{\sum_{i=1}^{j} \lambda^{j-i} x_i^2}{\sum_{i=1}^{j} \lambda^{j-i}} \quad (71)$$

The variable $A'_{j+1}$ at the (j+1)-th time point can be expressed by Formula (72) below.

Formula 72

$$A'_{j+1} = \frac{\sum_{i=1}^{j+1} \lambda^{j+1-i} x_i^3}{\sum_{i=1}^{j+1} \lambda^{j+1-i}} \quad (72)$$

From Formula (72), the variable $A'_{j+1}$ can be expressed as Formula (73) below.

Formula 73

$$\begin{aligned}
A'_{j+1} &= \frac{\sum_{i=1}^{j+1} \lambda^{j+1-i} x_i^3}{\sum_{i=1}^{j+1} \lambda^{j+1-i}} \\
&= \frac{\sum_{i=1}^{j} \lambda^{j+1-i} x_i^3 + \lambda^0 x_{j+1}^3}{\sum_{i=1}^{j} \lambda^{j+1-i} + \lambda^0} \\
&= \frac{\lambda \sum_{i=1}^{j} \lambda^{j-i} x_i^3 + x_{j+1}^3}{\lambda \sum_{i=1}^{j} \lambda^{j-i} + 1} \\
&= \frac{\lambda \left(\sum_{i=1}^{j} \lambda^{j-i}\right) \frac{\sum_{i=1}^{j} \lambda^{j-i} x_i^3}{\sum_{i=1}^{j} \lambda^{j-i}} + x_{j+1}^3}{\lambda \sum_{i=1}^{j} \lambda^{j-i} + 1} \\
&= \frac{\lambda \left(\sum_{i=1}^{j} \lambda^{j-i}\right) A'_j + x_{j+1}^3}{\lambda \sum_{i=1}^{j} \lambda^{j-i} + 1}
\end{aligned} \quad (73)$$

From Formula (73), the variable $A'_{j+1}$ at the (j+1)-th time point is sequentially computed with Formula (74) below.

Formula 74

$$A'_{j+1} = \frac{\lambda L'_j A'_j + x_{j+1}^3}{\lambda L'_j + 1} \quad (74)$$

Here, the internal variables which should be held at the j-th time point to compute the variable at the (j+1)-th time point are the variables $L'_j$ and $A'_j$. In addition, the variable $L'_{j+1}$ at the (j+1)-th time point is sequentially computed with Formula (57) described above. The variable $B'_j$ at the j-th time point can be expressed by Formula (75) below.

Formula 75

$$\begin{aligned}
B'_j &= \frac{\sum_{i=1}^{j} \lambda^{j-i} x_i^2}{\sum_{i=1}^{j} \lambda^{j-i}} \\
&= r'^2_j
\end{aligned} \quad (75)$$

Here, Formula (75) indicates that the variable $B'_j$ matches the square $r'^2_j$ of the exponential moving root mean square described above, which is sequentially computed with Formula (68) described above. Therefore, the exponential moving skewness $w'_j$ for the sensor data $x_1$ to $x_j$ from the first time point to the j-th time point is computed with Formula (76) below.

Formula 76

$$w'_j = \frac{A'_j - 3m'_j r'^2_j + 2m'^3_j}{s'^3_j} \quad (76)$$

Similarly, the exponential moving skewness $w'_{j+1}$ for the sensor data $x_1$ to $x_{j+1}$ from the first time point to the (j+1)-th time point is computed with Formula (77) below.

Formula 77

$$w'_{j+1} = \frac{A'_{j+1} - 3m'_{j+1} r'^2_{j+1} + 2m'^3_{j+1}}{s'^3_{j+1}} \quad (77)$$

As mentioned above, the variable $A'_{j+1}$ at the (j+1)-th time point is sequentially computed with Formula (74) described above. In addition, the exponential moving mean $m'_{j+1}$ at the (j+1)-th time point is sequentially computed with Formula (54) described above. Then, the square $r'^2_{j+1}$ of the exponential moving root mean square at the (j+1)-th time point is sequentially computed with Formula (68) described above. In addition, the exponential moving standard deviation $s'_{j+1}$ at the (j+1)-th time point is sequentially computed with formula (64) described above. Then, the sensor data $x_{j+1}$ at the (j+1)-th time point is newly acquired at the (j+1)-th time point. As a result, the internal variables which should be held at the j-th time point to compute the exponential moving skewness $w'_{j+1}$ for the sensor data $x_{j+1}$ from the first time point to the (j+1)-th time point are the variables $A'_j$ and $L'_j$, the exponential moving mean $m'_j$, the square $r'^2_j$ of the exponential moving root mean square, and the exponential moving standard deviation $s'_j$. The exponential moving variance $v'_j$ may be held instead of the exponential moving standard deviation $s'_j$. In addition, the exponential moving root mean square $r'_j$ may be held instead of the square $r'^2_j$ of the exponential moving root mean square.

Note that a formula that produces a similar calculation result is also obtained by holding the exponential moving skewness $w'_j$ instead of the variable $A'_j$ for sequential calculation, which is not described here because the formula is complicated. In the calculation of the internal variables at the second time point, the initial values of the variables $A'_j$ and $L'_j$, the exponential moving mean $m'_j$, the square $r'^2_j$ of the exponential moving root mean square, and the exponential moving standard deviation $s'_j$ are preferably set to zero for ease, or are preferably determined according to, for example, the value of sensor data at the initialization processing in order to avoid fluctuations immediately after the initialization processing.

Next, a calculation procedure regarding the sequential calculation of the exponential moving kurtosis as an example of a feature will be described. The kurtosis based on the above-described weighted sensor data having a weight for each time through multiplication of the forgetting coefficient $\lambda$ is referred to as the "exponential moving kurtosis".

Referring to Formula (32) obtained from Formula (30) described above, the exponential moving kurtosis $k'_j$ for the sensor data $x_1$ to $x_j$ from the first time point to the j-th time point can be expressed by Formula (78) below.

Formula 78

$$k'_j = \frac{C'_j - 4m'_j A'_j + 6m'^2_j B'_j - 3m'^4_j}{s'^4_j} \quad (78)$$

Here, the variable $C'_j$ at the j-th time point can be expressed by Formula (79) below.

Formula 79

$$C'_j = \frac{\sum_{i=1}^{j} \lambda^{j-i} x_i^4}{\sum_{i=1}^{j} \lambda^{j-i}} \quad (79)$$

In addition, the variables $A'_j$ and $B'_j$, the exponential moving mean $m'_j$, and the exponential moving standard deviation $s'_j$ in Formula (78) can be sequentially calculated with Formulas (54), (63), (64), (68), (74), and (75) described above.

Next, consider the sequential calculation regarding the variable $C'_j$ at the j-th time point in Formula (79). First, the variable $C'_{j+1}$ at the (j+1)-th time point can be expressed by Formula (80) below.

Formula 80

$$C'_{j+1} = \frac{\sum_{i=1}^{j+1} \lambda^{j+1-i} x_i^4}{\lambda^{j+1-i}} \quad (80)$$

From Formula (79) and Formula (80), the variable $C'_{j+1}$ can be expressed as Formula (81) below.

Formula 81

$$\begin{aligned}
C'_{j+1} &= \frac{\sum_{i=1}^{j+1} \lambda^{j+1-i} x_i^4}{\sum_{i=1}^{j+1} \lambda^{j+1-i}} \\
&= \frac{\sum_{i=1}^{j} \lambda^{j+1-i} x_i^4 + \lambda^0 x_{j+1}^4}{\sum_{i=1}^{j} \lambda^{j+1-i} + \lambda^0} \\
&= \frac{\lambda \sum_{i=1}^{j} \lambda^{j-i} x_i^4 + x_{j+1}^4}{\lambda \sum_{i=1}^{j} \lambda^{j-i} + 1} \\
&= \frac{\lambda \sum_{i=1}^{j} \lambda^{j-i} \frac{\sum_{i=1}^{j} \lambda^{j-i} x_i^4}{\sum_{i=1}^{j} \lambda^{j-i}} + x_{j+1}^4}{\lambda \sum_{i=1}^{j} \lambda^{j-i} + 1} \\
&= \frac{\lambda \left(\sum_{i=1}^{j} \lambda^{j-i}\right) C'_j + x_{j+1}^4}{\lambda \sum_{i=1}^{j} \lambda^{j-i} + 1}
\end{aligned} \quad (81)$$

From Formula (81), the variable $C'_{j+1}$ at the (j+1)-th time point is sequentially computed with Formula (82) below.

Formula 82

$$C'_{j+1} = \frac{\lambda L'_j C'_j + x_{j+1}^4}{\lambda L'_j + 1} \quad (82)$$

Here, as in Formula (75), the variable $B'_j$ matches the square $r'^2_j$ of the exponential moving root mean square described above, and the square $r'^2_j$ of the exponential moving root mean square is sequentially computed with Formula (68) described above. Therefore, the exponential moving kurtosis $k'_j$ for the sensor data $x_1$ to $x_j$ from the first time point to the j-th time point is computed with Formula (83) below.

Formula 83

$$k'_j = \frac{C'_j - 4A'_j m'_j + 6m'^2_j r'^2_j - 3m'^4_j}{s'^4_j} \quad (83)$$

Similarly, the exponential moving kurtosis $k'_{j+1}$ for the sensor data $x_1$ to $x_{j+1}$ from the first time point to the (j+1)-th time point is computed with Formula (84) below.

Formula 84

$$k'_{j+1} = \frac{C'_{j+1} - 4A'_{j+1} m'_{j+1} + 6m'^2_{j+1} r'^2_{j+1} - 3m'^4_{j+1}}{s'^4_{j+1}} \quad (84)$$

As mentioned above, the variable $C'_{j+1}$ at the (j+1)-th time point is sequentially computed with Formula (82) described above. In addition, the variable $A'_{j+1}$ at the (j+1)-th time point is sequentially computed with Formula (74) described above. Then, the exponential moving mean $m'_{j+1}$ at the (j+1)-th time point is sequentially computed with Formula (54) described above. In addition, the square $r'^2_{j+1}$ of the exponential moving root mean square at the (j+1)-th time point is sequentially computed with Formula (68) described above. In addition, the exponential moving standard deviation $s'_{j+1}$ at the (j+1)-th time point is sequentially computed with Formulas (63) and (64) described above. Then, the sensor data $x_{j+1}$ at the (j+1)-th time point is newly acquired at the (j+1)-th time point. The square $r'_{j+1}{}^2$ of the exponential moving root mean square at the (j+1)-th time point is sequentially computed with Formula (68) described above. As a result, the internal variables which should be held at the j-th time point to compute the exponential moving kurtosis $k'_{j+1}$ for the sensor data $x_{j+1}$ from the first time point to the (j+1)-th time point are the variables $A'_j$ and $L'_j$, the exponential moving mean $m'_j$, the square $r'_j{}^2$ of the exponential moving root mean square, and the exponential moving standard deviation $s'_j$. The exponential moving variance $v'_j$ may be held instead of the exponential moving standard deviation $s'_j$. In addition, the exponential moving root mean square $r'_j$ may be held instead of the square $r'_j{}^2$ of the exponential moving root mean square.

Note that a formula that produces a similar calculation result is also obtained by holding the exponential moving skewness $w'_j$ instead of the variable $A'_j$ for sequential calculation, which is not described here because the formula is complicated. In the calculation of the internal variables at the second time point, the initial values of the variables $A'_j$ and $L'_j$, the exponential moving mean $m'_j$, the square $r'_j{}^2$ of the exponential moving root mean square, and the exponential moving standard deviation $s'_j$ are preferably set to zero for ease, or are preferably determined according to, for example, the value of sensor data at the initialization processing in order to avoid fluctuations immediately after the initialization processing.

The exponential moving kurtosis $k'_j$ is known to have a value of about three given that the sensor data has a property close to a normal distribution. Therefore, the initial value $k'_1$ of the exponential moving kurtosis $k'_j$ may be three.

Regarding the calculation of the maximum, the minimum, the peak-peak value, the peak value, and the peak factor (hereinafter simply referred to as the "maximum or the like") with weights in the latest period of time, it is not possible to update the current maximum or the like from the previous maximum or the like unlike in the first embodiment. An exemplary alternative procedure is to hold several candidate values having a high possibility of becoming the maximum or the like as internal variables, and delete the held candidate values after a prescribed time elapses. This enables the calculation of the maximum or the like corresponding to the sensor data in the latest period of time.

Next, a calculation procedure related to the operation of the convergence degree calculation unit 4007 will be described. In the sequential calculation of features using the forgetting coefficient λ, it is possible to calculate from internal variables the convergence degree quantitatively representing the degree of convergence of the sequential calculation. For example, the variable $L'_j$, one of the internal variables, is sequentially calculated with Formula (57), and thus asymptotically approaches a value of $1/(1-\lambda)$ regardless of the input sensor data. Therefore, given that the initial value $L'_1$ of the variable $L'_j$ is zero or more and less than $1/(1-\lambda)$, the convergence degree $d_i$ can be defined by Formula (85) below so that the convergence takes a value of zero to one.

Formula 85:

$$d_i = (1-\lambda)L'_j \qquad (85)$$

In the present embodiment, the convergence degree is calculated using Formula (85), but the convergence degree is not limited to the above, and may be defined as any value that increases with the convergence of calculation. Here, a value that monotonically increases with the convergence of calculation and asymptotically approaches a specific value is suitable for use as a reference. For example, the convergence degree is defined as $\{(1-\lambda)L'_j\}^M$, i.e. the M-th (M is a positive real number) power of the entire right side of Formula (85). This convergence degree takes a value of zero to one and monotonically increases with the convergence of calculation, and thus is a preferable definition formula.

Figure 14:
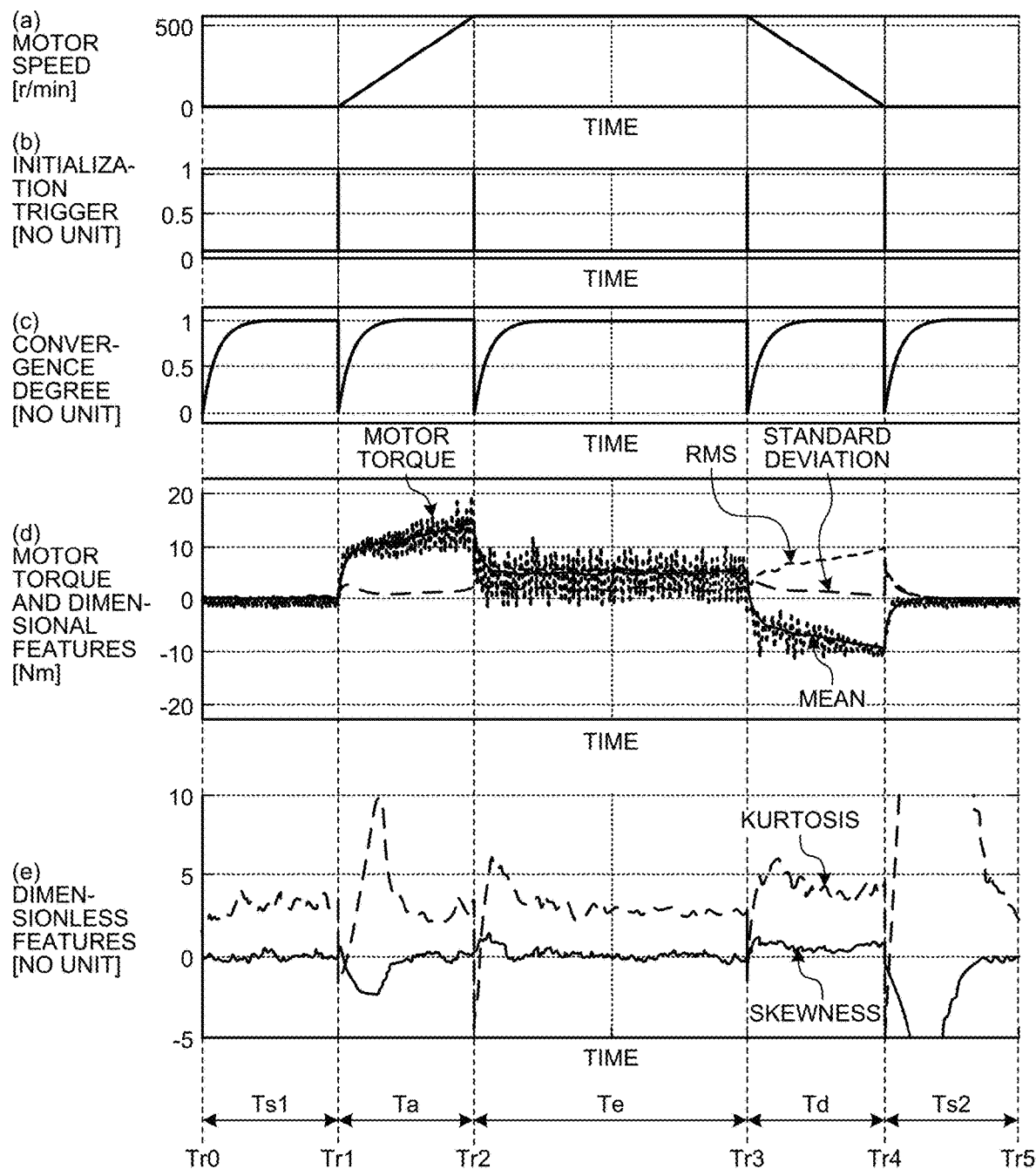
FIG. 14 is a diagram illustrating time-series waveforms of the motor torque and various types of features in the fourth embodiment.

Next, results of sequentially calculating features of the motor torque, which is one type of sensor data, using the above-described method will be described with reference to FIG. 14. FIG. 14 is a diagram illustrating time-series waveforms of the motor torque and various types of features in the fourth embodiment.

FIG. 14(*a*) illustrates the time-series waveform of the motor speed identical to the one illustrated in FIG. 5(*a*). FIG. 14(*b*) illustrates the time-series waveform of the initialization trigger identical to the one illustrated in FIG. 12(*b*).

FIG. 14(*c*) illustrates the time-series waveform of the convergence degree calculated by the convergence degree calculation unit 4007 using Formula (85). The convergence degree is zero at time Tr0 at which the sequential calculation starts, and at times Tr1, Tr2, Tr3, and Tr4 at which the initialization trigger indicates "1". This is because the initialization processing is executed and the variable $L'_j$ at the j-th time point, which is one of the internal variables, becomes zero. Here, the j-th time point refers to a time point at which the initialization trigger indicates "1". The convergence degree increases each time the initialization processing is performed, and asymptotically approaches one.

FIG. 14(*d*) illustrates the time-series waveform of the motor torque similar to that illustrated in FIG. 5(*b*). FIG. 14(*d*) illustrates the time-series waveforms of the exponential moving mean, the exponential moving standard deviation, and the exponential moving root mean square (RMS) having the same unit [Nm] as the motor torque. Note that the term "exponential moving" is omitted to avoid the complexity of the drawing.

FIG. 14(*e*) illustrates the time-series waveforms of the exponential moving skewness and the exponential moving kurtosis, which are dimensionless features, i.e. features having no unit. Here, the forgetting coefficient λ is 0.975. As in FIG. 14(*d*), the term "exponential moving" is omitted. Next, the behavior of each feature sequentially calculated in FIGS. 14(*d*) and 14(*e*) will be described.

The exponential moving mean follows the motor torque with only a slight delay over the entire period from time Tr0 to time Tr5. This indicates the property of the present embodiment in which the mean is calculated by giving large weights to the motor torque in the latest short period of time.

The exponential moving standard deviation is a substantially constant small value in period Ts1. In periods Ta, Te, Td, and Ts2, the exponential moving standard deviation increases immediately after the initialization trigger becomes one, then decreases until the next initialization trigger becomes one, and converges to a substantially constant value.

The exponential moving root mean square (RMS) is a substantially constant small value in period Ts1. In period Ta, the RMS gradually increases as the motor torque increases. In period Te, the RMS converges to a substantially constant value. In period Td, the RMS gradually increases as the absolute value of the motor 1009 increases. In period Ts2, the RMS converges to a substantially constant small value.

The exponential moving skewness is approximately zero in period Ts1. This is because the motor torque in period Ts1 has a symmetrical probability distribution. At time Tr1 at which period Ta starts, the skewness temporarily becomes a positive value and then becomes a negative value. This is because the increase of the motor torque from zero causes a temporary coexistence of old near-zero data and new post-increase data, disturbing the probability distribution of the motor torque.

In addition, the exponential moving skewness temporarily becomes a positive value immediately after time Tr2 in period Te, and then converges to approximately zero. The exponential moving skewness temporarily becomes a positive value immediately after time Tr3 in period Td, and then converges to a substantially constant value. The exponential moving skewness temporarily becomes a negative value immediately after time Tr4 in period Ts2, and then converges to approximately zero.

Further, the exponential moving kurtosis is approximately three in period Ts1. The value of three is a characteristic that the exponential moving kurtosis has with respect to a normal distribution, indicating that the motor torque has a property close to the normal distribution in period Ts1. The exponential moving kurtosis becomes a negative value immediately after time Tr1 at which period Ta starts, and then becomes a positive value. Thereafter, the exponential moving kurtosis converges to a substantially constant value by time Tr2. This is because the increase of the motor torque from zero causes a temporary coexistence of old near-zero data and new post-increase data, disturbing the probability distribution of the motor torque.

In addition, the exponential moving kurtosis becomes a negative value immediately after time Tr2 at which period Te starts, and then becomes a positive value. Thereafter, the exponential moving kurtosis converges to a substantially constant value by time Tr3.

In addition, the exponential moving kurtosis becomes a negative value immediately after time Tr3 at which period Td starts, and then becomes a positive value. Thereafter, the exponential moving kurtosis converges to a substantially constant value by time Tr4.

In addition, the exponential moving kurtosis becomes a negative value immediately after time Tr4 at which period Ts2 starts, and then becomes a positive value. Thereafter, the exponential moving kurtosis gradually converges to a constant value by time Tr5.

Figure 15:
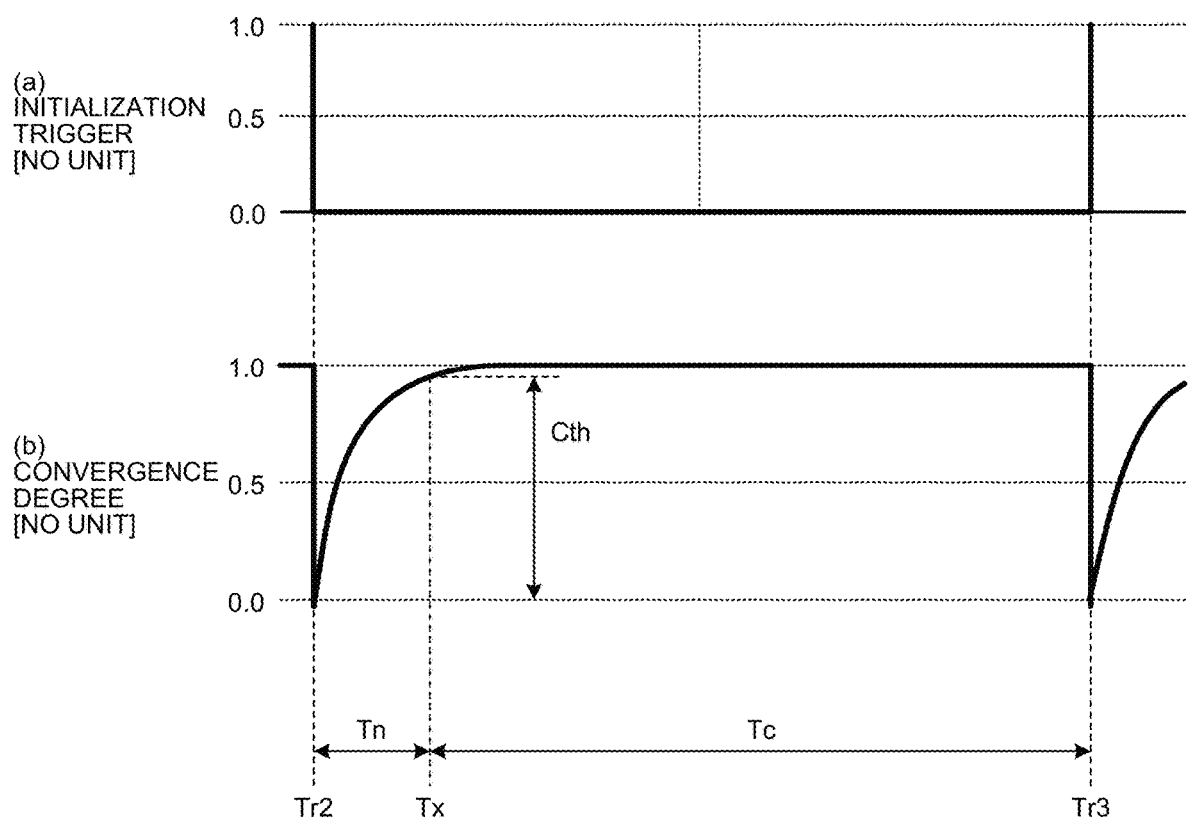
FIG. 15 is an enlarged diagram of the time-series waveforms of the initialization trigger and the convergence degree illustrated in FIG. 14 over the period from time Tr2 to time Tr3.

Next, the behavior of the convergence degree calculated by the convergence degree calculation unit 4007 and the operation of the state diagnosis unit 4006 will be described with reference to FIG. 15. FIG. 15 is an enlarged diagram of the time-series waveforms of the initialization trigger and the convergence degree illustrated in FIG. 14 over the period from time Tr2 to time Tr3.

In FIG. 15, the initialization trigger indicates "1" at time Tr2, and the initialization processing is executed. Once the initialization processing is executed, the variable $L'_j$ at the j-th time point, which is one of the internal variables, becomes zero, and the convergence degree becomes zero. Here, the j-th time point refers to a time point at which the initialization trigger indicates "1". The convergence degree increases after the initialization, and asymptotically approaches one.

The state diagnosis unit 4006 diagnoses the state of the mechanical apparatus 1008 based on the feature at a time point when the convergence degree calculated by the convergence degree calculation unit 4007 using Formula (85) satisfies a certain condition. For example, a threshold Cth is set for the convergence degree. The state diagnosis unit 4006 diagnoses the state of the mechanical apparatus 1008 using the feature at the time point when the convergence degree exceeds the threshold Cth. Here, the threshold Cth is preferably set to a value close to one, which the convergence degree asymptotically approaches. An example of the threshold Cth is 0.99.

Here, the time at which the convergence degree exceeds the threshold Cth is denoted by "Tx". In addition, the period from time Tr2 at which the convergence degree does not exceed the threshold Cth to time Tx is denoted by "Tn". In addition, the period from time Tx at which the convergence degree exceeds the threshold Cth to Tr3 is denoted by "Tc".

Preferably, the state diagnosis unit 4006 uses the feature calculated in period Tc for diagnosis of the mechanical apparatus 1008, not using the feature calculated in period Tn for diagnosis of the mechanical apparatus 1008. With this configuration, it is possible to use the feature derived from the sufficiently converged calculation result after the internal variable initialization. This brings about not only the effect of the third embodiment but also higher accuracy estimation of the state of the mechanical apparatus.

As described above, the information processing apparatus according to the fourth embodiment further includes the convergence degree calculation unit in addition to the configuration of the third embodiment. The convergence degree calculation unit calculates, based on the internal variable, a convergence degree as an index quantitatively indicating the degree of convergence of calculation of the feature. With this configuration, it is possible to use the feature derived from the sufficiently converged calculation result after the internal variable initialization. This brings about not only the effect of the third embodiment but also an additional effect that the state of the mechanical apparatus can be estimated with higher accuracy.

Fifth Embodiment

Figure 16:
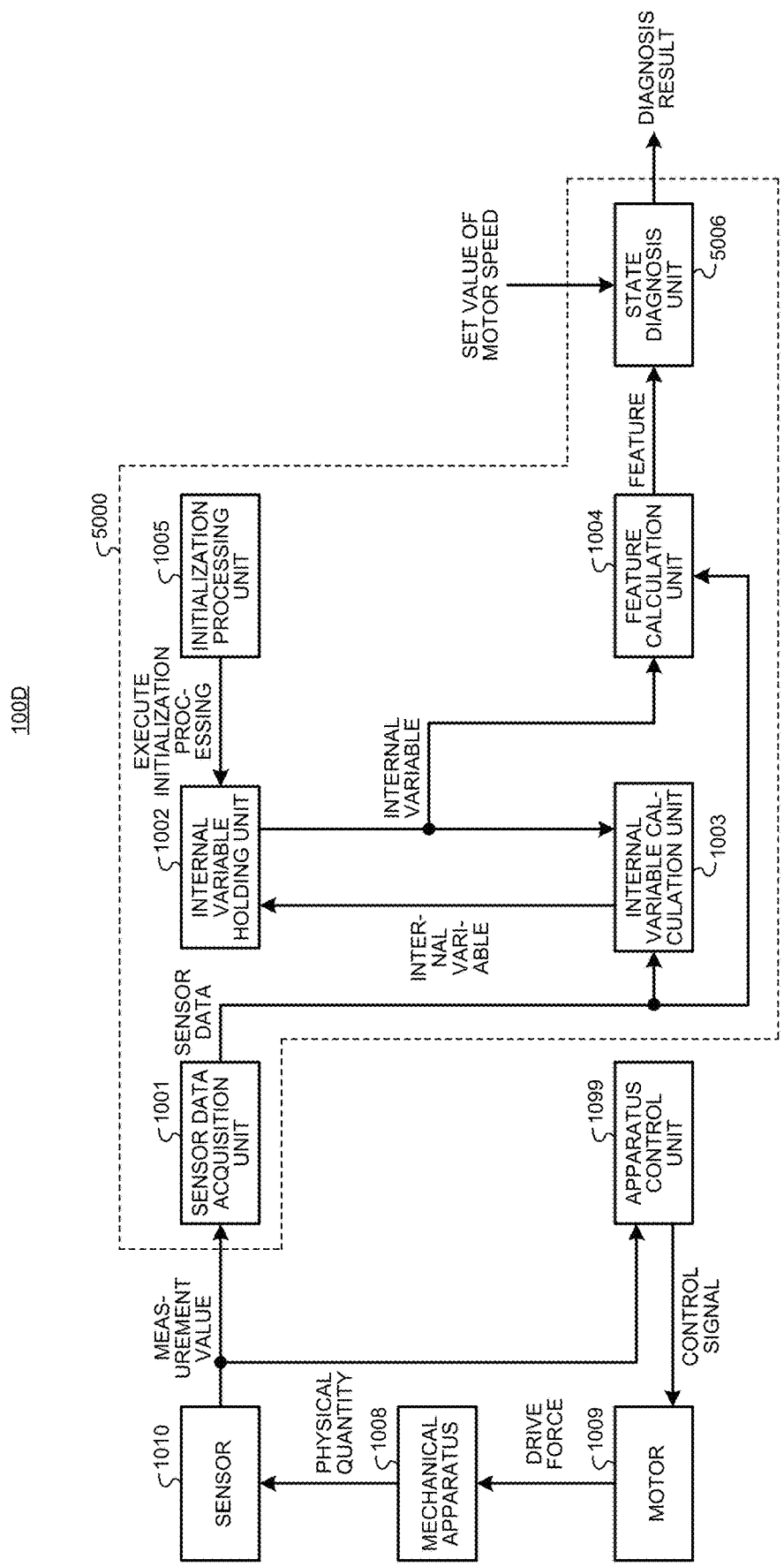
FIG. 16 is a diagram illustrating an exemplary configuration of an information processing system including an information processing apparatus according to a fifth embodiment.

FIG. 16 is a diagram illustrating an exemplary configuration of an information processing system 100D including an information processing apparatus 5000 according to the fifth embodiment. The information processing system 100D illustrated in FIG. 16 has the configuration of the information processing system 100 illustrated in FIG. 1, except that the state diagnosis unit 1006 is replaced with a state diagnosis unit 5006. Other parts of the configuration are identical or equivalent to those of the information processing system 100 illustrated in FIG. 1. Identical or equivalent components are denoted by the same reference signs, and redundant descriptions are omitted. Note that the present embodiment describes an example in which the state diagnosis unit 5006 is applied to the information processing apparatus 1000 illustrated in FIG. 1, but the state diagnosis unit 5006 may be applied to any of the information processing apparatuses 2000, 3000, and 4000 illustrated respectively in FIGS. 9, 11, and 13.

Figure 17:
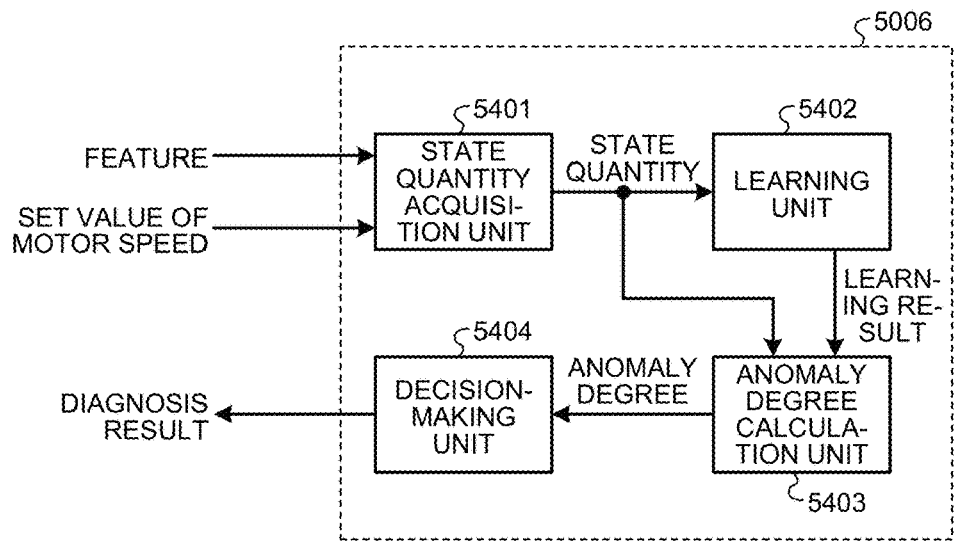
FIG. 17 is a diagram illustrating an exemplary configuration of a state diagnosis unit according to the fifth embodiment.

FIG. 17 is a diagram illustrating an exemplary configuration of the state diagnosis unit 5006 according to the fifth embodiment. The state diagnosis unit 5006 includes a state quantity acquisition unit 5401, a learning unit 5402, an anomaly degree calculation unit 5403, and a decision-making unit 5404. The state quantity acquisition unit 5401 acquires state quantities including a feature. The learning unit 5402 learns the relationship between the state of the mechanical apparatus 1008 and the feature based on the state quantities in the normal state of the mechanical apparatus 1008. The anomaly degree calculation unit 5403 calculates, based on the learning result learned by the learning unit 5402, an anomaly degree as an index quantitatively indicating the degree of anomaly of the mechanical apparatus 1008. The decision-making unit 5404 determines a diagnosis result acquired by diagnosing the state of the mechanical apparatus 1008 based on the anomaly degree calculated by the anomaly degree calculation unit 5403.

Next, the operation of the state quantity acquisition unit 5401, the learning unit 5402, the anomaly degree calculation unit 5403, and the decision-making unit 5404 will be described.

The state quantity acquisition unit 5401 acquires, as state quantities, information including a set value given to the mechanical apparatus 1008 together with a feature. As an example of a feature, the skewness sequentially calculated with the above-described method can be used. As the information of the mechanical apparatus 1008 for use as one of the state quantities, the set value of the motor speed can be used. In the example illustrated in FIG. 5(*a*), the apparatus control unit 1099 is set such that the motor speed has a maximum of 500 [r/min]. The present embodiment assumes that the set value of the motor speed is 500 [r/min]. Note that the case described in the present embodiment, in which two types of information, namely the skewness and the set value of the motor speed, are input to the state quantity acquisition unit 5401, is a non-limiting example. Three or more types of information may be input to the state quantity acquisition unit 5401.

Figure 18:
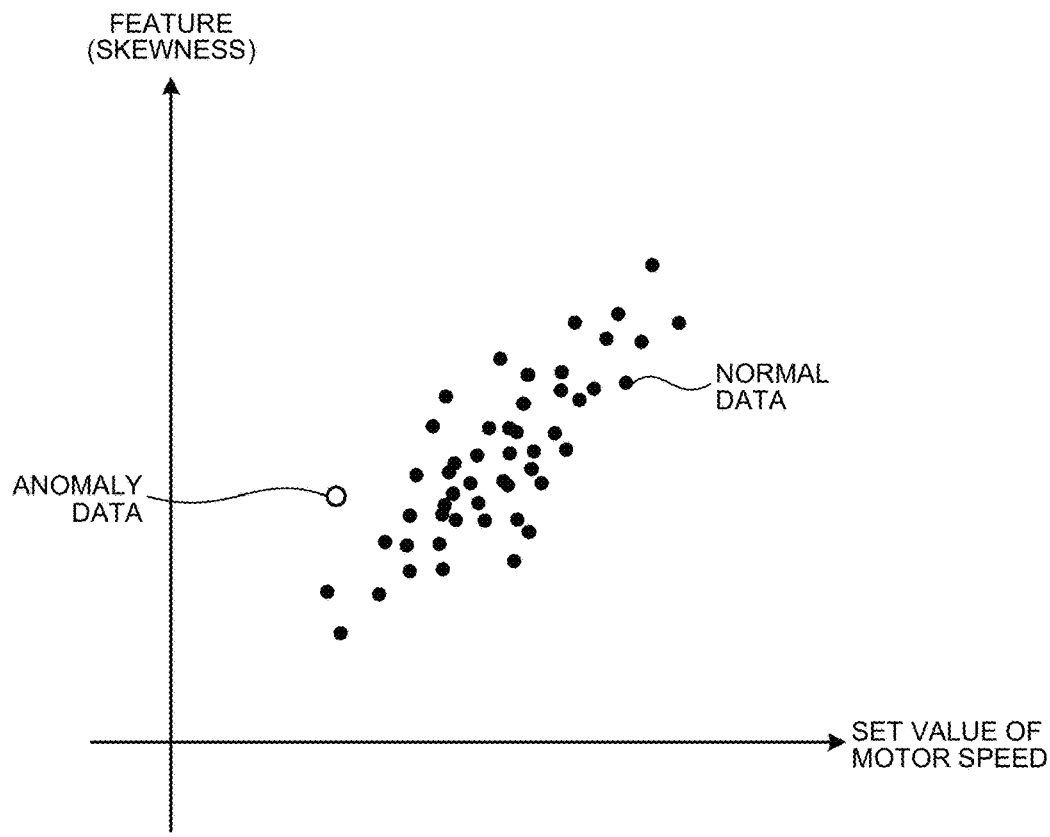
FIG. 18 is a diagram illustrating the relationship between the feature and the set value of the motor speed in the fifth embodiment.

FIG. 18 is a diagram illustrating the relationship between the feature and the set value of the motor speed in the fifth embodiment. In FIG. 18, multiple sets of data are plotted, where one set consists of the skewness, which is an example of a feature, and the set value of the motor speed. The horizontal axis represents the set value of the motor speed, and the vertical axis represents the skewness. A plurality of features may be used, and the state quantities may be displayed in a three-dimensional concept. In addition, a state quantity other than the motor speed may be used. Black circles are normal data indicating that the mechanical apparatus 1008 is in a normal state. White circles are anomaly data indicating that the mechanical apparatus 1008 has some kind of anomaly. As illustrated in FIG. 18, it is desirable to obtain a large number of state quantities as normal data in the normal state of the mechanical apparatus 1008. FIG. 18 shows that the feature of the normal data tends to increase as the set value of the motor speed increases. On the other hand, the anomaly data has a relatively large feature although the set value of the motor speed is relatively small.

As an exemplary configuration of the learning unit 5402 and the anomaly degree calculation unit 5403, an anomaly degree calculation method using principal component analysis is known. The principal component analysis is a method in which state quantities, which are multi-dimensional data, are transformed into different axes in order from the direction in which the variance is large. The learning unit 5402 using the principal component analysis calculates the eigenvalues and eigenvectors of the variance-covariance matrix of the normal data obtained in advance, and linearly maps the original state quantities to the space of the principal components. Let x represent a vector of the original state quantities, and y represent a post-mapping vector. Then, the mapping of the vector x can be expressed by Formula (86) below.

Formula 86:

$$y = Ax \quad (86)$$

The learning unit 5402 determines a representation matrix A, i.e. a matrix representing this linear mapping, based on the normal data. The learning unit 5402 obtains a plurality of eigenvalues and eigenvectors related to the variance-covariance matrix computed from a plurality of normal data prepared. For the plurality of eigenvalues obtained, the plurality of corresponding eigenvectors are arranged in descending order of eigenvalue. The matrix with the plurality of eigenvectors created through arrangement is the representation matrix A. In the case of the example in the present embodiment, eigenvectors of two rows and one column are created using the two state quantities. Then, two eigenvectors of two rows and one column are arranged, and a representation matrix of two rows and two columns is created. Note that unlike in this example, the dimension of the post-mapping vectors may be made smaller than the dimension of the vectors of the original state quantities by arranging a smaller number of eigenvectors than the number of obtained eigenvalues to create a representation matrix.

Figure 19:
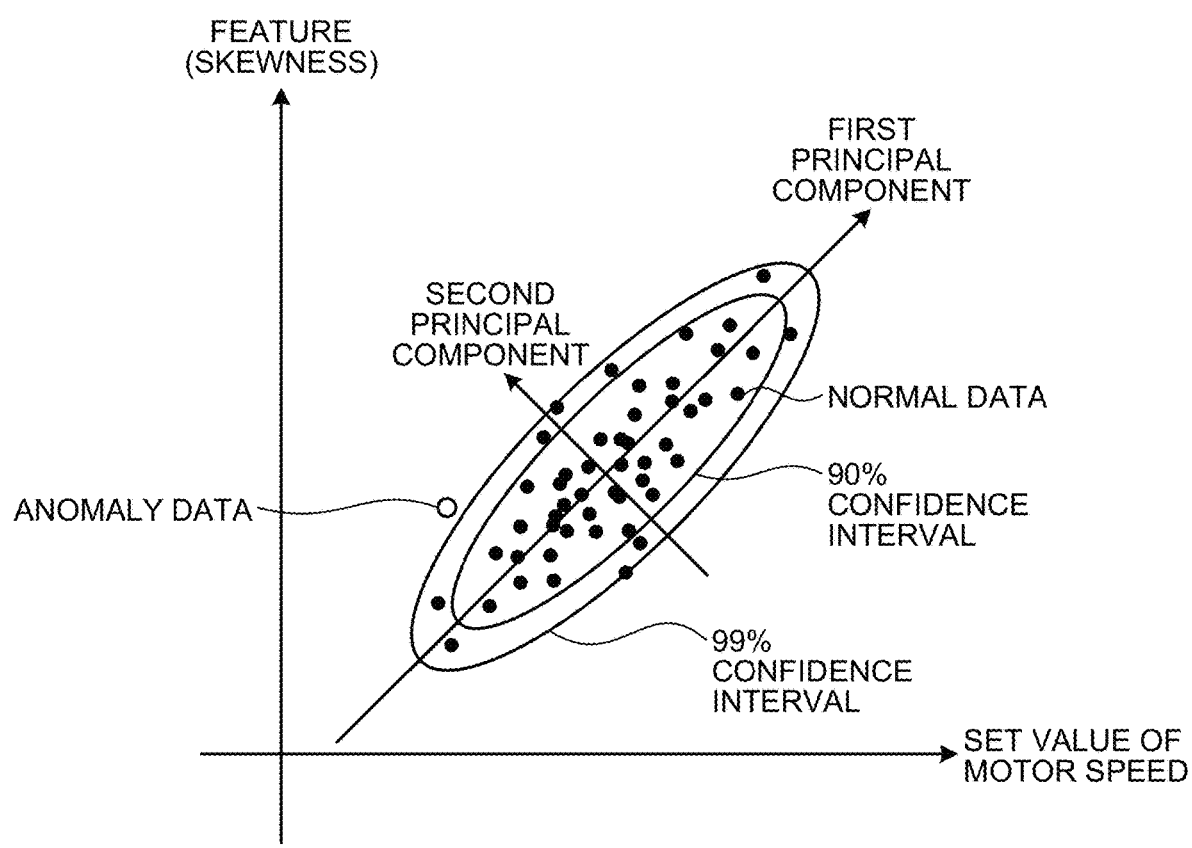
FIG. 19 is a diagram illustrating the result of principal component analysis in the fifth embodiment.

FIG. 19 is a diagram illustrating the result of principal component analysis in the fifth embodiment. FIG. 19 illustrates a duplicate of the data in FIG. 18, and also illustrates the axis of the first principal component having the largest eigenvalue and the axis of the second principal component having the second largest eigenvalue. The eigenvalues are obtained as the result of principal component analysis. For easy understanding of the result of principal component analysis, FIG. 19 further illustrates elliptical confidence intervals according to the eigenvalue corresponding to the variance of each principal component around the position where the axis of the first principal component and the axis of the second principal component intersect. A confidence interval is a range within which the distribution of data is expected to lie with a certain probability. Examples of confidence intervals include a 90% confidence interval within which 90% of the normal data is expected to lie, a 99% confidence interval within which 99% of the normal data is expected to lie, etc. Confidence intervals can be calculated with a general statistical method.

In FIG. 19, the normal data is within the 99% confidence interval, whereas the anomaly data is located outside the 99% confidence interval. This anomaly data is considered to occur only with a probability of about 1% as long as the mechanical apparatus 1008 is normal. Therefore, the possibility that the mechanical apparatus 1008 has an anomaly is identified. On the other hand, if a simple threshold is provided for the feature without using principal component analysis, the anomaly data may lie within the distribution of the normal data and become difficult to diagnose.

The anomaly degree calculation unit 5403 according to the fifth embodiment calculates an anomaly degree as an index quantitatively indicating the degree of anomaly of the mechanical apparatus 1008. As an example of the anomaly degree, an index called T2 statistic is used. The T2 statistic is an index in which the distance from the coordinate center of the axis of each principal component in the post-mapping data obtained through principal component analysis is standardized by the variance for each axis. The distance from the coordinate center of the axis of each principal component is also called the "Mahalanobis distance".

Figure 20:
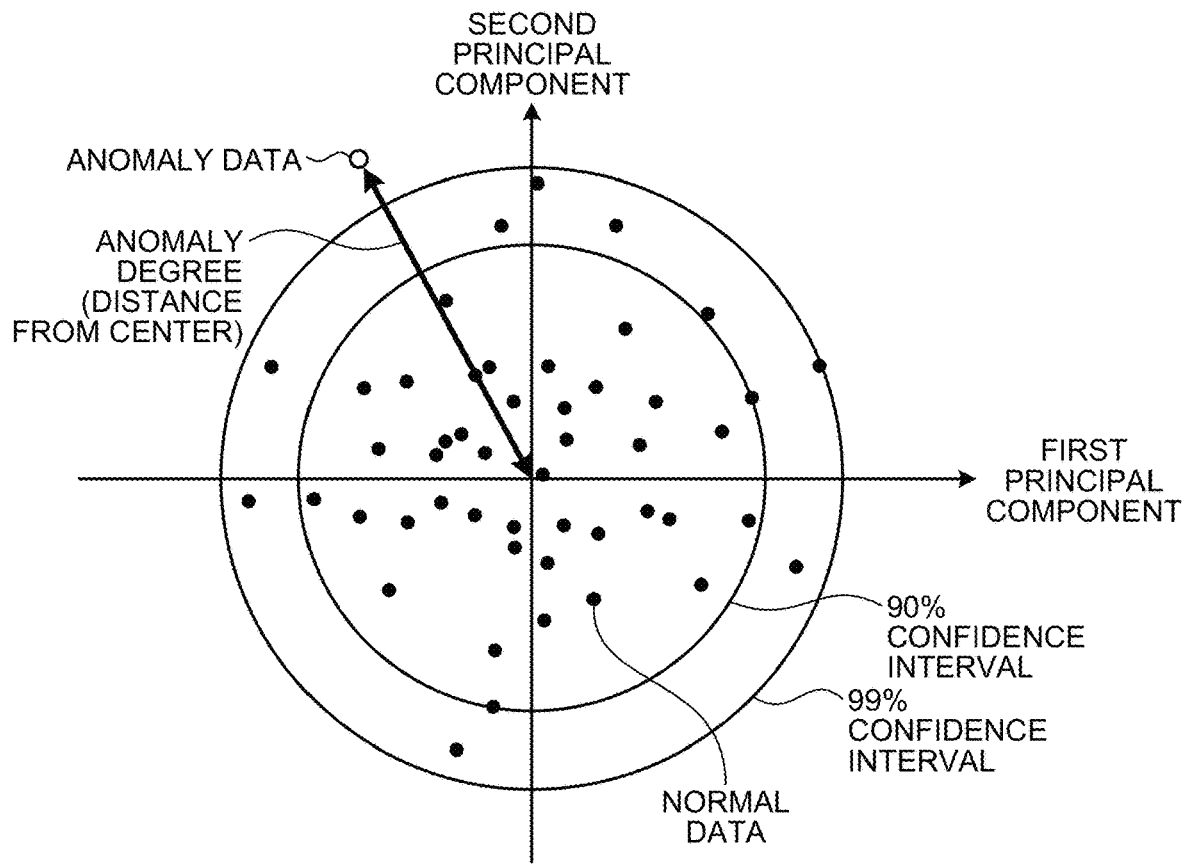
FIG. 20 is a diagram illustrating the anomaly degree of principal component analysis in the fifth embodiment.

FIG. 20 is a diagram illustrating the anomaly degree of principal component analysis in the fifth embodiment. FIG. 20 illustrates a diagram in which the normal data, the anomaly data, the 90% confidence interval, and the 99% confidence interval illustrated in FIG. 19 are standardized using the eigenvalues described above. In FIG. 20, the distance between the point at which the axis of the first principal component intersects the axis of the second principal component and the anomaly data is shown as the anomaly degree. The 90% confidence interval and the 99% confidence interval, which are elliptical in FIG. 19, are circular in FIG. 20. As in FIG. 20, the illustration based on the concept of the Mahalanobis distance enables the determination of the anomaly degree in which the variation in normal data is considered.

The fifth embodiment describes the method for the anomaly degree calculation unit 5403 to calculate the anomaly degree, using T2 statistic after mapping, into the principal components computed through principal component analysis, which is a non-limiting example. Instead of T2 statistic, an index called Q statistic may be used. In addition, there are various methods called unsupervised learning with which normal data is learned and the distribution thereof is captured so that the anomaly degree can be calculated for new data, similar to principal component analysis. For example, methods such as one-class support vector machine, Mahalanobis Taguchi method, and self-organizing maps may be used. If necessary, the anomaly degree may be calculated after preprocessing such as normalization is performed on the input state quantities.

Figure 21:
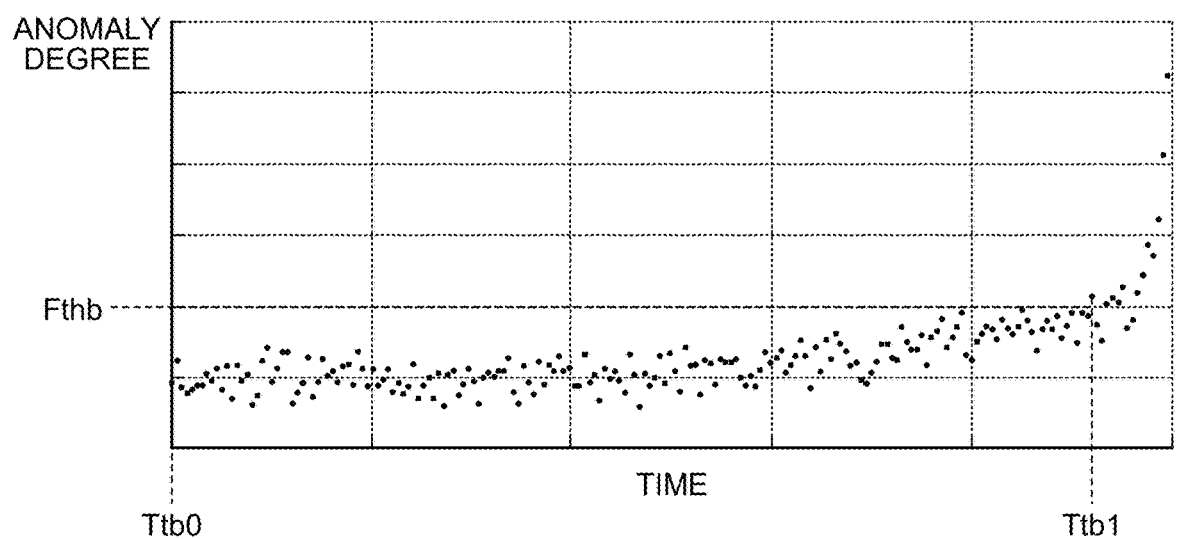
FIG. 21 is a diagram illustrating an example of changes in anomaly degree over time in the fifth embodiment.

The decision-making unit 5404 according to the fifth embodiment determines a result of diagnosing the state of the mechanical apparatus 1008 using the anomaly degree calculated with the above-described method. A procedure in which the decision-making unit 5404 diagnoses the state of the mechanical apparatus 1008 using anomaly degree will be described with reference to FIG. 21. FIG. 21 is a diagram illustrating an example of changes in anomaly degree over time in the fifth embodiment. FIG. 21 illustrates a result of periodically plotting the anomaly degree calculated with the above-described method. The term "periodically" means, for example, every month. The horizontal axis in FIG. 21 is time and represents the operating time of the mechanical apparatus 1008.

The decision-making unit 5404 provides a threshold Fthb for the anomaly degree, and diagnoses the mechanical apparatus 1008 as having an anomaly when the anomaly degree exceeds the threshold Fthb.

In FIG. 21, time Ttb0 is the operation start time. The anomaly degree keeps smaller than the threshold Fthb while fluctuating to some extent from time Ttb0 to before time Ttb1. When the anomaly degree is less than the threshold, the decision-making unit 5404 diagnoses the mechanical apparatus 1008 as normal, and outputs the diagnosis result.

In the example of FIG. 21, the average value of the anomaly degree gradually increases with the lapse of time, and the anomaly degree exceeds the threshold Fthb at time Ttb1. In this case, the state diagnosis unit 5006 diagnoses the mechanical apparatus 1008 as having an anomaly at time Ttb1, and outputs the diagnosis result.

There are various ways of determining the threshold Fthb. An example is to set the anomaly degree corresponding to the 99% confidence interval of the normal data as the threshold Fthb. Alternatively, the anomaly degree associated with a past anomaly in another mechanical apparatus may be set as the threshold Fthb. In addition, the anomaly degree may be determined with reference to the anomaly degree obtained immediately after the start of operation of the mechanical apparatus 1008. In addition, the threshold Fthb may be dynamically set. For example, a plurality of mechanical apparatuses may be operated, and meanwhile the anomaly degrees thereof may be individually calculated, so that the threshold Fthb can be periodically determined by considering the variation in anomaly degree between the apparatuses. The information processing apparatus thus configured is advantageous in detecting an anomaly in the event of a failure in one of the plurality of mechanical apparatuses, because the anomaly degree of the failed apparatus becomes larger than the anomaly degrees of the other devices.

In the present embodiment, the mechanical apparatus 1008 is diagnosed as an anomaly once the anomaly degree exceeds the threshold Fthb, but this method is only an example. In order to reduce wrong diagnosis, or erroneous determination, due to the influence of noise or the like, a statistical method such as an examination based on the distribution of anomaly degrees in a certain period may be adopted.

As described above, the information processing apparatus according to the fifth embodiment diagnoses the state of the mechanical apparatus based on the anomaly degree as an index quantitatively indicating the degree of anomaly of the mechanical apparatus. This brings about not only the effects of the other embodiments but also an additional effect that the state of the mechanical apparatus can be estimated with higher accuracy.

Sixth Embodiment

Figure 22:
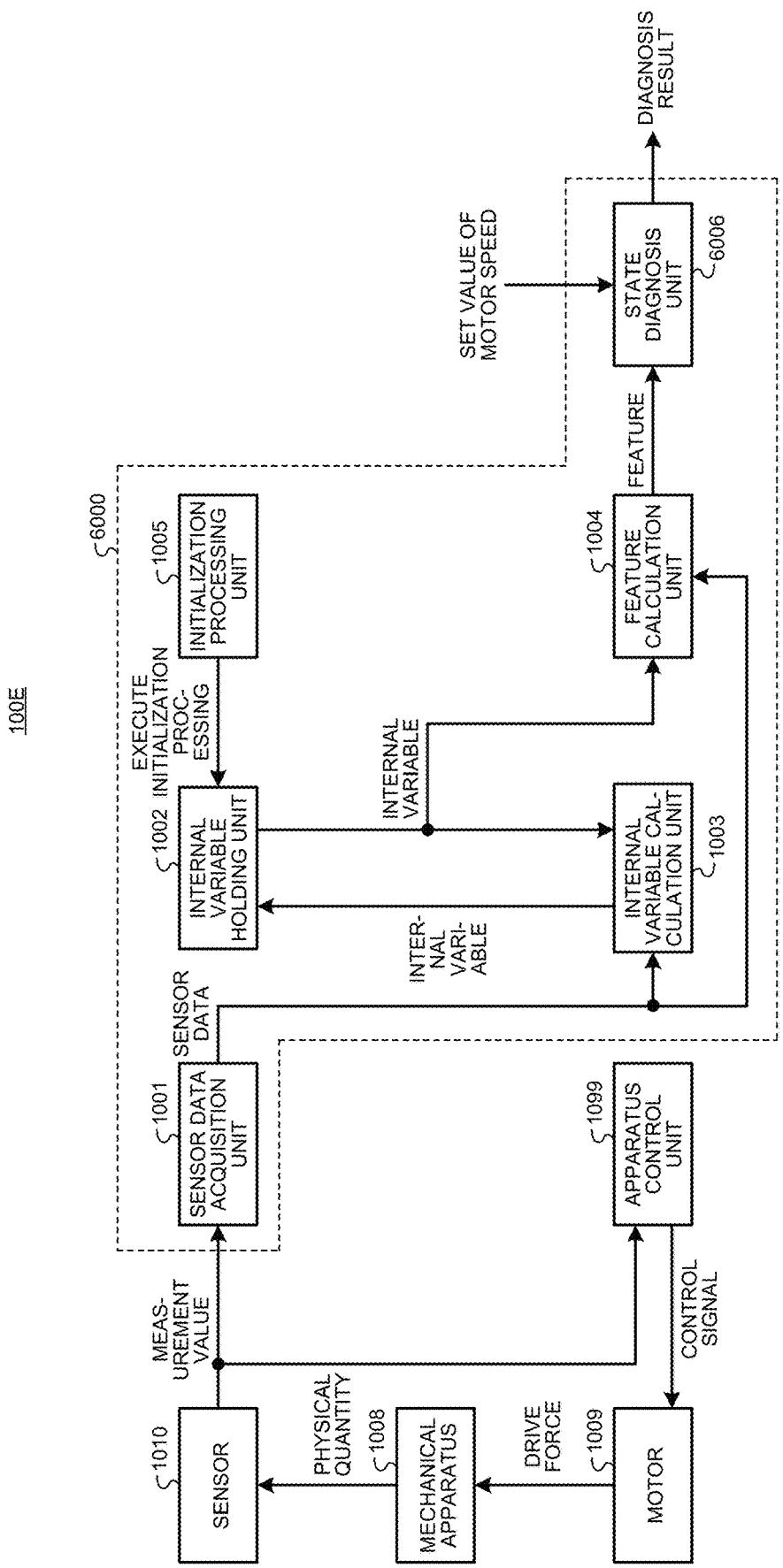
FIG. 22 is a diagram illustrating an exemplary configuration of an information processing system including an information processing apparatus according to a sixth embodiment.

FIG. 22 is a diagram illustrating an exemplary configuration of an information processing system 100E including an information processing apparatus 6000 according to the sixth embodiment. The information processing system 100E illustrated in FIG. 22 has the configuration of the information processing system 100 illustrated in FIG. 1, except that the state diagnosis unit 1006 is replaced with a state diagnosis unit 6006. Other parts of the configuration are identical or equivalent to those of the information processing system 100 illustrated in FIG. 1. Identical or equivalent components are denoted by the same reference signs, and redundant descriptions are omitted. Note that the present embodiment describes an example in which the state diagnosis unit 6006 is applied to the information processing apparatus 1000 illustrated in FIG. 1, but the state diagnosis unit 6006 may be applied to any of the information processing apparatuses 2000, 3000, and 4000 illustrated respectively in FIGS. 9, 11, and 13.

Figure 23:
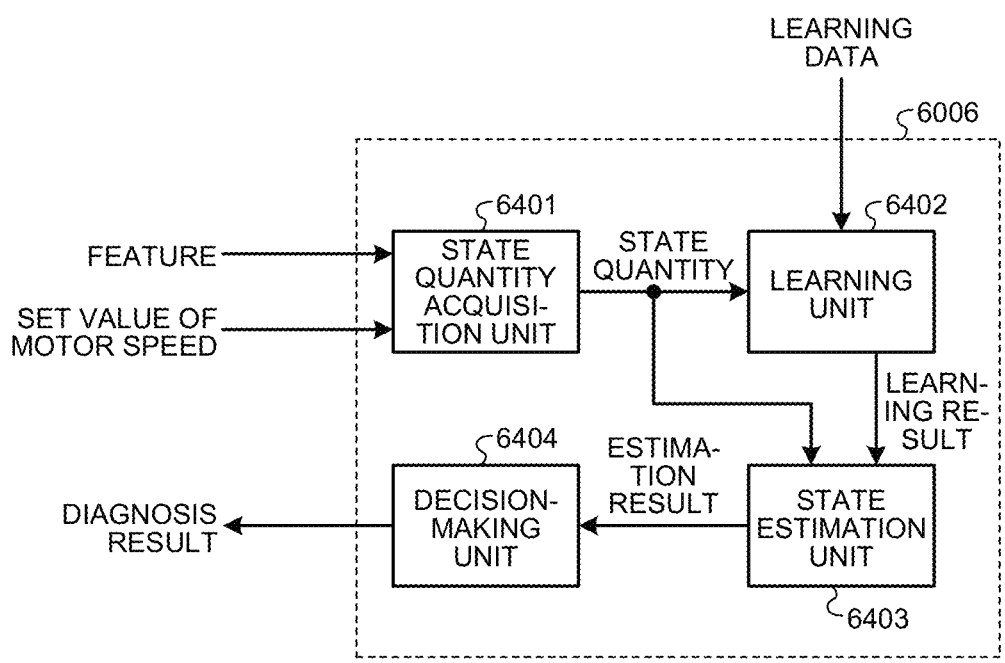
FIG. 23 is a diagram illustrating an exemplary configuration of a state diagnosis unit according to the sixth embodiment.

FIG. 23 is a diagram illustrating an exemplary configuration of the state diagnosis unit 6006 according to the sixth embodiment. The state diagnosis unit 6006 includes a state quantity acquisition unit 6401, a learning unit 6402, a state estimation unit 6403, and a decision-making unit 6404. The state quantity acquisition unit 6401 acquires state quantities including a feature. The learning unit 6402 learns the relationship between the state of the mechanical apparatus 1008 and the state quantity based on learning data that associates the relationship between the state of the mechanical apparatus 1008 and the state quantities acquired by the state quantity acquisition unit 6401. The state estimation unit 6403 estimates the state of the mechanical apparatus 1008 based on the state quantities input to the learning unit 6402 and a learning result from the learning unit 6402. The decision-making unit 6404 determines a diagnosis result by diagnosing the state of the mechanical apparatus 1008 based on the result estimated by the state estimation unit 6403.

The state quantity acquisition unit 6401 acquires, as state quantities, information including a set value given to the mechanical apparatus 1008 together with a feature. As examples of features, the skewness and the kurtosis sequentially calculated with the above-described method can be used. As the information of the mechanical apparatus 1008 for use as one of the state quantities, the set value of the motor speed described above can be used. Note that the case described in the present embodiment, in which three types of information, namely the skewness, the kurtosis, and the set value of the motor speed, are input to the state quantity acquisition unit 6401, is a non-limiting example. Four or more types of information may be input to the state quantity acquisition unit 6401.

The learning unit 6402 and the state estimation unit 6403 may learn the relationship between the state quantities and the state of the mechanical apparatus 1008 through what is called supervised learning according to a neural network model, for example. Here, a model that provides a large amount of learning data, i.e. a set of inputs (state quantities) and associated results (labels), to a learning unit to learn features in those data and estimate results from inputs is called supervised learning. A neural network includes an input layer composed of a plurality of neurons, an intermediate layer (hidden layer) composed of a plurality of neurons, and an output layer composed of a plurality of neurons. The number of intermediate layers may be one, or may be two or more.

Figure 24:
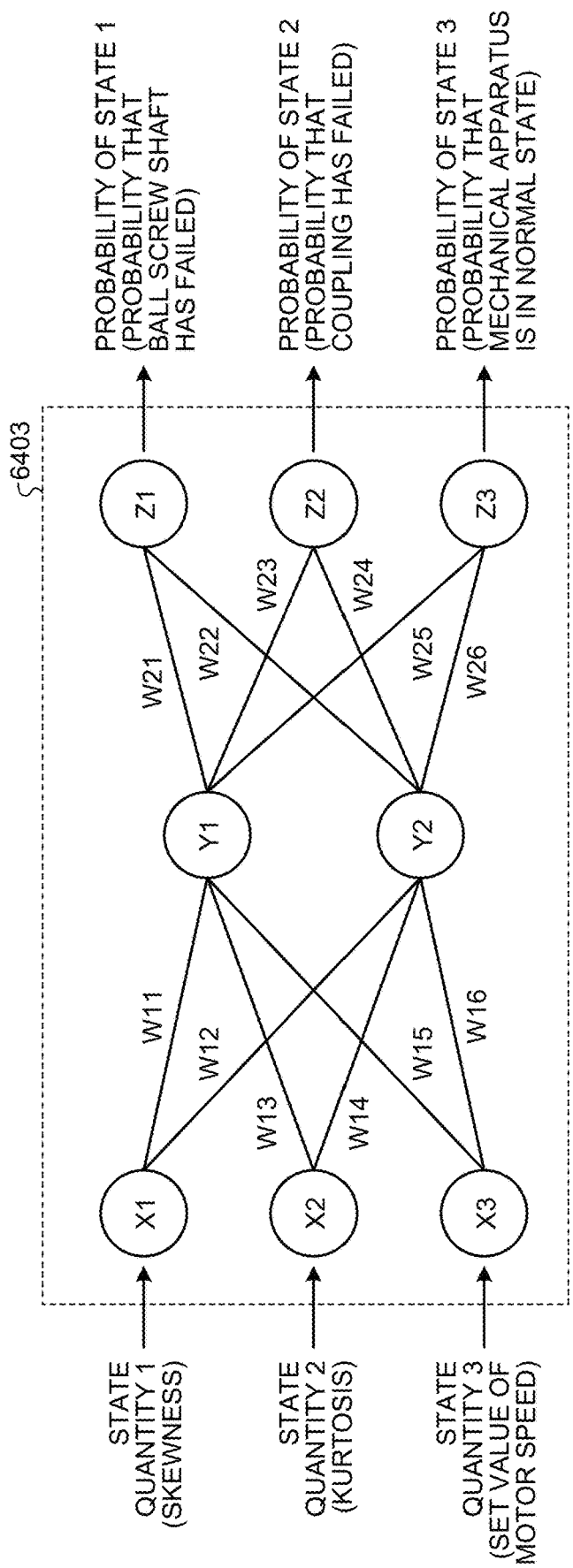
FIG. 24 is a diagram illustrating an exemplary structure of a state estimation unit according to the sixth embodiment.

FIG. 24 is a diagram illustrating an exemplary structure of the state estimation unit 6403 according to the sixth embodiment. The inputs are state quantities. For ease of explanation, the neural network in FIG. 24 has three inputs and three layers. When a plurality of inputs are input to the input layer composed of X1 to X3, the input values are multiplied by weights W1, i.e. W11 to W16, and the resultant values are input to the intermediate layer composed of Y1 and Y2. Further, the input values to the intermediate layer are multiplied by weights W2, i.e. W21 to W26, and the resultant values are output from the output layer composed of Z1 to Z3. This output result varies depending on the values of the weights W1 and the values of the weights W2.

In an example of learning with the neural network according to the sixth embodiment, the weights W1 and the weights W2 are adjusted such that the probability of each state output from the output layers Z1 to Z3 as the result of the input of state quantities 1 to 3 to the input layers X1 to X3 matches the label of the learning data. Note that the information processing apparatus 6000 may be configured by being equipped with the learned state estimation unit 6403 that has executed the learning processing according to the sixth embodiment. The learned state estimation unit 6403 may include learned data, a learned program, or a combination thereof. By using the learned state estimation unit 6403, the results of learning with other information processing apparatuses are available. Therefore, it is possible to provide the information processing apparatus 6000 capable of implementing diagnosis without newly performing learning.

FIG. 24 illustrates an example in which the skewness is input to the input layer X1, the kurtosis is input to the input layer X2, and the set value of the motor speed is input to the input layer X3. The skewness is an example of state quantity 1 input to the input layer X1, the kurtosis is an example of state quantity 2 input to the input layer X2, and the set value of the motor speed is an example of state quantity 3 input to the input layer X3. From the output layer Z1, the probability that the ball screw shaft 1224 of the mechanical apparatus 1008 has failed is output as the probability of state 1. From the output layer Z2, the probability that the coupling 1220 of the mechanical apparatus 1008 has failed is output as the probability of state 2. From the output layer Z3, the probability that the mechanical apparatus 1008 is in a normal state is output as the probability of state 3. In the calculation of outputs, for example, the softmax function may be used so that the sum of all outputs is one, that is, 100%. The use of this function ensures an easy understanding of the estimation results.

The neural network illustrated in FIG. 24 learns the relationship between the state of the mechanical apparatus 1008 and state quantities 1 to 3 through supervised learning according to the data set created based on the learning data input to the learning unit 6402. The learning is preferably performed such that any of the outputs of states 1 to 3 is one (probability of 100%) and the other outputs are zero (probability of 0%), assuming that information indicating the true state of the mechanical apparatus 1008 called labels is correctly obtained.

The configuration of the learning unit 6402 and the state estimation unit 6403 is not limited to the neural network. For example, many methods for learning the relationship between state quantities and labels and estimating a state from state quantities are known, such as k-nearest neighbor algorithm, binary tree search, support vector machine, linear regression, and logistic regression. Therefore, the learning unit 6402 and the state estimation unit 6403 may be configured by applying these methods.

The decision-making unit 6404 determines a diagnosis result by diagnosing the state of the mechanical apparatus 1008 based on the result estimated by the state estimation unit 6403. For example, if the probability that the mechanical apparatus 1008 is normal is highest, it is preferable to output a diagnosis result indicating normal as the diagnosis result of the mechanical apparatus 1008. If the probability that the ball screw shaft 1224 has failed or the probability that the coupling 1220 has failed is highest, it is preferable to output a diagnosis result indicating the failed portion. If the sum of the probability that the ball screw shaft 1224 has failed and the probability that the coupling 1220 has failed is larger than the probability of normal, it is preferable to output a result indicating that some component has failed.

As described above, the information processing apparatus according to the sixth embodiment learns the relationship between the state of the mechanical apparatus and the state quantities based on learning data that associates the relationship between the state of the mechanical apparatus and the state quantities, and estimates the state of the mechanical apparatus based on the learning result and the state quantities used in the learning. This brings about not only the effect of the first embodiment but also an additional effect that the state of the mechanical apparatus can be estimated with higher accuracy.

The configurations described in the above-mentioned embodiments indicate examples. The embodiments can be combined with another well-known technique and with each other, and some of the configurations can be omitted or changed in a range not departing from the gist.

REFERENCE SIGNS LIST

100, 100A, 100B, 100C, 100D, 100E information processing system; 1000, 2000, 3000, 4000, 5000, 6000 information processing apparatus; 1001, 2001, 3001 sensor data acquisition unit; 1002 internal variable holding unit; 1003, 2003, 4003 internal variable calculation unit; 1004, 2004, 4004 feature calculation unit; 1005, 3005 initialization processing unit; 1006, 4006, 5006, 6006 state diagnosis unit; 1008 mechanical apparatus; 1009 motor; 1010 sensor; 1099, 2099 apparatus control unit; 1210 ball screw; 1212 movable portion; 1213 guide; 1220 coupling; 1224 ball screw shaft; 1230 servomotor; 1231 servomotor shaft; 1232 current sensor; 1233 encoder; 1240 driver; 1250, 1280 display; 1260 PLC; 1270 PC; 1291 processor; 1292 memory; 1293 processing circuitry; 4007 convergence degree calculation unit; 5401, 6401 state quantity acquisition unit; 5402, 6402 learning unit; 5403 anomaly degree calculation unit; 6403 state estimation unit; 5404, 6404 decision-making unit.

The invention claimed is:

1. An information processing apparatus comprising:
sensor data acquisition circuitry to acquire measurement values of a physical quantity of a mechanical apparatus measured by a sensor, and acquire, as sensor data, measurement values from a first time point to an N-th time point (N is an integer of two or more) among the measurement values;
internal variable holding circuitry to hold a smaller number of values of an internal variable than the N, the internal variable being sequentially calculated in time series based on the sensor data;
internal variable calculation circuitry to calculate the internal variable corresponding to a (j+1)-th time point (j is an integer of one to N−1) based on the sensor data at the (j+1)-th time point and the internal variable corresponding to a j-th time point;
feature calculation circuitry to calculate a feature by extracting a statistical characteristic included in the sensor data from the first time point to the N-th time point based on the internal variable at the N-th time point; and
state diagnosis circuitry to make a diagnosis of a state of the mechanical apparatus based on the feature.

2. The information processing apparatus according to claim 1, wherein
the feature is at least one of variance, standard deviation, root mean square, skewness, and kurtosis of the sensor data.

3. The information processing apparatus according to claim 1, wherein
the mechanical apparatus is driven by a motor, and
the sensor data acquisition circuitry acquires, as the sensor data, at least one of measurement values of position, speed, acceleration, operation command, current, voltage, torque, force, pressure, sound, and light amount measured by the sensor as the motor is driven.

4. The information processing apparatus according to claim 1, comprising
initialization processing circuitry to execute initialization processing of setting the internal variable at the first time point to a value between a preset maximum and a preset minimum.

5. The information processing apparatus according to claim 4, wherein
the sensor data acquisition circuitry determines two or more time points between the first time point and the j-th time point based on at least one of an acquisition cycle that is an interval of time for acquiring the sensor data, an operation signal representing a status of operation of the mechanical apparatus, and a data value in the sensor data, and generates a calculation permission flag for updating an internal variable based on the two or more time points determined, and
for each u-th time point (u is an integer of one to the j) indicated by the calculation permission flag, the internal variable calculation circuitry sets the internal variable at a (u+1)-th time point to a value of the internal variable at the u-th time point, when the calculation permission flag does not include an indication that the internal variable is to be updated.

6. The information processing apparatus according to claim 4, wherein
the sensor data acquisition circuitry determines one or more time points between the first time point and the N-th time point based on at least one of an acquisition cycle that is an interval of time for acquiring the sensor data, an operation signal representing a status of operation of the mechanical apparatus, and the sensor data, and generates an initialization trigger for initializing an internal variable based on the one or more time points determined, and
the initialization processing circuitry executes processing of initializing the internal variable based on the initialization trigger.

7. The information processing apparatus according to claim 1, wherein
the internal variable calculation circuitry calculates the internal variable based on a forgetting coefficient larger than zero and smaller than one, the forgetting coefficient being used for weighting that makes the sensor data at a later time have a larger influence on the feature than the sensor data at an earlier time.

8. The information processing apparatus according to claim 7, comprising
convergence degree calculation circuitry to calculate, based on the internal variable, a convergence degree as an index quantitatively indicating a degree of convergence of calculation of the feature.

9. The information processing apparatus according to claim 1, wherein
the state diagnosis circuitry includes:
state quantity acquisition circuitry to acquire state quantities including the feature;
learning circuitry to learn a relationship between the state of the mechanical apparatus and the feature based on state quantities in a normal state of the mechanical apparatus;
anomaly degree calculation circuitry to calculate, based on a result learned by the learning circuitry, an anomaly degree as an index quantitatively indicating a degree of anomaly of the mechanical apparatus; and
decision-making circuitry to determine a diagnosis result acquired by diagnosing the state of the mechanical apparatus based on the anomaly degree.

10. The information processing apparatus according to claim 1, wherein
the state diagnosis circuitry includes:
state quantity acquisition circuitry to acquire state quantities including the feature;
learning circuitry to learn a relationship between the state of the mechanical apparatus and the state quantities based on learning data that associates the relationship between the state of the mechanical apparatus and the state quantities;
state estimation circuitry to estimate the state of the mechanical apparatus based on state quantities input to the learning circuitry and a learning result from the learning circuitry; and
decision-making circuitry to determine a result of the diagnosis based on a result estimated by the state estimation circuitry.

11. An information processing method comprising:
acquiring, as sensor data from a sensor that measures a physical quantity of a mechanical apparatus, a measurement value of the physical quantity at each time point from a first time point to an N-th time point (N is an integer of two or more);
holding a smaller number of values of an internal variable than the N, the internal variable being sequentially calculated in time series based on the sensor data;
calculating the internal variable corresponding to a (j+1)-th time point (j is an integer of one to N−1) based on the sensor data at the (j+1)-th time point and the internal variable corresponding to a j-th time point;

calculating a feature by extracting a statistical characteristic included in the sensor data from the first time point to the N-th time point based on the internal variable at the N-th time point; and making a diagnosis of a state of the mechanical apparatus based on the feature.

12. The information processing method according to claim 11, further comprising executing initialization processing of setting the internal variable at the first time point to a value between a preset maximum and a preset minimum.

* * * * *